United States Patent
Lee et al.

(10) Patent No.: US 11,323,651 B2
(45) Date of Patent: *May 3, 2022

(54) DISPLAY DEVICE AND CONTROL METHOD THEREFOR

(71) Applicant: LG ELECTRONICS INC., Seoul (KR)

(72) Inventors: Hyeseung Lee, Seoul (KR); Sangjin Ahn, Seoul (KR); Jihe Suk, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/186,778

(22) Filed: Feb. 26, 2021

(65) Prior Publication Data

US 2021/0185269 A1 Jun. 17, 2021

Related U.S. Application Data

(63) Continuation of application No. 15/573,806, filed as application No. PCT/KR2015/008759 on Aug. 21, 2015, now Pat. No. 10,986,302.

(30) Foreign Application Priority Data

May 18, 2015 (KR) .................. 10-2015-0068698

(51) Int. Cl.
*H04N 5/45* (2011.01)
*H04N 21/4728* (2011.01)
(Continued)

(52) U.S. Cl.
CPC ......... *H04N 5/45* (2013.01); *H04N 21/42204* (2013.01); *H04N 21/4312* (2013.01);
(Continued)

(58) Field of Classification Search
CPC .............. H04N 19/139; H04N 19/513; H04N 5/23296; H04N 19/57; H04N 5/23222;
(Continued)

(56) References Cited

U.S. PATENT DOCUMENTS 5,973,732 A 10/1999 Guthrie
6,567,070 B1 5/2003 Light et al.
(Continued)

FOREIGN PATENT DOCUMENTS

CN 1856794 11/2006
CN 101631253 1/2010
(Continued)

OTHER PUBLICATIONS

The State Intellectual Property Office of the People's Republic of China Application Serial No. 201580080164.2, Office Action dated Dec. 14, 2020, 4 pages.
(Continued)

*Primary Examiner* — Samira Monshi
(74) *Attorney, Agent, or Firm* — Lee, Hong, Degerman, Kang & Waimey PC

(57) ABSTRACT

A method for controlling a display device, according to one embodiment of the present invention, comprises: displaying, on a main screen of a display device, content including at least one object; receiving an input for selecting a specific object from the at least one object displayed on the main screen; specifying the specific object by corresponding to the received selection input, expanding a specific area including the specific object; displaying a window including the content displayed on the main screen; displaying the expanded specific area on the main screen; and displaying, within the displayed window, an indicator for displaying the
(Continued)

expended specific area, wherein the specific area changes according to a position of the specific object, and the content corresponds to a video.

8 Claims, 50 Drawing Sheets

(51) Int. Cl.
*H04N 21/475* (2011.01)
*H04N 21/422* (2011.01)
*H04N 21/431* (2011.01)
*H04N 21/47* (2011.01)

(52) U.S. Cl.
CPC ....... *H04N 21/475* (2013.01); *H04N 21/4728* (2013.01); *H04N 21/47* (2013.01)

(58) Field of Classification Search
CPC ............... H04N 7/183; H04N 5/23212; H04N 5/23293; H04N 5/232945; H04N 19/107; H04N 19/172; H04N 19/521; H04N 19/61; H04N 1/3935; H04N 5/232125; H04N 5/23254; H04N 5/2355; H04N 5/272; H04N 5/35581; H04N 7/18; H04N 7/181; H04N 21/4117; H04N 21/426; H04N 21/4312; H04N 21/440263; H04N 21/4728; H04N 21/47815; H04N 21/816; H04N 21/84; H04N 5/232127; H04N 5/23218; H04N 5/4401
See application file for complete search history.

(56) References Cited

U.S. PATENT DOCUMENTS

| | | |
|---|---|---|
| 2002/0171689 A1 | 11/2002 | Fox et al. |
| 2005/0275721 A1 | 12/2005 | Ishii |
| 2006/0087520 A1 | 4/2006 | Ito et al. |
| 2008/0079754 A1 | 4/2008 | Kuroki |
| 2008/0285800 A1 | 11/2008 | Miyake et al. |
| 2009/0097709 A1 | 4/2009 | Tsukamoto |
| 2009/0228922 A1* | 9/2009 | Haj-khalil ........ H04N 21/42204 725/38 |
| 2009/0262087 A1 | 10/2009 | Kim |
| 2012/0069224 A1 | 3/2012 | Cilia et al. |
| 2015/0062434 A1 | 3/2015 | Deng et al. |
| 2018/0262708 A1 | 9/2018 | Lee et al. |

FOREIGN PATENT DOCUMENTS

| | | |
|---|---|---|
| CN | 102467574 | 5/2012 |
| CN | 103081502 | 5/2013 |
| CN | 104041005 | 9/2014 |
| CN | 204145679 | 2/2015 |
| CN | 104469052 | 3/2015 |
| CN | 104581437 | 4/2015 |
| EP | 0613020 | 8/1994 |
| EP | 2631778 | 8/2013 |
| JP | 2000175155 | 6/2000 |
| JP | 2003198979 | 7/2003 |
| KR | 1019980007534 | 3/1998 |
| KR | 1019990025616 | 4/1999 |
| KR | 1020060106044 | 10/2006 |
| KR | 1620080010633 | 1/2008 |
| KR | 10-2013-0097567 | 9/2013 |
| WO | 2013147866 | 10/2013 |

OTHER PUBLICATIONS

The State Intellectual Property Office of the People's Republic of China Application Serial No. 201580080164.2, Office Action dated Aug. 5, 2019, 11 pages.
U.S. Appl. No. 15/573,806, Office Action dated Jun. 11, 2020, 18 pages.
U.S. Appl. No. 15/573,806, Office Action dated Feb. 7, 2019, 14 pages.
U.S. Appl. No. 15/573,806, Office Action dated Sep. 17, 2018, 12 pages.
European Patent Office Application Serial No. 15892665.9, Search Report dated Sep. 24, 2018, 9 pages.
Korean Intellectual Property Office Application No. 10-2015-0068698, Office Action dated Feb. 23, 2021, 5 pages.
PCT International Application No. PCT/KR2015/008759, Written Opinion of the International Searching Authority dated Feb. 18, 2016, 17 pages.
The State Intellectual Property Office of the People's Republic of China Application Serial No. 201580080164.2, Office Action dated May 18, 2020, 11 pages.
European Patent Office Application Serial No. 15892665.9, Office Action dated Jun. 24, 2020, 5 pages.
Korean Intellectual Property Office Application No. 10-2015-0068698, Office Action dated Aug. 4, 2021, 5 pages.

* cited by examiner

FIG. 21
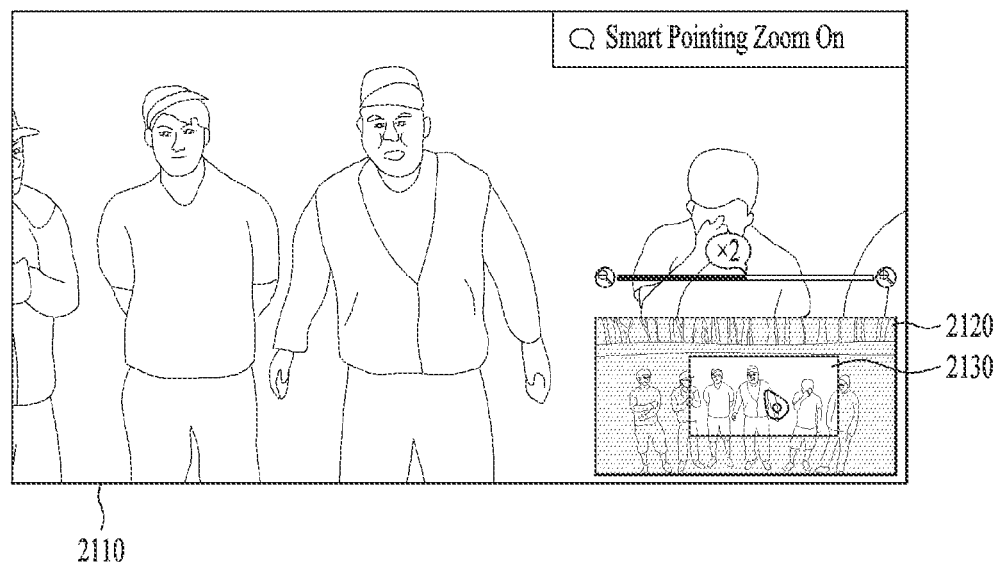
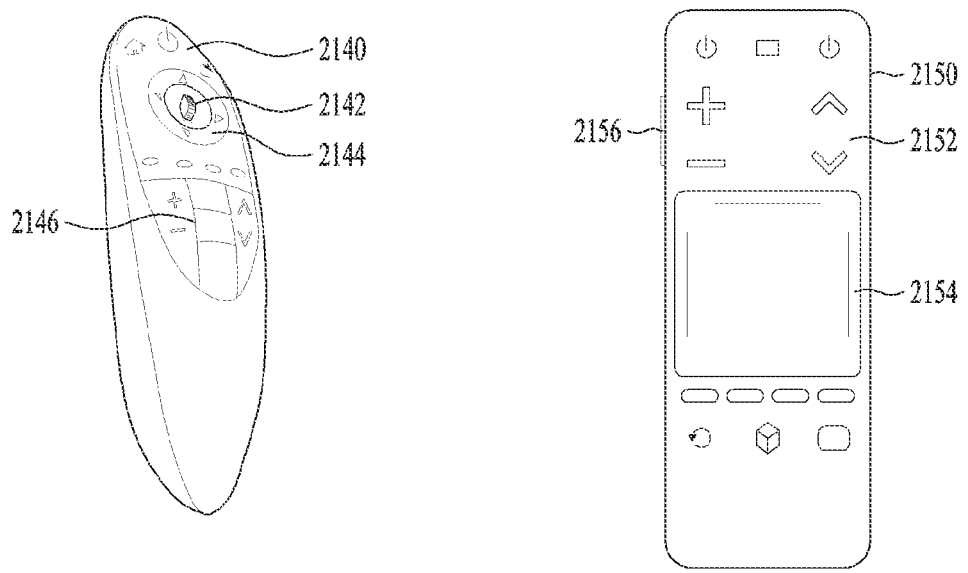

FIG. 27
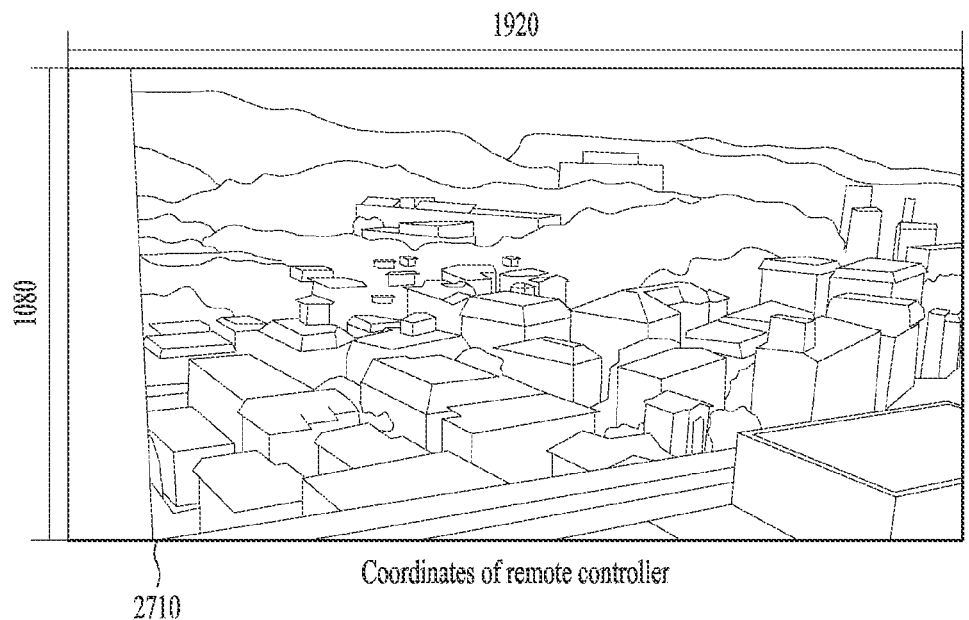
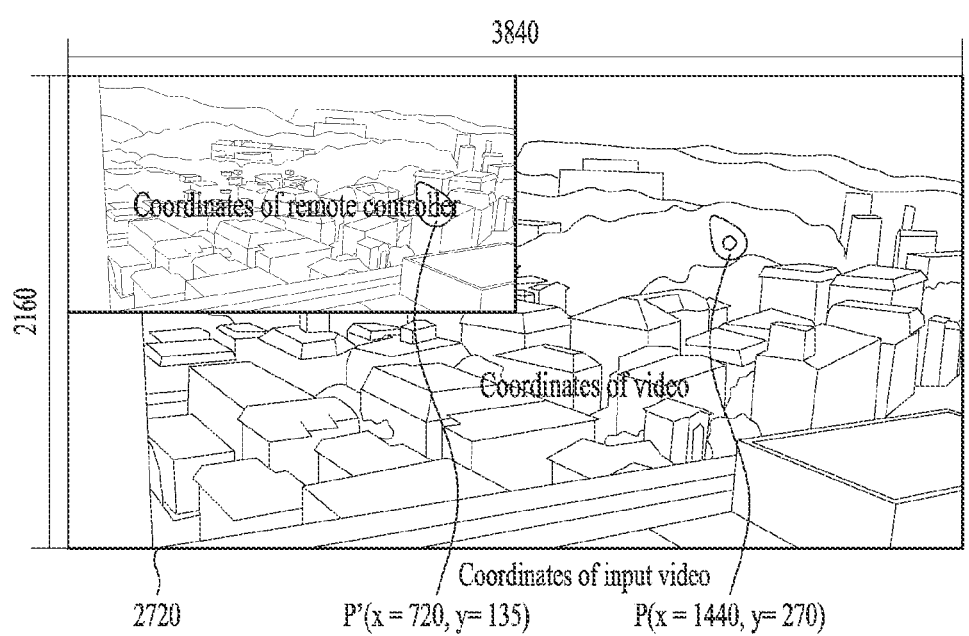

FIG. 28
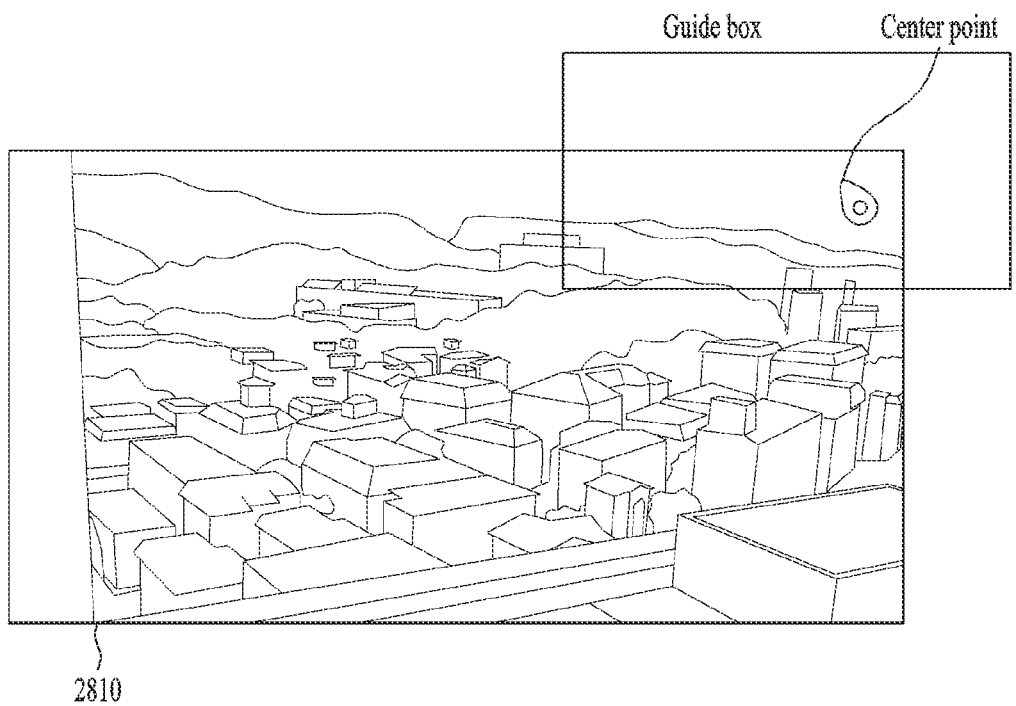
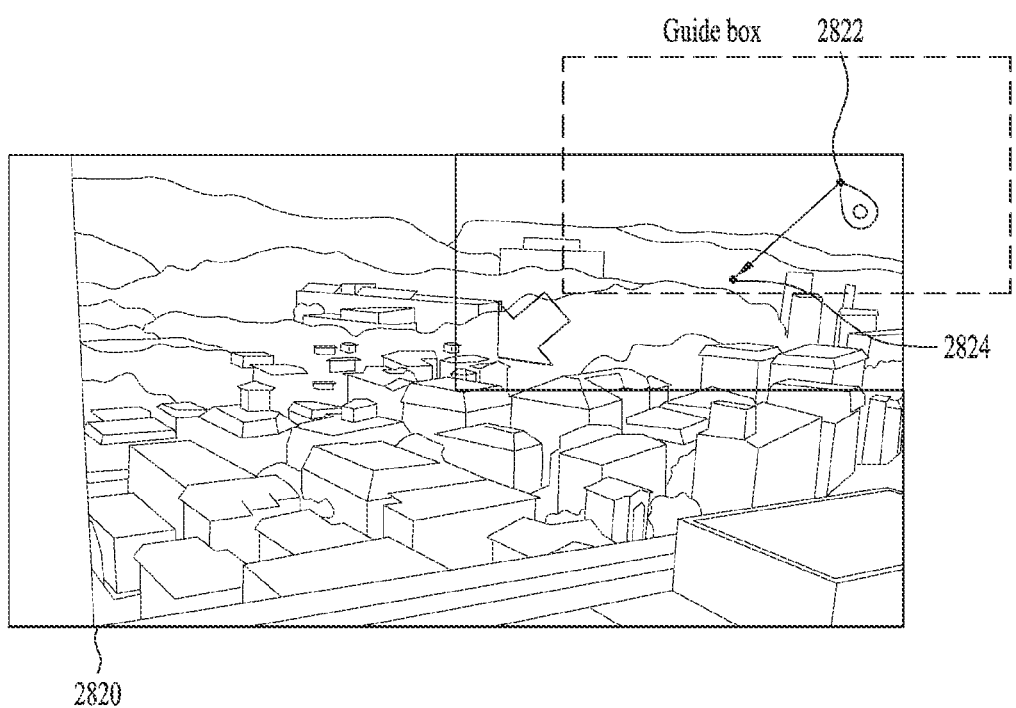

FIG. 29
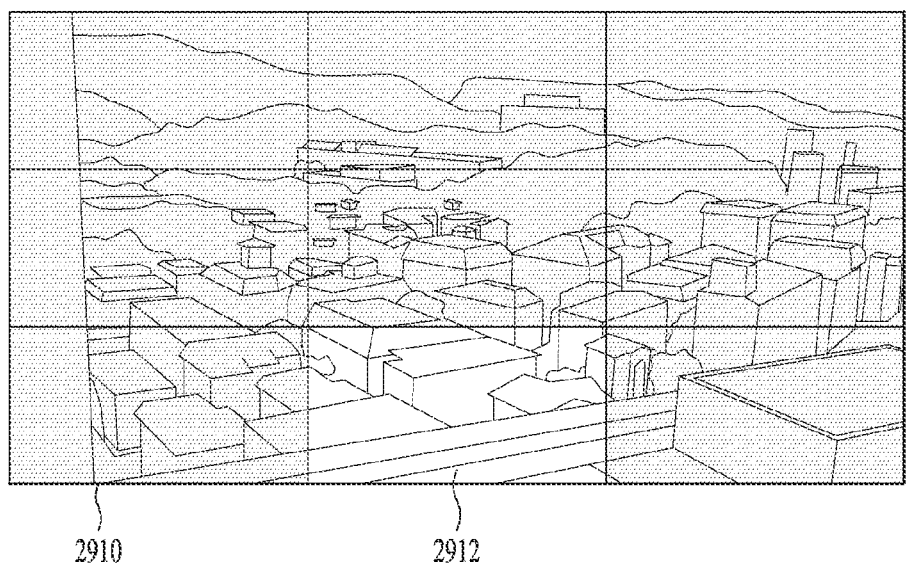
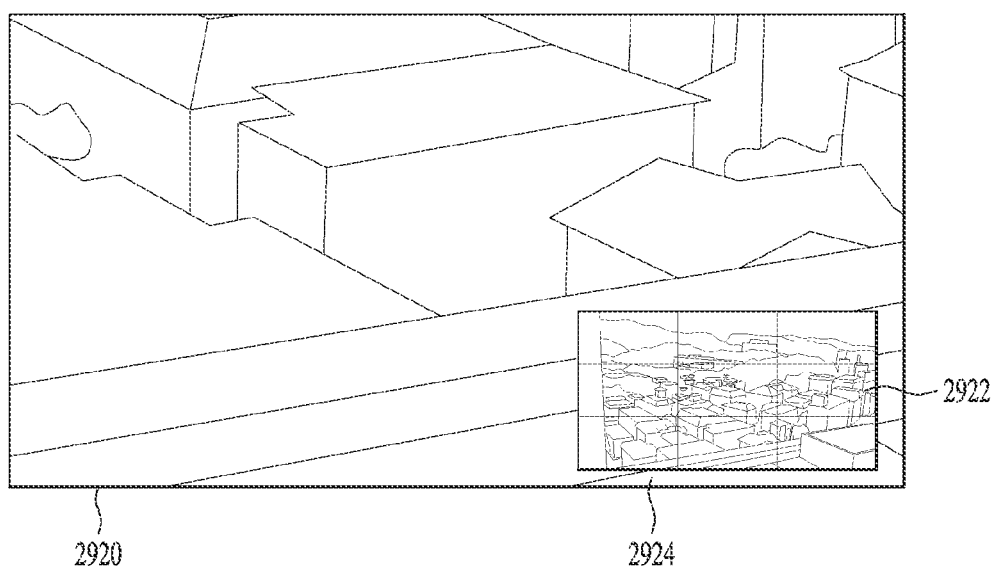

FIG. 31
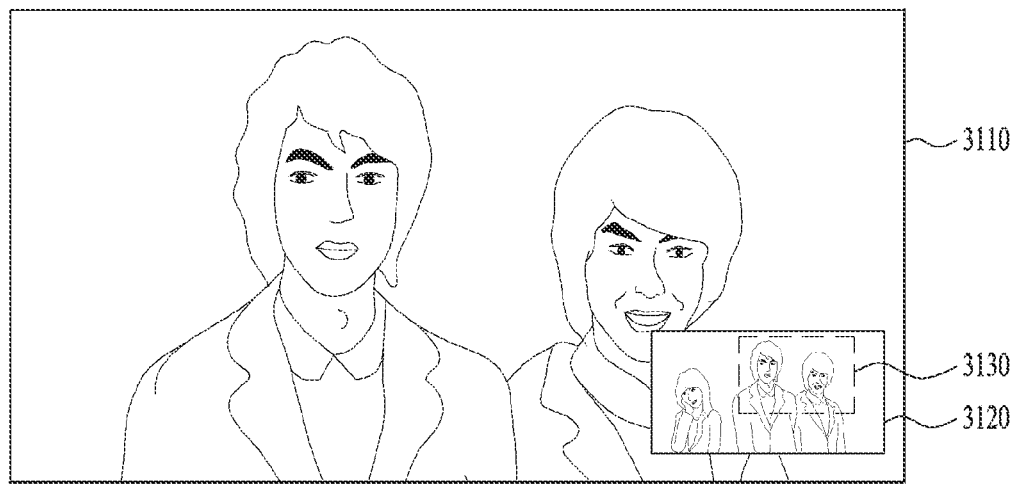
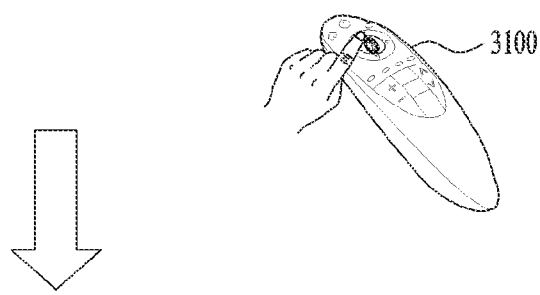
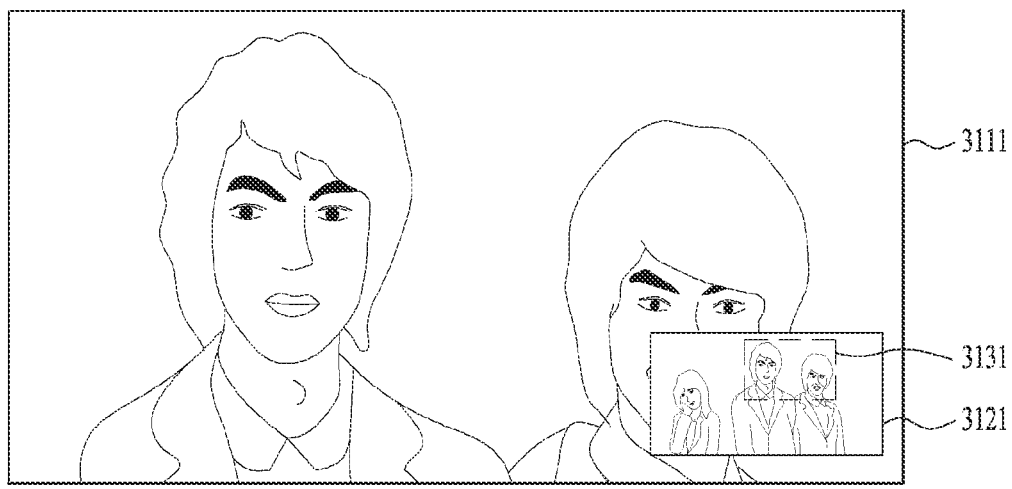

FIG. 33
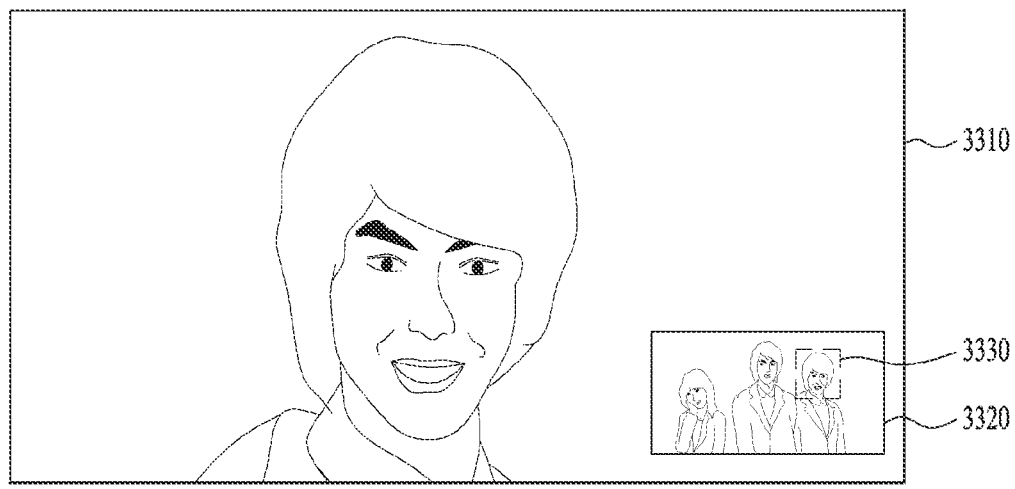
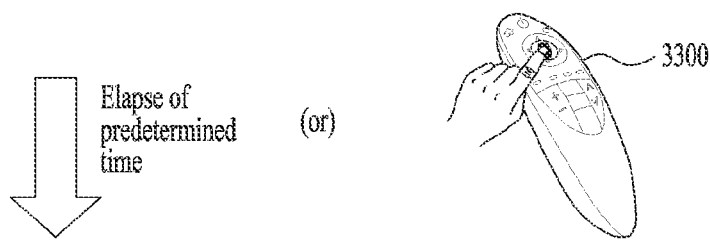
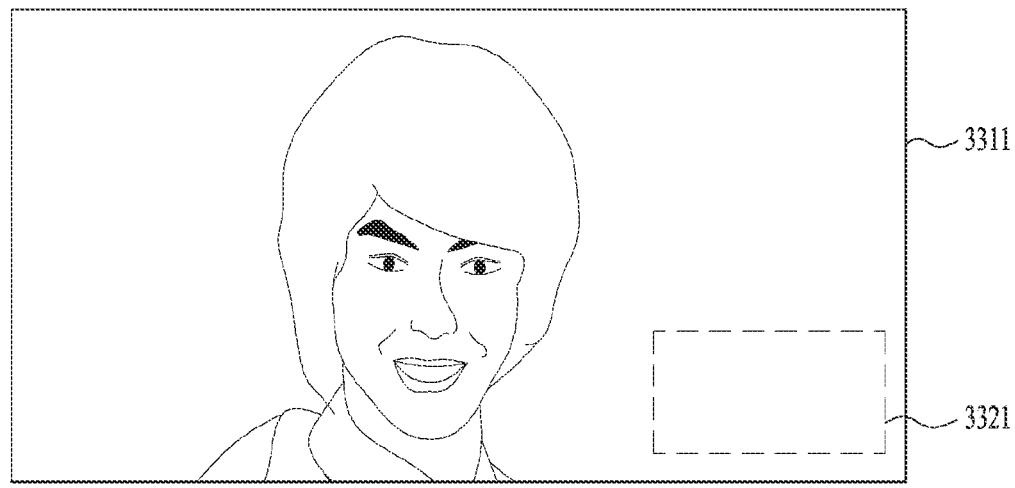

FIG. 34
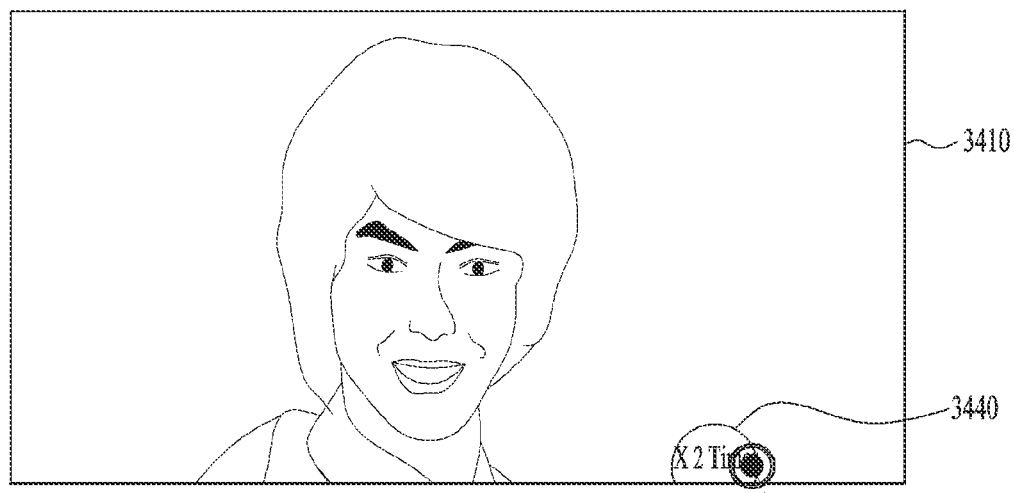
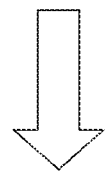
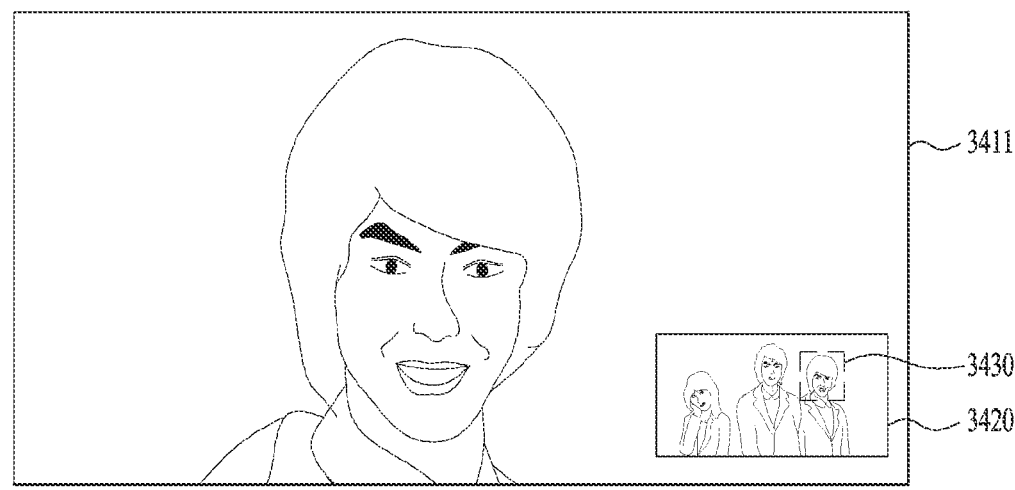

FIG. 37
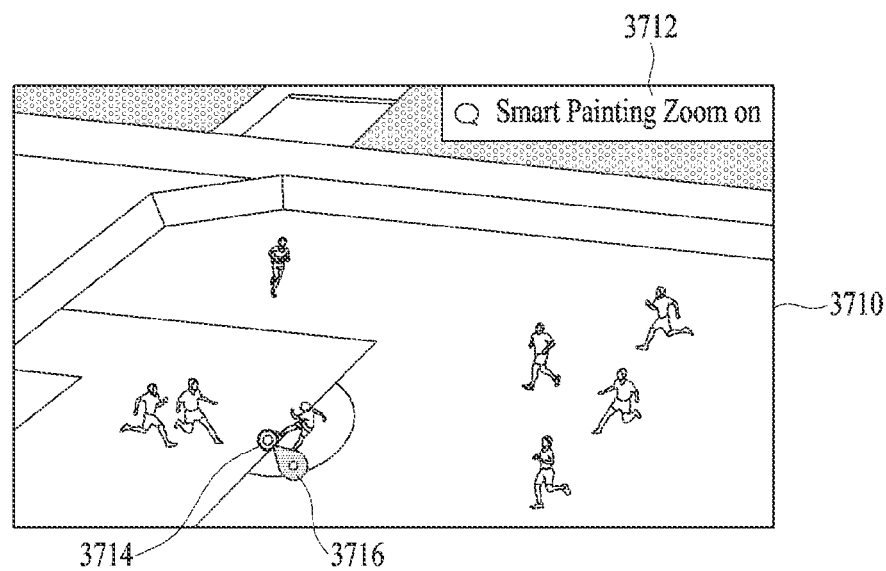
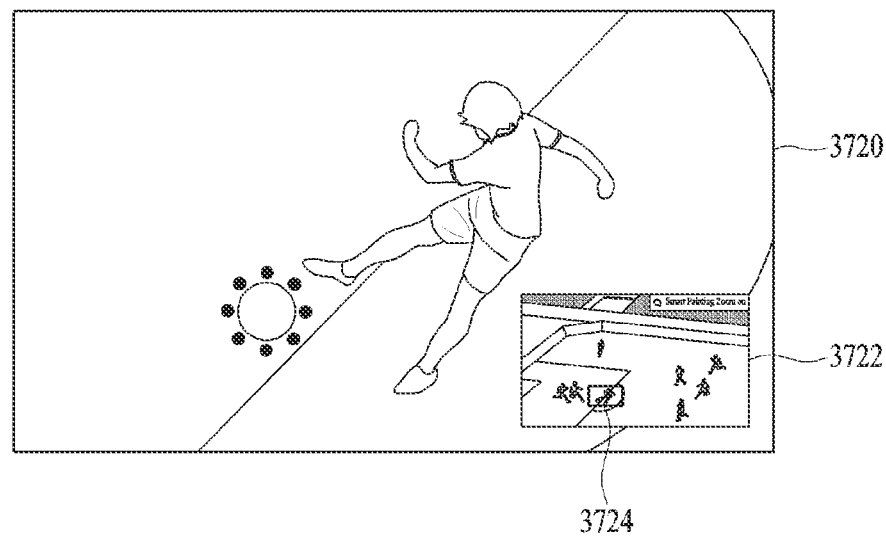

FIG. 38
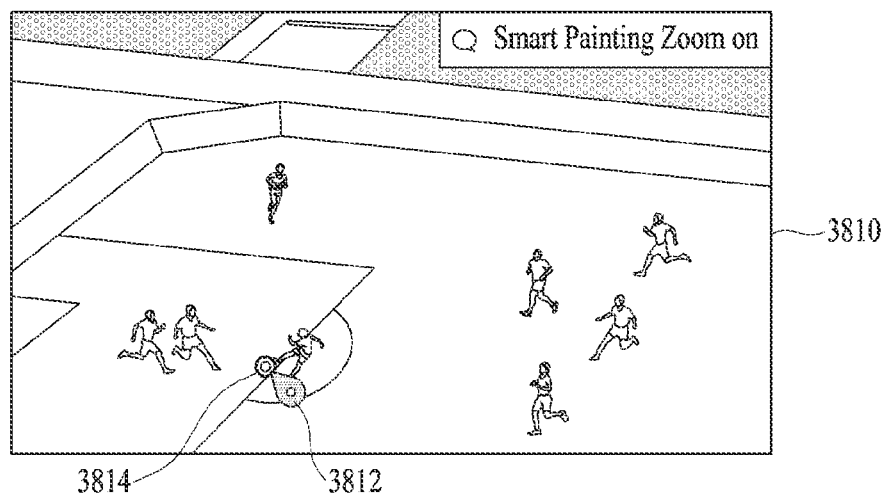
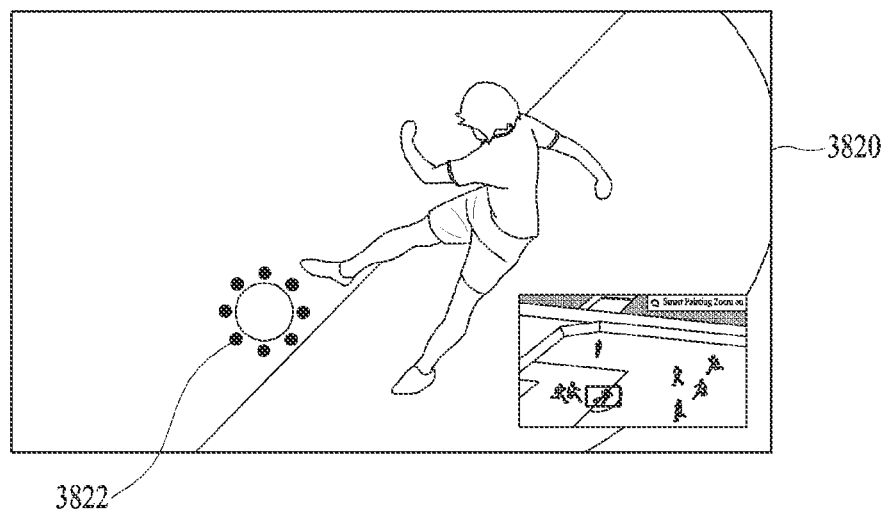

FIG. 39
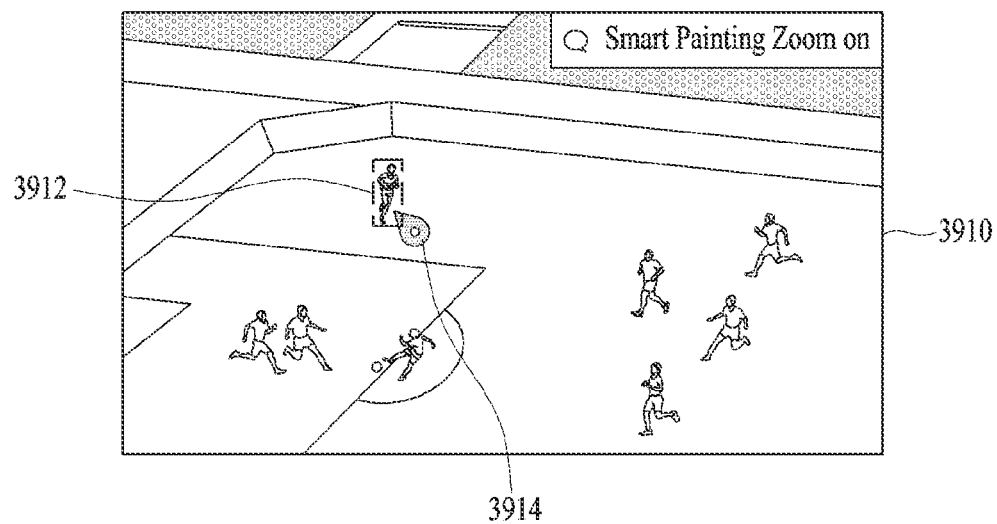
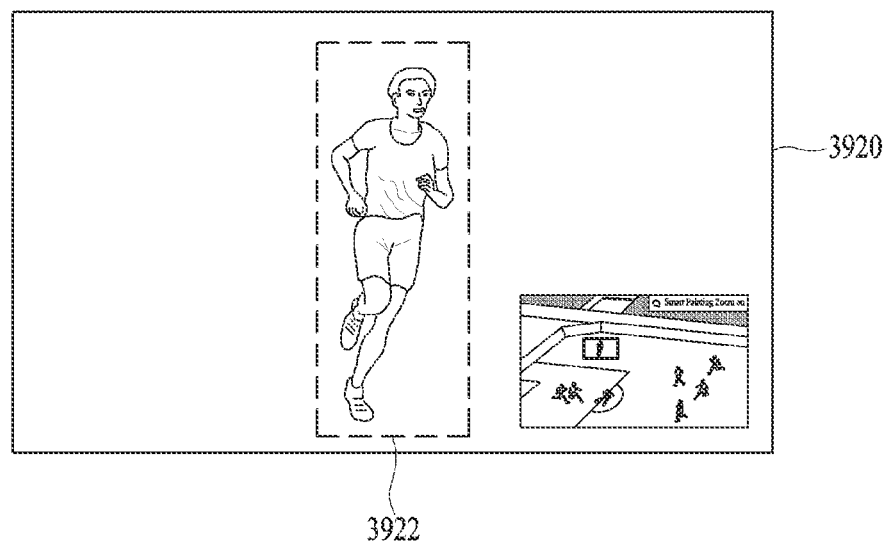

FIG. 42
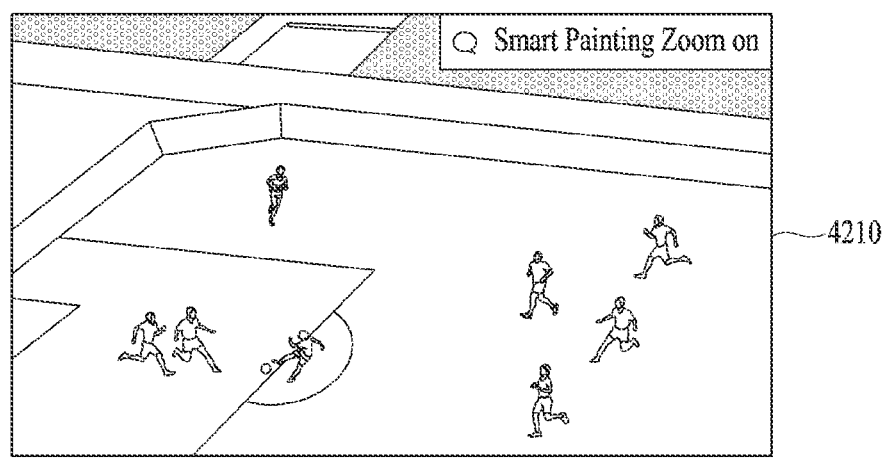
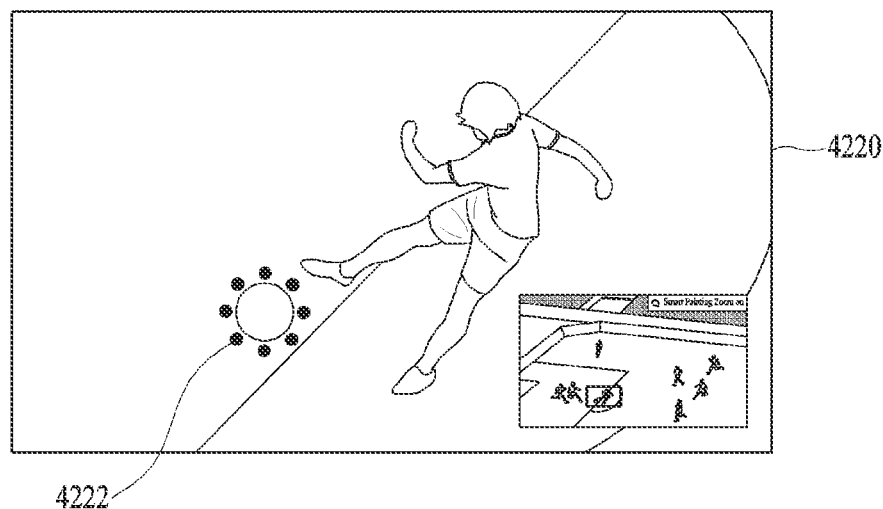

FIG. 45
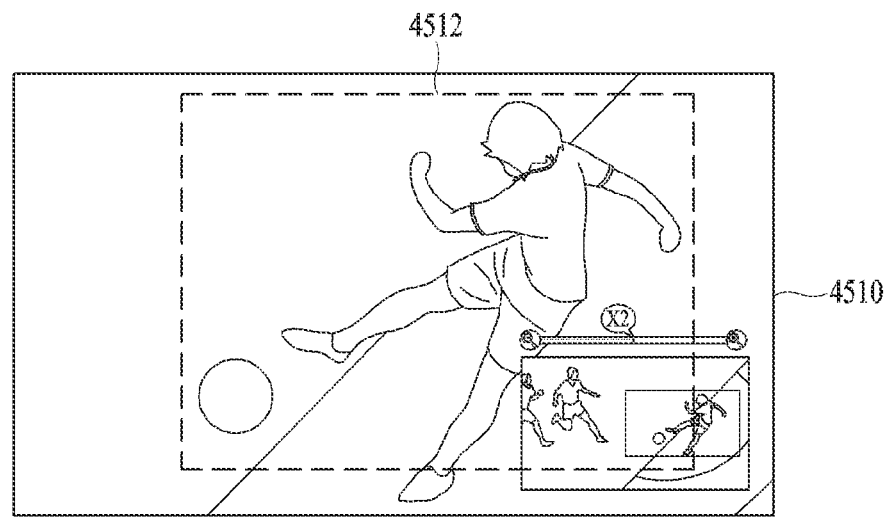
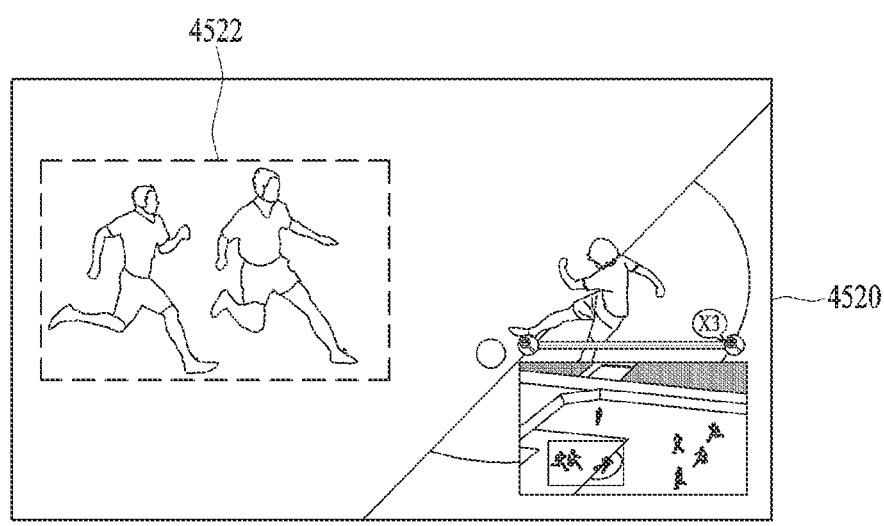

FIG. 46
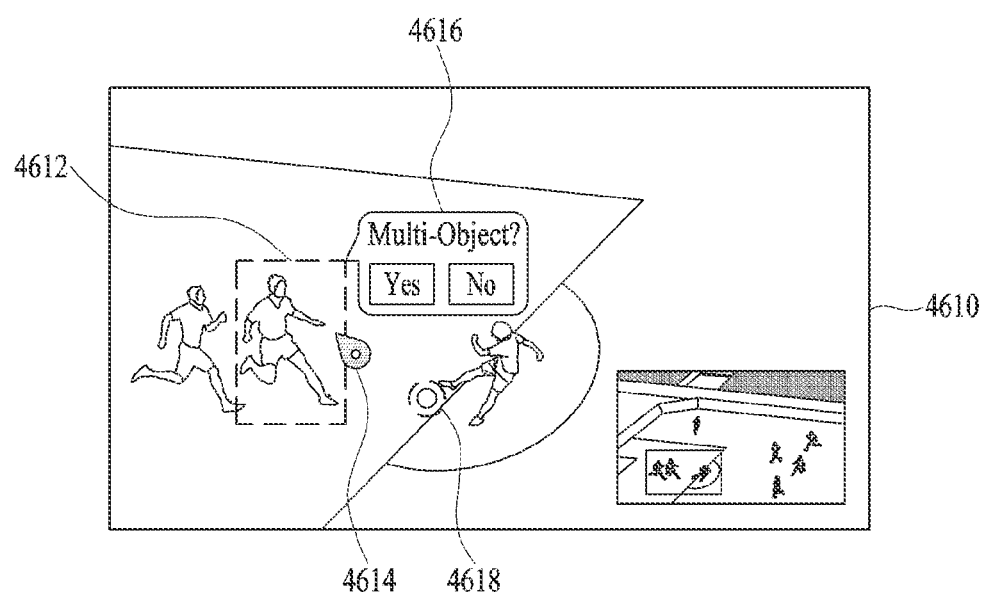
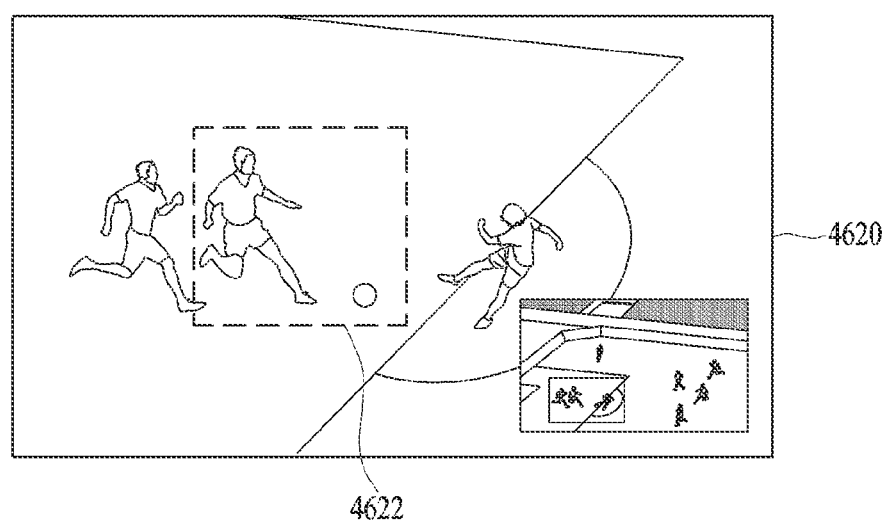

FIG. 47
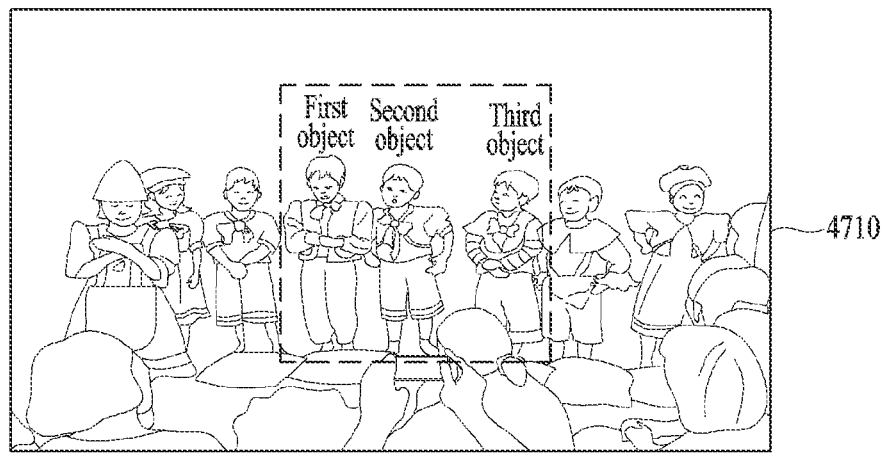
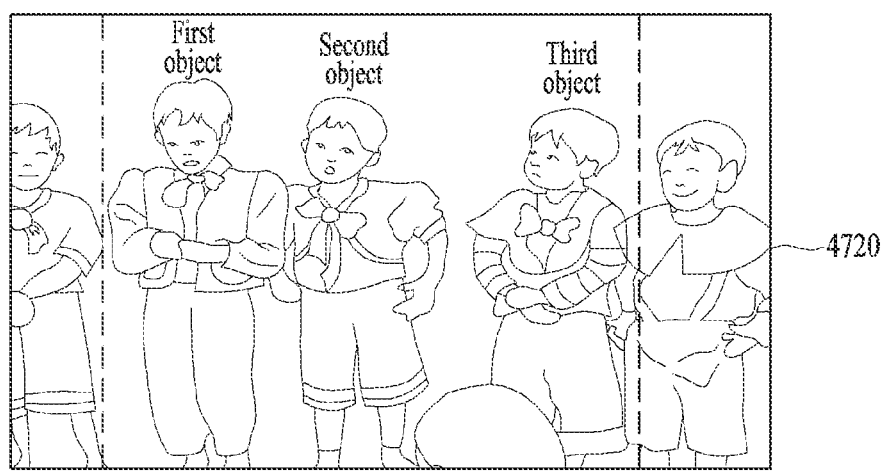

FIG. 48
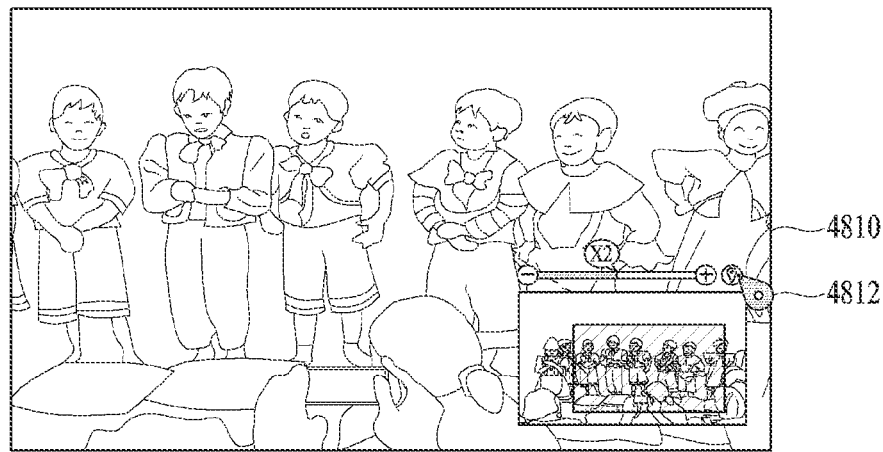
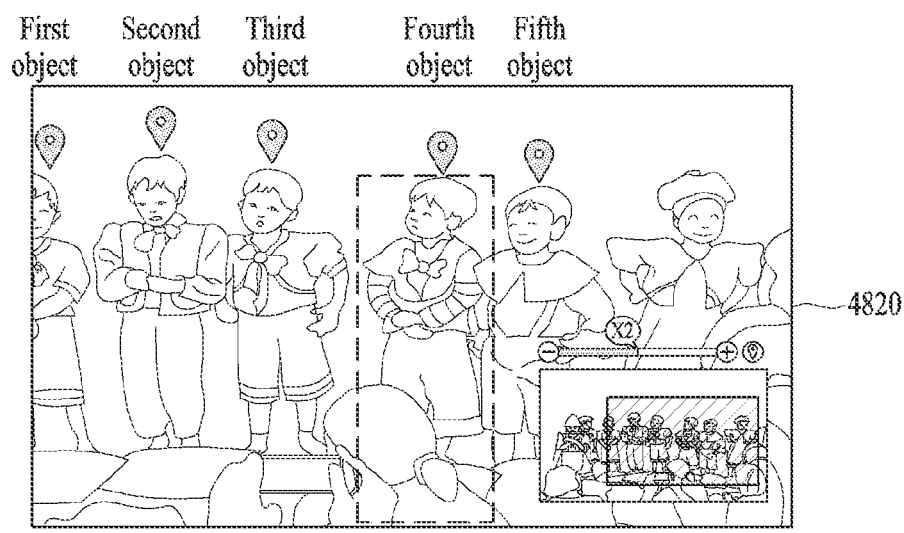

FIG. 49
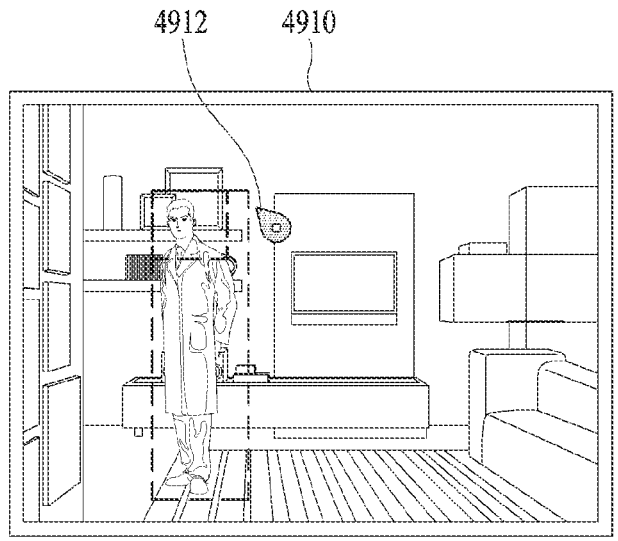
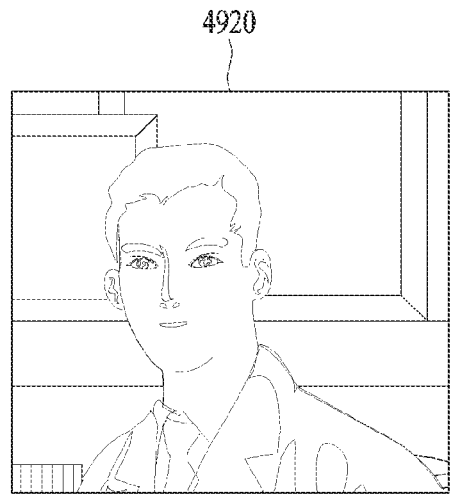
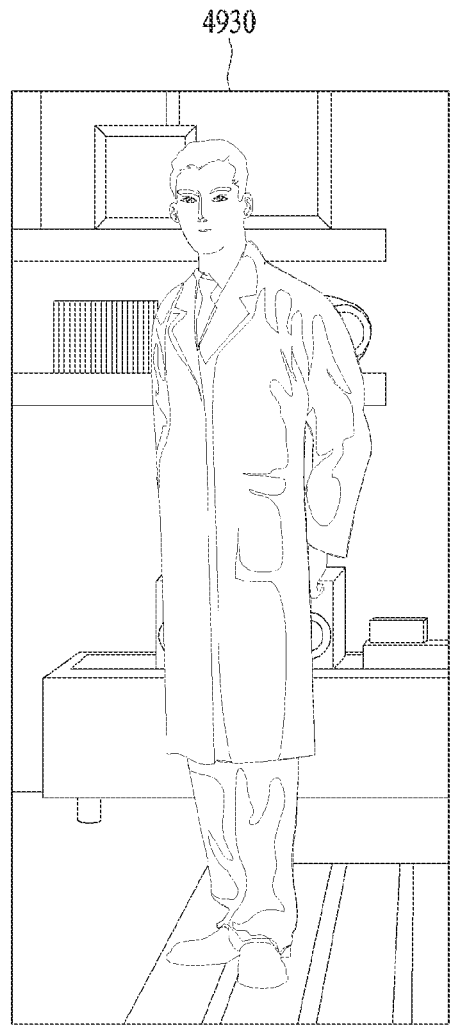

DISPLAY DEVICE AND CONTROL METHOD THEREFOR

CROSS-REFERENCE TO RELATED APPLICATIONS

This application is a continuation of U.S. patent application Ser. No. 15/573,806, filed on Nov. 13, 2017, which is the National Stage filing under 35 U.S.C. 371 of International Application No. PCT/KR2015/008759, filed on Aug. 21, 2015, which claims the benefit of earlier filing date and right of priority to Korean Application No. 10-2015-0068698, filed on May 18, 2015, the contents of which are all hereby incorporated by reference herein in their entirety.

TECHNICAL FIELD

The present invention relates to a display device and control method therefor, and more particularly, to a technique for specifying a specific object such as a ball in an image on a smart TV or an STB, enlarging a specific area including the specified object, and displaying the enlarged specific area.

BACKGROUND ART

Recently, a display device such as a smart TV has been used by many users. As the high-price customized content markets are extended and types thereof are diversified, the demands of the users for customizing images also increase.

In the related art, a function of detecting an object that a user desires to enlarge and watch has not been supported. Thus, when the user performs the screen enlargement function on a video such as sports where object movement frequently occurs, the zoom screen should be moved whenever a position of the object, which the user is interested in, is changed.

For example, when a user desires to watch a soccer game focusing on a soccer ball and enlarge a screen at the center of the ball on a sports channel broadcasting the soccer game, there may be a problem because the screen cannot be partially enlarged in the related art. That is, since when the ball moves, it is difficult to continuously trace the ball movement, the user may experience inconvenience.

DISCLOSURE OF THE INVENTION

Technical Task

In an embodiment of the present invention, provided are a display device for specifying a specific object such as a ball on a screen, enlarging a specific area including the specified object, and displaying the enlarged specific area by continuously tracing the area and control method therefor.

In another embodiment of the present invention, provided are a display device for enabling a user to easily specify an object by displaying a boundary of the object as a guide line when a point approaches the object and control method therefor.

In a further embodiment of the present invention, provided are a display device for displaying a specific object on the center of a screen by positioning the center of the specific object at the center of the screen even when a user inputs no command through a remote controller after checking a position of the specific object and control method therefor.

In a still further embodiment of the present invention, provided are a display device for performing a zoom-out operation, i.e., going back to the full screen when a displayed object moves out of a screen and displaying the object by zooming in on the object when the object appears again on the screen and control method therefor.

Technical Solutions

In an aspect of the present invention, provided herein is a method for controlling a display device, including: displaying a content including at least one object on a main screen of the display device; entering an enlargement mode in accordance with an input for requesting the enlargement mode received from a remote controller; receiving an input for selecting a specific object from among the at least one object displayed on the main screen from the remote controller; specifying the specific object in response to the received selection input; enlarging a specific area including the specific object, wherein the specific area is changed according to a location of the specific object; displaying a window including the content displayed on the main screen and displaying the enlarged specific area on the main screen; and displaying an indicator indicating the enlarged specific area within the displayed window, wherein the content corresponds to a video.

In another aspect of the present invention, provided herein is a display device, including: a display module configured to display a content including at least one object on a main screen of the display device; an interface module configured to receive an input for requesting enlargement and an input for selecting a specific object from among the at least one object displayed on the main screen from a remote controller; and a controller configured to control the display module and the interface module, wherein the controller is configured to enter an enlargement mode in accordance with the input for requesting the enlargement received from the remote controller, specify the specific object in response to the received selection input, enlarge a specific area including the specific object, wherein the specific area is changed according to a location of the specific object, display a window including the content displayed on the main screen, display the enlarged specific area on the main screen, and display an indicator indicating the enlarged specific area within the displayed window, and wherein the content corresponds to a video.

Advantageous Effects

According to an embodiment of the present invention, it is possible to specify a specific object such as a ball on a screen, enlarge a specific area including the specified object, and display the enlarged specific area by continuously tracing the area, thereby improving user convenience.

According to another embodiment of the present invention, when a point approaches an object, it is possible to enable a user to easily specify the object by displaying a boundary of the object as a guide line, thereby improving user convenience.

According to a further embodiment of the present invention, even when a user inputs no command through a remote controller after checking a position of a specific object, it is possible to display a specific object on the center of a screen by positioning the center of the specific object at the center of the screen, thereby improving user convenience.

According to a still further embodiment of the present invention, when a displayed object moves out of a screen, a zoom-out operation can be performed, i.e., the full screen can be displayed. Thereafter, when the object appears again on the screen, the object is displayed after zooming in. That is, it is possible to provide a smooth screen switching effect, thereby improving user convenience.

DESCRIPTION OF DRAWINGS

FIG. 21 is a diagram illustrating an example of controlling a screen using a remote controller when a specific area enlargement mode is activated according to an embodiment of the present invention.

FIG. 27 is a diagram illustrating a solution for a case in which coordinates from a remote controller do not match those of an input video according to an embodiment of the present invention.

FIG. 28 is a diagram illustrating a solution for a case in which a specific area to be enlarged is out of a video output range according to an embodiment of the present invention.

FIG. 29 is a diagram illustrating an example of dividing a screen into a prescribed number of partial screens, enlarging a selected screen if a user selects the screen from the divided screens, and displaying the enlarged screen when video data is outputted according to an embodiment of the present invention.

FIG. 31 is a diagram illustrating a process for adjusting a magnification ratio while a specific area enlargement mode is executed according to an embodiment of the present invention.

FIG. 33 is a diagram illustrating a process for eliminating a related indicator while a specific area enlargement mode is executed according to an embodiment of the present invention.

FIG. 34 is a diagram illustrating a process for displaying an eliminated related indicator again while a specific area enlargement mode is executed according to an embodiment of the present invention.

FIG. 37 is a diagram illustrating an example of specifying a specific object and tracing the specified object according to an embodiment of the present invention.

FIG. 38 is a diagram illustrating an example of representing a boundary of an object adjacent to a pointer as a dotted line when the pointer moves toward the object according to an embodiment of the present invention.

FIG. 39 is a diagram illustrating an example of representing a boundary of an object adjacent to a pointer as a dotted line when the pointer moves toward the object according to an embodiment of the present invention.

FIG. 42 is a diagram illustrating a case in which an object that moves out of a screen appears again according to an embodiment of the present invention.

FIG. 45 is a diagram illustrating an example of adjusting a zoom ratio and a position for each object according to an embodiment of the present invention.

FIG. 46 is a diagram illustrating an example of specifying multiple objects and tracing the specified multiple objects according to an embodiment of the present invention.

FIG. 47 is a diagram illustrating an example of specifying multiple objects and tracing the specified multiple objects according to an embodiment of the present invention.

FIG. 48 is a diagram illustrating an example of specifying any one among multiple objects and performing tracing with respect to the specified object according to an embodiment of the present invention.

FIG. 49 is a diagram illustrating an example in which when an object is a person, the object is divided according to parts of the body and a different magnification ratio is applied depending on the selected part according to an embodiment of the present invention.

BEST MODE FOR INVENTION

Figure 1:
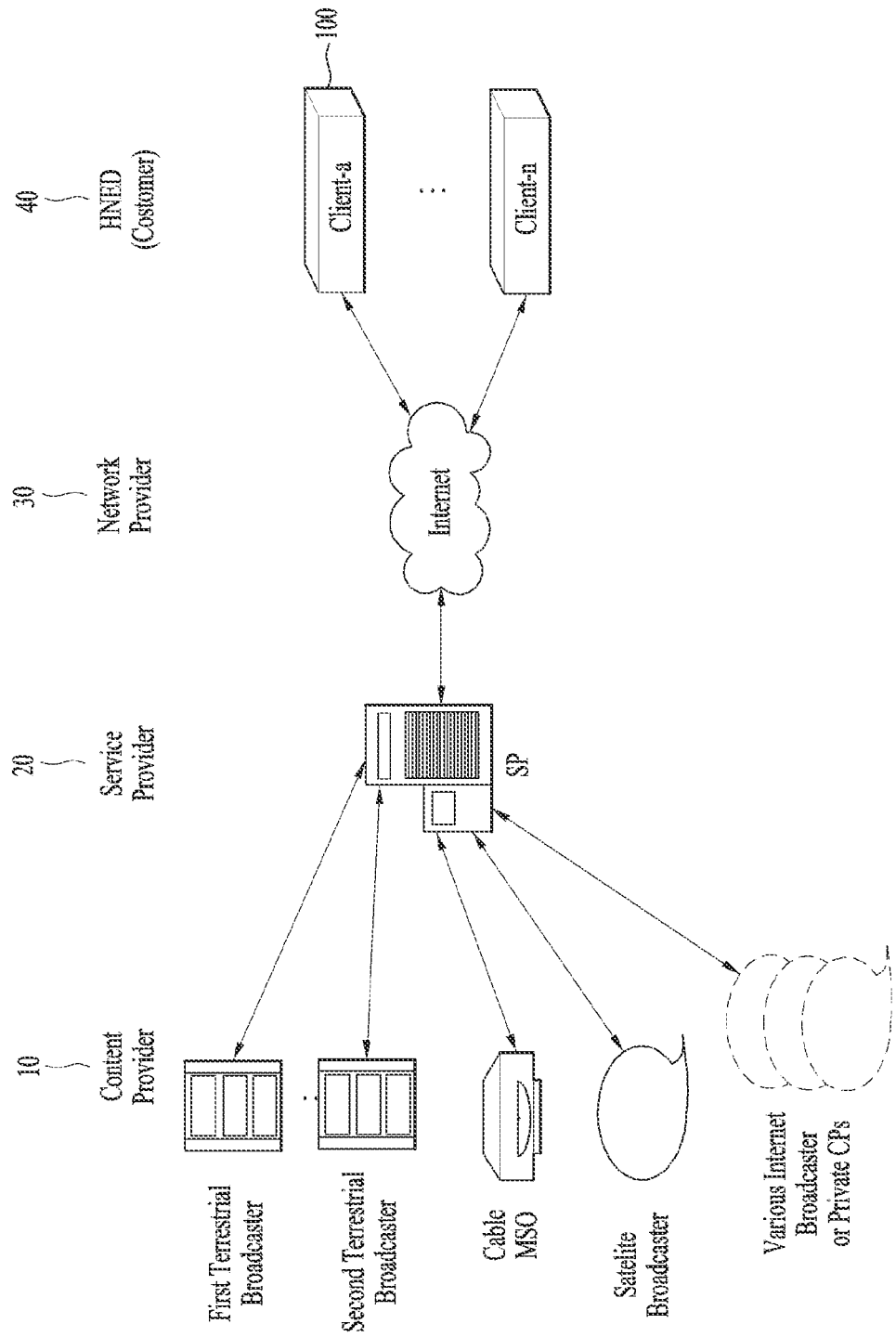
FIG. 1 is a schematic diagram for explaining a service system including a digital device according to an embodiment of the present invention.

Description will now be given in detail according to various embodiment(s) for a digital device and screen saver processing method therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first~', 'second~' and the like is provided to facilitate the description of the corresponding terminologies only, which is non-limited by such terminologies or ordinal numbers.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s).

Therefore, the digital device, for example, on the universal OS kernel, it is available to add and delete various applications and various functions can be performed.

In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission, reception, processing and output of data, content, service, application and the like for example. The digital device can be paired or connected (hereinafter 'paired') with another digital device, an external server and the like through wire/wireless network and transmit/receive prescribed data through the pairing. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (e.g., PDA (Personal Digital Assistant), Smart Phone, Tablet PC, Notebook, etc.). In the present specification, to help the understanding of the present invention and the clarity of the applicant's description, a digital TV and a mobile are shown as embodiments of digital devices in FIG. 2 and FIG. 3, respectively. A digital device described in the present specification may include a panel-only configuration, a configuration such as a set-top box (STB), or a single set configuration of device, system and the like.

Meanwhile, 'wire/wireless network' described in the present specification is a common name of a communication network supportive of various communication specifications and/or protocols for the paring or/and data transceiving between digital devices or between a digital device and an external server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote controller, etc.) to support at least one input or control means.

Besides, a digital device may use a standardized OS (operating system). Particularly, a digital device described in the present specification uses Web OS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding content and the like.

In the following description, the present invention is explained in detail with reference to attached drawings.

FIG. 1 is a schematic diagram illustrating a service system including a digital device according to one embodiment of the present invention.

Referring to FIG. 1, a service system may include a content provider (CP) 10, a service provider (SP) 20, a network provider (NP) 30, and a home network end user (HNED) (Customer) 40. The HNED 40 includes a client 100, that is, a digital device according to the present invention.

The CP 10 produces and provides various contents. Referring to FIG. 1, the CP 10 can include a terrestrial broadcaster, a cable system operator (SO), a multiple system operator (MSO), a satellite broadcaster, various Internet broadcasters, private content providers (CPs), etc. Meanwhile, the CP 10 can produce and provide various services, applications and the like as well as well as broadcast contents.

The SP 20 service-packetizes a content produced by the CP 10 and then provides it to the HNED 40. For instance, the SP 20 packetizes at least one of contents, which are produced by a first terrestrial broadcaster, a second terrestrial broadcaster, a cable MSO, a satellite broadcaster, various internet broadcasters, applications and the like, for a service and then provides it to the HNED 40.

The SP 20 can provide services to the client 100 in a uni-cast or multi-cast manner. Meanwhile, the SP 20 can collectively send data to a multitude of pre-registered clients 100. To this end, it is able to use IGMP (internet group management protocol) and the like.

The CP 10 and the SP 20 can be configured in the form of one entity. For example, the CP 10 can function as the SP 20 by producing a content, service-packetizing the produced content, and then providing it to the HNED 40, and vice versa.

The NP 30 provides a network environment for data exchange between the CP 10 and/or the SP 20 and the client 100.

The client 100 is a consumer belonging to the HNED 40. The client 100 may receive data by establishing a home network through the NP 30 for example and transmit/receive data for various services (e.g., VoD, streaming, etc.), applications and the like.

The CP 10 or/and the SP 20 in the service system may use a conditional access or content protection means for the protection of a transmitted content. Hence, the client 100 can use a processing means such as a cable card (CableCARD) (or POD (point of deployment) or a downloadable CAS (DCAS), which corresponds to the conditional access or the content protection.

In addition, the client 100 may use an interactive service through a network as well. In this case, the client 100 can directly serve as a content provider. And, the SP 20 may receive and transmit it to another client or the like.

In FIG. 1, the CP 10 or/and the SP 20 may be a service providing server that will be described later in the present specification. In this case, the server may mean that the NP 30 is owned or included if necessary. In the following description, despite not being specially mentioned, a service or a service data includes an internal service or application as well as a service or application received externally, and such a service or application may mean a service or application data for the Web OS based client 100.

Figure 2:
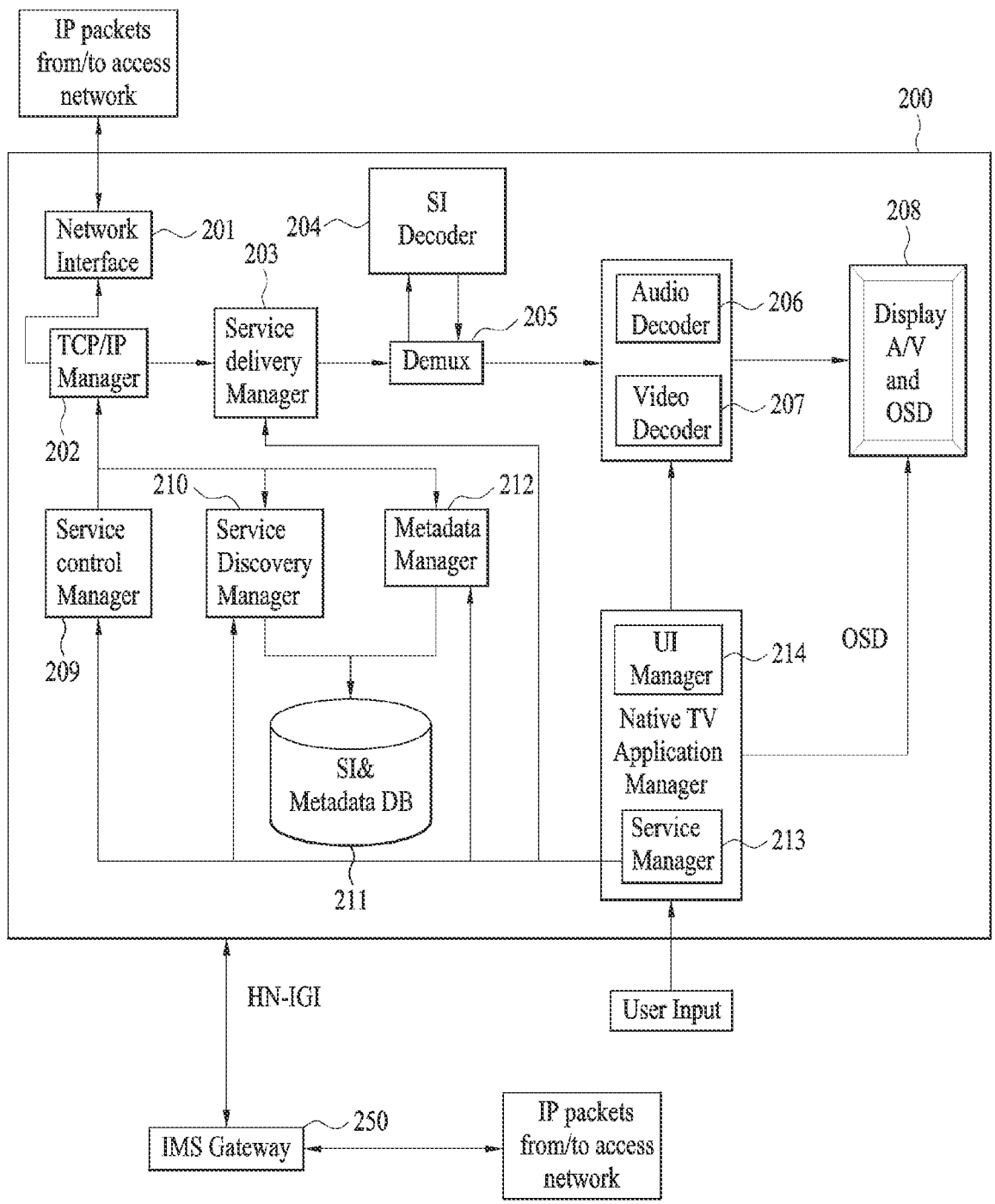
FIG. 2 is a block diagram for explaining a digital device according to an embodiment of the present invention.

FIG. 2 is a block diagram showing a digital device according to one embodiment of the present invention.

In the following, a digital device mentioned in the present specification may correspond to the client 100 shown in FIG. 1.

The digital device 200 may include a network interface 201, a TCP/IP manager 202, a service delivery manager 203, an SI decoder 204, a demux or demultiplexer 205, an audio decoder 206, a video decoder 207, a display A/V and OSD (On Screen Display) module 208, a service control manager 209, a service discovery manager 210, a SI & metadata database (DB) 211, a metadata manager 212, a service manager 213, a UI manager 214, etc.

The network interface 201 may transmit/receive IP (interne protocol) packet(s) or IP datagram(s) (hereinafter named IP pack(s)) through an accessed network. For instance, the network interface 201 may receive services, applications, contents and the like from the service provider 20 shown in FIG. 1 through a network.

The TCP/IP manager 202 may involve delivery of IP packets transmitted to the digital device 200 and IP packets transmitted from the digital device 200, that is, packet delivery between a source and a destination. The TCP/IP manager 202 may classify received packet(s) according to an appropriate protocol and output the classified packet(s) to the service delivery manager 205, the service discovery manager 210, the service control manager 209, the metadata manager 212, and the like.

The service delivery manager 203 may be in charge of controlling the received service data. The service delivery manager 203 may control real-time streaming data, for example, using RTP/RTCP. In case of transmitting the real-time streaming data using RTP, the service delivery manager 203 may parse the received data packet according to the RTP and then transmits the parsed data packet to the demultiplexer 205 or save the parsed data packet to the SI & metadata DB 211 under the control of the service manager 213. The service delivery manager 203 may feed back the network reception information to the service providing server side using RTCP.

The demultiplexer 205 may demultiplex a received packet into audio data, video data, SI (system information) data and the like and then transmit the demultiplexed data to the audio/video decoder 206/207 and the SI decoder 204, respectively.

The SI decoder 204 may decode the demultiplexed SI data, i.e., service informations of PSI (Program Specific Information), PSIP (Program and System Information Protocol), DVB-SI (Digital Video Broadcasting-Service Information), DTMB/CMMB (Digital Television Terrestrial Multimedia Broadcasting/Coding Mobile Multimedia Broadcasting), etc. And, the SI decoder 204 may save the decoded service informations to the SI & metadata DB 211. The saved service information can be used by being read by a corresponding component in response to a user's request for example.

The audio decoder 206 and the video decoder 207 may decode the demultiplexed audio data and the demultiplexed video data, respectively. The decoded audio and video data may be provided to the user through the display unit 208.

The application manager includes a service manager 213 and a user interface (UI) manager 214 and is able to perform a function of a controller of the digital device 200. So to speak, the application manager can administrate the overall states of the digital device 200, provide a user interface (UI), and manage other mangers.

The UI manager 214 provides a graphical user interface/user interface (GUI/UI) using OSD (on screen display) and the like. The UI manager 214 receives a key input from a user and then performs a device operation according to the input. For instance, if receiving a key input about a channel selection from a user, the UI manager 214 transmits the key input signal to the service manager 213.

The service manager 213 may control and manage service-related managers such as the service delivery manager 203, the service discovery manager 210, the service control manager 209, and the metadata manager 212.

The service manager 213 creates a channel map and controls a selection of a channel and the like using the created channel map in response to a key input received from the UI manager 214. The service manager 213 may receive service information from the SI decoder 204 and then sets an audio/video PID of a selected channel for the demultiplexer 205. Such a PID can be used for the demultiplexing procedure. Therefore, the demultiplexer 205 performs filtering (PID or section filtering) on audio data, video data and SI data using the PID.

The service discovery manager 210 may provide information required to select a service provider that provides a service. Upon receipt of a signal for selecting a channel from the service manager 213, the service discovery manager 210 searches for a service using the information.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service. The RTSP protocol can provide a trick mode for real-time streaming. And, the service control manager 209 may initialize and manage a session through the IMS gateway 250 using IMS (IP multimedia subsystem) and SIP (session initiation protocol). The protocols are exemplary, and other protocols are usable according to implementations.

The metadata manager 212 may manage metadata associated with services and save the metadata to the SI & metadata DB 211.

The SI & metadata DB 211 may store service information decoded by the SI decoder 204, metadata managed by the metadata manager 212, and information required to select a service provider, which is provided by the service discovery manager 210. In addition, the SI & metadata DB 211 can store system set-up data and the like for the system.

The SI & metadata database 211 may be implemented with non-volatile RAM (NVRAM), flash memory and the like.

Meanwhile, an IMS gateway 250 is a gateway in which functions required for an access to an IMS based IPTV service are collected.

Figure 3:
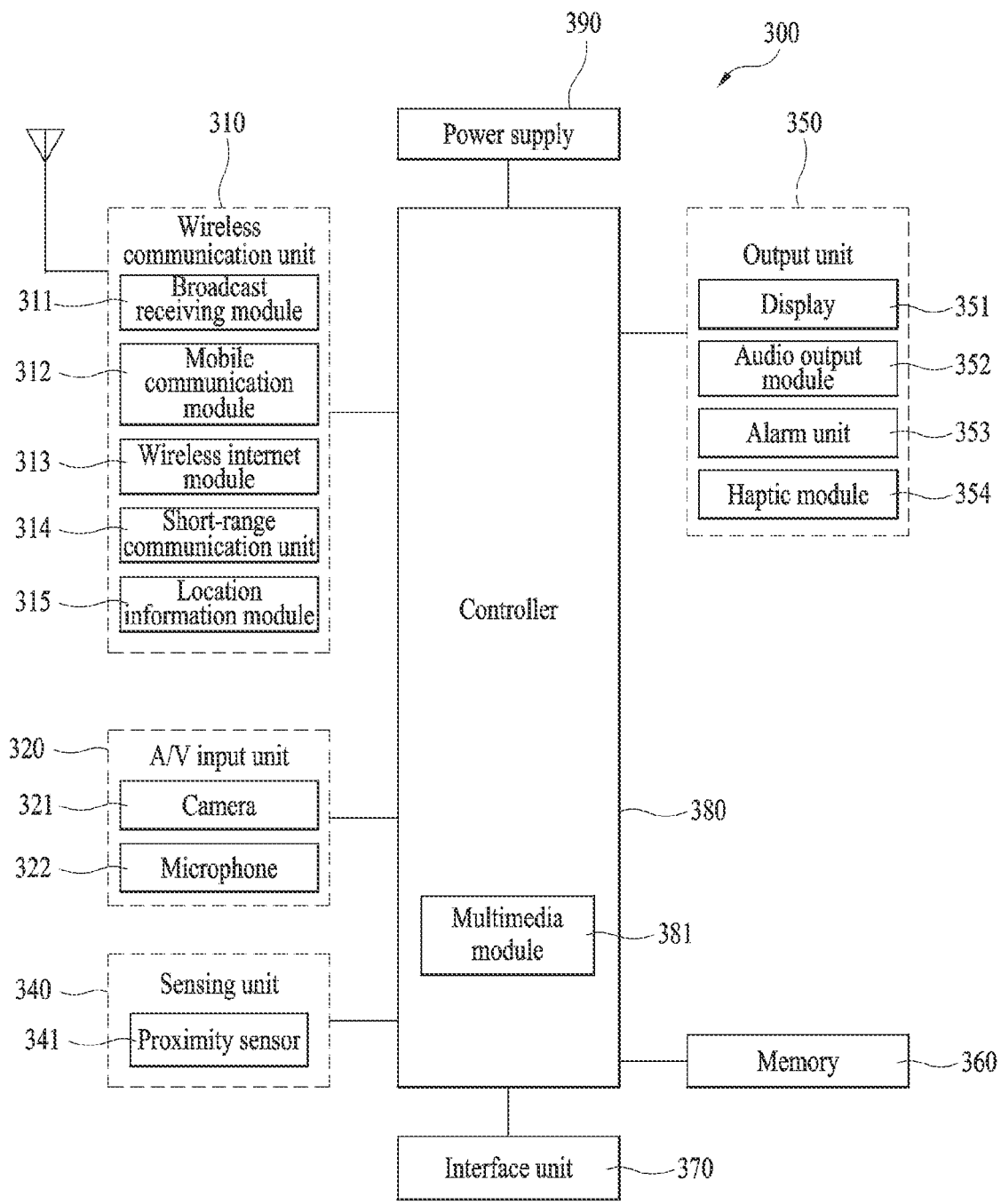
FIG. 3 is a block diagram for explaining a digital device according to another embodiment of the present invention.

FIG. 3 is a block diagram to describe a digital device according to another embodiment of the present invention.

The former description with reference to FIG. 2 is made by taking a standing device as one embodiment of a digital device. And, FIG. 3 uses a mobile device as another embodiment of a digital device.

Referring to FIG. 3, the mobile device 300 includes a wireless communication unit 310, an A/V (audio/video) input unit 320, a user input unit 330, a sensing unit 340, an output unit 350, a memory 360, an interface unit 370, a controller 380, a power supply unit 390, etc.

The respective components are described in detail as follows.

The wireless communication unit 310 typically includes one or more modules which permit wireless communication between the mobile device 300 and a wireless communication system or network within which the mobile device 300 is located. For instance, the wireless communication unit 310 can include a broadcast receiving module 311, a mobile communication module 312, a wireless Internet module 313, a short-range communication module 314, a location information module 315, etc.

The broadcast receiving module 311 receives a broadcast signal and/or broadcast associated information from an external broadcast managing server via a broadcast channel. The broadcast channel may include a satellite channel and a terrestrial channel. The broadcast managing server may mean a server generating to send a broadcast signal and/or broadcast associated information or a server receiving to send a pre-generated broadcast signal and/or broadcast associated information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms, e.g., an electronic program guide (EPG), an electronic service guide (ESG), and the like.

The broadcast receiving module 311 may be configured to receive digital broadcast signals using broadcasting systems such as ATSC, DVB-T (Digital Video Broadcasting-Terrestrial), DVB-S (Satellite), MediaFLO (Media Forward Link Only), DVB-H (Handheld), ISDB-T (Integrated Services Digital Broadcast-Terrestrial), and the like. Optionally, the broadcast receiving module 311 can be configured to be suitable for other broadcasting systems as well as the above-noted digital broadcasting systems.

The broadcast signal and/or broadcast associated information received by the broadcast receiving module 311 may be saved to the memory 360.

The mobile communication module 312 transmits/receives wireless signals to/from at least one of a base station, an external terminal, and a server via a mobile network. Such wireless signals may carry audio signals, video signals, and data of various types according to transceived text/multimedia messages.

The wireless Internet module 313 includes a module for wireless Internet access and may be internally or externally coupled to the mobile device 300. The wireless Internet technology can include WLAN (Wireless LAN) (Wi-Fi), Wibro (Wireless broadband), Wimax (World Interoperability for Microwave Access), HSDPA (High Speed Downlink Packet Access), and the like.

The short-range communication module 314 is a module for short-range communications. Suitable technologies for implementing this module include Bluetooth, radio frequency identification (RFID), infrared data association (IrDA), ultra-wideband (UWB), ZigBee, RS-232, RS-485 and the like.

The location information module 315 is a module for obtaining location information of the mobile terminal 100. And, this module may be implemented with a global positioning system (GPS) module for example.

The audio/video (A/V) input unit 320 is configured to provide audio or video signal input. The A/V input unit 320 may include a camera 321, a microphone 322 and the like. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or transmitted externally via the wireless communication unit 310. Optionally, at least two cameras 321 can be provided according to the environment of usage.

The microphone 322 receives an external audio signal in call mode, recording mode, voice recognition mode, or the like. This audio signal is processed and converted into electrical audio data. The processed audio data is transformed into a format transmittable to a mobile communication base station via the mobile communication module 312 in call mode. The microphone 322 typically includes assorted noise cancelling algorithms to cancel noise generated in the course of receiving the external audio signal.

The user input unit 330 generates input data for a user to control an operation of the terminal. The user input unit 330 may include a keypad, a dome switch, a touchpad (e.g., static pressure/capacitance), a jog wheel, a jog switch, and/or the like.

The sensing unit 340 generates sensing signals for controlling operations of the mobile device 300 using status measurements of various aspects of the mobile terminal. For instance, the sensing unit 340 may detect an open/closed status of the mobile device 300, a location of the mobile device 300, an orientation of the mobile device 300, a presence or absence of user contact with the mobile device 300, an acceleration/deceleration of the mobile device 300, and the like. For example, if the mobile device 300 is moved or inclined, it is able to sense a location or inclination of the mobile device. Moreover, the sensing unit 340 may sense a presence or absence of power provided by the power supply unit 390, a presence or absence of a coupling or other connection between the interface unit 370 and an external device, and the like. Meanwhile, the sensing unit 340 may include a proximity sensor 341 such as NFC (near field communication) and the like.

The output unit 350 generates output relevant to the senses of vision, hearing and touch, and may include the display 351, an audio output module 352, an alarm unit 353, a haptic module 354, and the like.

The display 351 is typically implemented to visually display (output) information processed by the mobile device 300. For instance, if the mobile terminal is operating in phone call mode, the display will generally provide a user interface (UI) or graphical user interface (GUI) related to a phone call. For another instance, if the mobile device 300 is in video call mode or photographing mode, the display 351 may display photographed or/and received images or UI/GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile device 300 may include one or more of such displays.

Some of the displays can be implemented in a transparent or optical transmittive type, which can be called a transparent display. A representative example of the transparent display is the TOLED (transparent OLED). A rear configuration of the display 351 can be implemented as the optical transmittive type as well. In this configuration, a user may be able to see an object located in rear of a terminal body through a region occupied by the display 351 of the terminal body.

Two or more displays 351 can be provided to the mobile device 300 in accordance with an implementation type of the mobile device 300. For instance, a plurality of displays can be disposed on the mobile device 300 in a manner of being spaced apart from a single face or being integrally formed on a single face. Alternatively, a plurality of displays may be disposed on different faces of the mobile device 300, respectively.

If the display 351 and a sensor (hereinafter called 'touch sensor') for detecting a touch action configure a mutual layer structure, the display 351 is usable as an input device as well as an output device. In this case, the touch sensor can be configured with a touch film, a touch sheet, a touchpad, or the like.

The touch sensor can be configured to convert a pressure applied to a specific portion of the display 351 or a variation of capacitance generated from a specific portion of the display 351 into an electrical input signal. Moreover, the touch sensor is configurable to detect pressure of a touch as well as a touched position or size.

If a touch input is applied to the touch sensor, signal(s) corresponding to the touch input is transferred to a touch controller. The touch controller processes the signal(s) and then transfers the processed signal(s) to the controller 380. Therefore, the controller 380 is able to know whether a prescribed portion of the display 351 is touched.

A proximity sensor 341 can be disposed on an inner region of the mobile device enclosed by the touchscreen or near the touchscreen. The proximity sensor is a sensor that detects a presence or non-presence of an object approaching a prescribed detecting surface or an object existing around the proximity sensor using an electromagnetic field strength or infrared ray without mechanical contact. Hence, the proximity sensor is more durable than a contact type sensor and also has utility higher than that of the contact type sensor.

The proximity sensor may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor, etc. If the touch screen includes the electrostatic capacity proximity sensor, it is configured to detect the proximity of a pointer using a variation of an electric field according to the proximity of the pointer. In this configuration, the touchscreen (or touch sensor) can be sorted into a proximity sensor.

For clarity and convenience of explanation, an action for enabling the pointer approaching the touch screen to be recognized as placed on the touch screen may be named 'proximity touch' and an action of enabling the pointer to actually come into contact with the touch screen may be named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or stored in the memory 360. During operation, the audio output module 352 may output an audio signal related to a function (e.g., call received, message received) executed in the mobile device 300. The audio output module 352 may include a receiver, a speaker, a buzzer and the like.

The alarm unit 353 outputs a signal for announcing the occurrence of an event of the mobile device 300. Typical events occurring in the mobile device may include a call signal received, a message received, a touch input received, and the like. The alarm unit 353 may output a signal for announcing the event occurrence by way of vibration as well as video or audio signal. The video or audio signal can be outputted via the display 351 or the audio output module 352. Hence, the display 351 or the audio output module 352 can be sorted into a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence. The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, two or more haptic modules 354 can be provided to the mobile device 300 in accordance with a configuration type of the mobile device 300.

The memory 360 may store a program for an operation of the controller 380, or may temporarily store inputted/outputted data (e.g., phonebook, message, still image, video, etc.). And, the memory 360 may store data of vibrations and sounds of various patterns outputted in response to a touch input to the touchscreen.

The memory 360 may be implemented using any type or combination of suitable volatile and non-volatile memory or storage devices, including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile device 300 is able to operate in association with the web storage for performing a storage function of the memory 360 on the Internet.

The interface unit 370 may play a role as a passage to every external device connected to the mobile device 300 with external devices. The interface unit 370 receives data from the external devices, delivers a supplied power to the respective elements of the mobile device 300, or enables data within the mobile device 300 to be transferred to the external devices. For instance, the interface unit 370 may include a wired/wireless headset port, an external charger port, a wired/wireless data port, a memory card port, a port for coupling to a device having an identity module, audio input/output ports, video input/output ports, an earphone port, and the like.

The identity module is a chip for storing various kinds of information for authenticating a use authority of the mobile device 300 and may include User Identify Module (UIM), Subscriber Identity Module (SIM), Universal Subscriber Identity Module (USIM), and the like. A device having the identity module (hereinafter called 'identity device') can be manufactured in form of a smart card. Therefore, the identity device is connectible to the mobile device 300 through a port.

When the mobile device 300 is connected to an external cradle, the interface unit 370 becomes a passage for supplying the mobile device 300 with a power from the cradle or a passage for delivering various command signals input from the cradle by a user to the mobile device 300. Each of the various command signals inputted from the cradle or the power can operate as a signal for recognizing that the mobile device 300 is correctly installed in the cradle.

The controller 380 typically controls the overall operations of the mobile device 300. For example, the controller 380 performs the control and processing associated with voice calls, data communications, video calls, and the like. The controller 380 may include a multimedia module 381 that provides multimedia playback. The multimedia module 381 may be configured as a part of the controller 380, or implemented as a separate component. Moreover, the controller 380 is able to perform a pattern recognition processing for recognizing a writing input and a picture drawing input performed on the touchscreen as a text and an image, respectively.

The power supply unit 390 is supplied with an external or internal power and then supplies a power required for an operation of each component, under the control of the controller 380.

Various embodiments described herein may be implemented in a recording medium readable by a computer or a device similar to the computer using software, hardware, or some combination thereof for example.

For hardware implementation, the embodiments described herein may be implemented within at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, and a selective combination thereof. Such embodiments may also be implemented by the controller 180.

For software implementation, the embodiments described herein may be implemented with separate software modules, such as procedures and functions, each of which performs one or more of the functions and operations described herein. The software codes can be implemented with a software application written in any suitable programming language and may be stored in memory such as the memory 360, and executed by a controller or processor, such as the controller 380.

Figure 4:
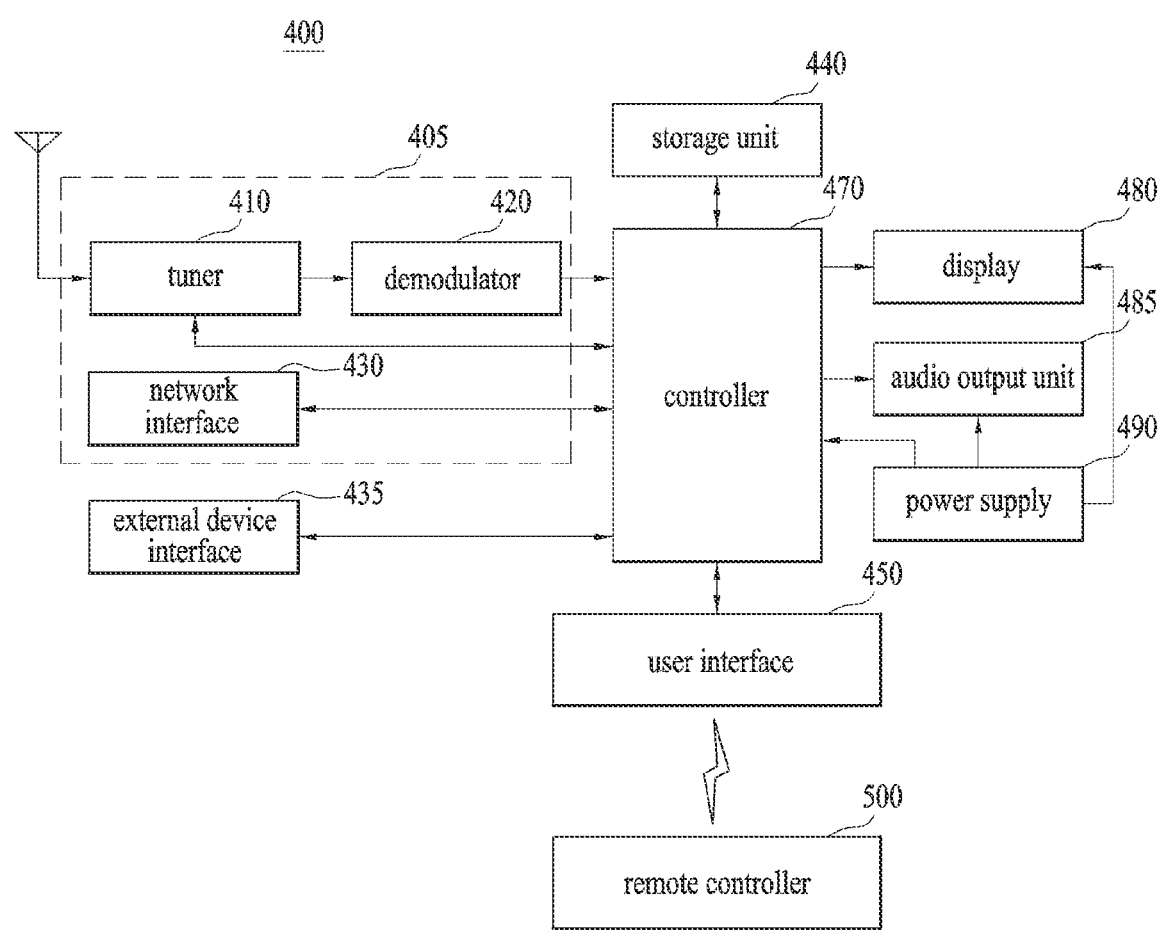
FIG. 4 is a block diagram for explaining a digital device according to a further embodiment of the present invention.

FIG. 4 is a block diagram showing a digital device according to another embodiment of the present invention.

Another example of a digital device 400 may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit305 may include at least one of one or more tuner 410, a demodulator 420, and a network interface 430. Yet, in some cases, the broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning in to a channel selected by the user or all previously stored channels among RF broadcast signals received through an antenna. And, the tuner 410 converts the received RF broadcast signal into an IF (intermediate frequency) signal or a baseband signal.

For instance, if a received RF broadcast signal is a digital broadcast signal, it is converted into a digital IF (DIF) signal. If a received RF broadcast signal is an analog signal, it is converted into an analog baseband video/audio signal (CVBS/SIF). Namely, the tuner 410 is able to process both of the digital broadcast signal and the analog signal. The analog baseband video/audio signal (CVBS/SIF) outputted from the tuner 410 may be directly inputted to the controller 470.

The tuner 410 may receive an RF broadcast signal of a single carrier or multiple carriers. The tuner 410 sequentially tunes in to and receives RF broadcast signals of all broadcast channels stored through the channel memory function among RF broadcast signals received through the antenna and is then able to convert it into an intermedia frequency signal or a baseband signal (DIF: digital intermediate frequency or baseband signal).

The demodulator 420 receives and demodulates the digital IF signal (DIF) converted by the tuner 410 and is then able to channel decoding and the like. To this end, the demodulator 420 may include a Trellis decoder, a de-interleaver, a Reed-Solomon decoder and the like, or may include a convolution decoder, a de-interleaver, a Reed-Solomon decoder and the like.

The demodulator performs demodulation and channel decoding and is then able to output a stream signal TS. In this case, the stream signal may include a signal of multiplexing a video signal, an audio signal and/or a data signal. For instance, the stream signal may include MPEG-2TS (transport stream) in which a video signal of PMEG-2 and an audio signal of Dolby AC-3 are multiplexed.

The stream signal outputted from the demodulator 420 may be inputted to the controller 470. The controller 470 can control demultiplexing, audio/video signal processing, etc. Furthermore, the controller 470 can control outputs of video and audio through the display 480 and o the audio output unit 485, respectively.

The external device interface 435 may provide an interfacing environment between the digital device 300 and various external devices. To this end, the external device interface 435 may include an A/V input/output unit (not shown) or a wireless communication unit (not shown).

The external device interface 435 can be connected with external devices such as a digital versatile disk (DVD), a Blu-ray player, a game device, a camera, a camcorder, a computer (notebook computer), a tablet PC, a smartphone, a cloud and the like by wire/wireless. The external device interface 435 delivers a signal containing data such as an image, a video, an audio and the like, which is inputted through the connected external device, to the controller 470 of the digital device. The controller 470 may control a data signal of the processed image, video and audio and the like to be outputted to the connected external device. To this end, the external device interface 435 may further include an A/V input/output unit (not shown) or a wireless communication unit (not shown).

In order to input video and audio signals of an external device to the digital device 400, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The wireless communication unit can perform short-range wireless communication with another digital device. The digital device 400 may be networked with other digital devices by communication protocols such as Bluetooth, radio frequency identification (RFID), infrared data association (IrDA), ultra wideband (UWB), ZigBee, and digital living network alliance (DLNA), etc. for example.

The external device interface 435 may perform input/output operations with a set-top box (STB) by being connected thereto through at least one of the aforementioned terminals.

Meanwhile, the external device interface 435 may receive an application or an application list within an adjacent external device and then forward it to the controller 470 or the storage unit 440.

The network interface 430 may provide an interface for connecting the digital device 400 to wired/wireless networks including Internet network. The network interface 430 may have Ethernet terminal and the like for an access to a wired network for example. For the access to the wireless network, the network interface 430 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 430 may transceive data with another user or another digital device through the accessed network or another network linked to the accessed network. Particularly, the network interface 430 may send a portion of the content data stored in the digital device 400 to a user/digital device selected from other users/digital devices previously registered at the digital device 400.

Meanwhile, the network interface 430 may access a prescribed webpage through the accessed network or another network linked to the accessed network. Namely, the network interface 430 accesses a prescribed webpage through a network and is then able to transceive data with a corresponding server. Besides, the network interface 430 can receive contents or data provided by a content provider or a network operator. Namely, the network interface 430 may receive contents (e.g., movie, advertisement, game, VOD, broadcast signal, etc.) provided by the content provider or a network provider and information associated with the contents through the network. The network interface 430 may receive update information and file of firmware provided by the network operator. And, the network interface 430 may send data to the internet or content provider or the network operator.

Moreover, the network interface 430 may select a desired application from open applications and receive it through a network.

The storage unit 440 may store programs for various signal processing and controls within the controller 470, and may also store a processed video, audio or data signal.

In addition, the storage unit 440 may execute a function of temporarily storing a video, audio or data signal inputted from the external device interface 435 or the network interface 430. The storage unit 440 may store information on a prescribed broadcast channel through a channel memory function.

The storage unit 440 may store an application or an application list inputted from the external device interface 435 or the network interface 430.

And, the storage unit 440 may store various platforms which will be described later.

The storage unit 440 may include storage media of one or more types, such as a flash memory type, a hard disk type, a multimedia card micro type, a card type memory (e.g. SD or XD memory), RAM, EEPROM, etc. The digital device 400 may play content files (a video file, a still image file, a music file, a text file, an application file, etc.) stored in the storage unit 440 and provide them to the user.

FIG. 4 illustrates an embodiment in which the storage unit 440 is separated from the controller 470, by which the present invention is non-limited. In other words, the storage unit 440 may be included in the controller 470.

The user input interface 450 may forward a signal inputted by a user to the controller 470 or forward a signal outputted from the controller 470 to the user.

For example, the user input interface 450 may receive control signals for power on/off, channel selection, screen settings and the like from a remote controller 500, or transmit control signals of the controller 470 to the remote controller 500, according to various communication schemes such as RF communication, IR communication, and the like.

The user input interface 450 can forward control signals inputted through a power key, a channel key, a volume key, and a local key (not shown) for a setup value or the like to the controller 470.

The user input interface 450 may forward a control signal inputted from a sensing unit (not shown) sensing a gesture of a user to the controller 470 or transmit a signal of the controller 470 to the sensing unit (not shown). Here, the sensing unit (not shown) may include a touch sensor, a voice sensor, a location sensor, an action sensor, etc.

The controller 470 may generate and output a signal for a video or audio output by demultiplexing a stream inputted through the tuner 410, the demodulator 420 or the external device interface 435 or processing demultiplexed signals.

A video signal processed by the controller 470 can be inputted to the display unit 380 and displayed as an image corresponding to the video signal. In addition, the video signal video-processed by the controller 470 can be inputted to an external output device through the external device interface 435.

An audio signal processed by the controller 470 can be audio-outputted to the audio output unit 485. Moreover, the audio signal processed by the controller 470 can be inputted to the external output device through the external device interface 435.

The controller 470 may include a demultiplexer, an image processor, and the like, which are not shown in FIG. 4.

The controller 470 can control the overall operations of the digital device 400. For example, the controller 470 can control the tuner 410 to tune in to an RF broadcast corresponding to a channel selected by a user or a previously stored channel.

The controller 470 can control the digital device 400 according to a user command input through the user input interface 450 or an internal program. Particularly, the controller 470 can control the digital device 400 to access a network to download an application or an application list desired by a user to the digital device 400.

For example, the controller 470 may control the tuner 410 to receive a signal of a channel selected in response to a prescribed channel selection command received through the user input interface 450. And, the controller 470 may process a video, audio or data signal of the selected channel. The controller 470 may control information on a channel selected by the user to be outputted together with a processed video or audio signal through the display unit 480 or the audio output unit 485.

For another example, the controller 470 may control a video signal or an audio signal, which is inputted through the external device interface unit 435 from an external device (e.g., a camera or a camcorder), to be outputted through the display unit 480 or the audio output unit 485 in response to an external device image play command received through the user input interface 450.

Meanwhile, the controller 470 can control the display unit 480 to display a video. For example, the controller 470 can control a broadcast video inputted through the tuner 410, an external input video inputted through the external device interface 435, a video inputted through the network interface 430, or a video stored in the storage unit 440 to be displayed on the display unit 480. Here, the video displayed on the display unit 480 may include a still image or moving images or may include a 2D or 3D video.

The controller 470 may control a content to be played. Here, the content may include a content stored in the digital device 400, a received broadcast content, or a content inputted externally. The content may include at least one of a broadcast video, an external input video, an audio file, a still image, an accessed web screen, and a document file.

The controller 470 may control an application or an application list, which is located in the digital device 300 or downloadable from an external network, to be displayed when an application view menu is entered.

The controller 470 may control installation and execution of applications downloaded from an external network together with various user interfaces. Moreover, the controller 470 can control a video related to a launched application to be displayed on the display unit 480 by a user's selection.

Meanwhile, a channel browsing processor (not shown) configured to generate a thumbnail image corresponding to a channel signal or an external input signal may be further included.

The channel browsing processor may receive an input of a stream signal (TS) outputted from the demodulator 420 or an input of a stream signal outputted from the external device interface 435, extract a video from the inputted stream signal, and then generate a thumbnail image. The generated thumbnail image can be directly inputted to the controller 470 or may be inputted to the controller 470 by being encoded. Moreover, the generated thumbnail image may be encoded into a stream and then inputted to the controller 470. The controller 470 may display a thumbnail list including a plurality of thumbnail images on the display unit 480 using the inputted thumbnail images. The thumbnail images included in the thumbnail list can be updated sequentially or simultaneously. Accordingly, the user can conveniently check content of a plurality of broadcast channels.

The display unit 480 may convert each of a video signal, a data signal, and an OSD signal processed by the controller 470 or each of a video signal and a data signal received from the external device interface 435 into R, G and B signals to generate a drive signals.

The display unit 480 may include a PDP, an LCD, an OLED, a flexible display, a 3D display, or the like.

The display unit 480 may be configured as a touchscreen and used as an input device as well as an output device.

The audio output unit 485 receives a signal audio-processed by the controller 470, for example, a stereo signal, a 3.1 channel signal or a 5.1 channel signal, and then outputs the received signal as audio. The audio output unit 485 may be configured as one of speakers of various types.

Meanwhile, the digital device 400 may further include the sensing unit (not shown) for sensing a gesture of the user, which includes at least one of a touch sensor, a voice sensor, a location sensor, and an action sensor, as described above. A signal sensed by the sensing unit (not shown) can be delivered to the controller 470 through the user input interface 450.

The digital device 400 may further include a photographing unit (not shown) for photographing a user. Image information acquired by the photographing unit (not shown) can be inputted to the controller 470.

The controller 470 may sense a gesture of a user from an image captured by the photographing unit (not shown) or a signal sensed by the sensing unit (not shown), or by combining the image and the signal.

The power supply unit 490 may supply a corresponding power to the digital device 400 overall.

Particularly, the power supply unit 490 can supply the power to the controller 470 configurable as a system-on-chip (SoC), the display unit 480 for a video display, and the audio output unit 485 for an audio output.

To this end, the power supply unit 490 may include a converter (not shown) configured to convert an AC power to a DC power. Meanwhile, for example, if the display unit 480 is configured as an LCD panel having a multitude of backlight lamps, the power supply unit 490 may further include an inverter (not shown) capable of PWM (pulse width modulation) operation for luminance variation or dimming drive.

The remote controller 500 sends a user input to the user input interface 450. To this end, the remote controller 500 can use Bluetooth, RF communication, IR communication, UWB, ZigBee, etc.

In addition, the remote controller 500 can receive audio, video or data signal outputted from the user input interface 450 and then display the received signal or output the same as audio or vibration.

The above-described digital device 400 may include a digital broadcast receiver capable of processing digital broadcast signals of ATSC or DVB of a stationary or mobile type.

Regarding the digital device according to the present invention, some of the illustrated components may be omitted or new components (not shown) may be further added as required. On the other hand, the digital device may not include the tuner and the demodulator, differently from the aforementioned digital device, and may play a content by receiving the content through the network interface or the external device interface.

Figure 5:
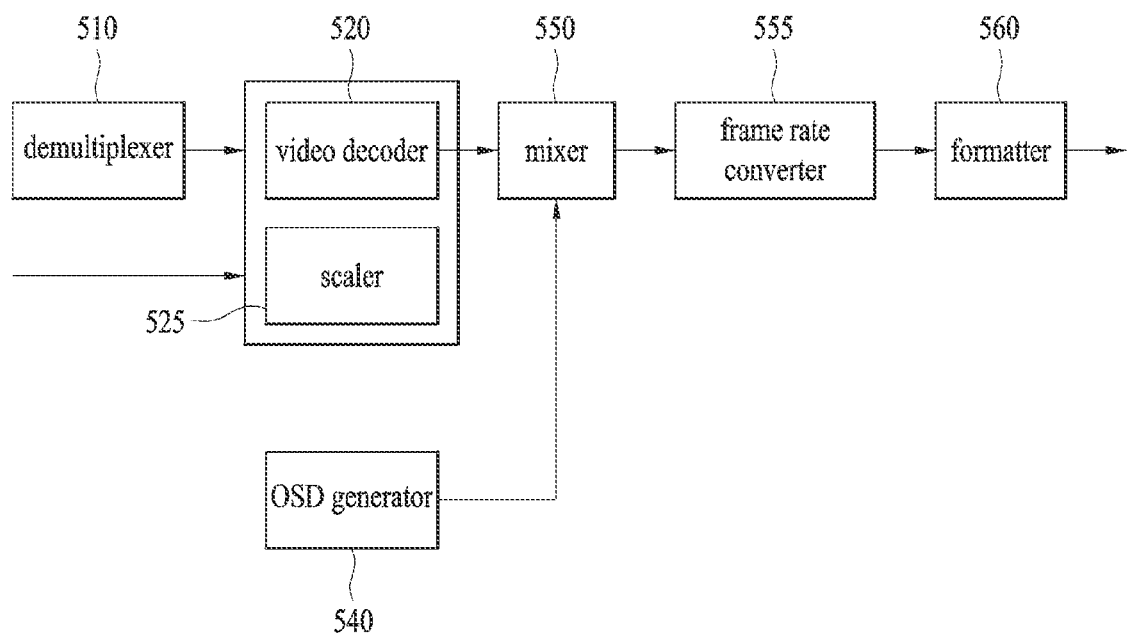
FIG. 5 is a block diagram for explaining the detailed configuration of each of the controllers of FIGS. 2 to 4 according to an embodiment of the present invention.

FIG. 5 is a block diagram showing the detailed configuration of each of controllers of FIGS. 2 to 4 according to one embodiment of the present invention.

One example of the controller may include a demultiplexer 510, a video processor 520, an OSD generator 540, a mixer 550, a frame rate converter (FRC) 555, and a formatter 560. Besides, the controller may further include an audio processor and a data processor (not shown).

The demultiplexer 510 demultiplexes an inputted stream. For instance, the demultiplexer 510 can demultiplex an inputted stream signal into an MPEG-2 TS video, audio and data signals. Herein, the stream signal inputted to the demultiplexer may include a stream signal outputted from the tuner, demodulator or external device interface.

The video processor 520 performs a video processing of the demultiplexed video signal. To this end, the video processor 520 may include a video decoder 525 and a scaler 535.

The video decoder 525 can decode the demultiplexed video signal, and the scaler 535 can scale the resolution of the decoded video signal to be outputtable from the display.

The video decoder 525 can support various specifications. For instance, the video decoder 525 performs a function of MPEG-2 decoder if a video signal is encoded by MPEG-2. And, the video decoder 535 performs a function of H.264 decoder if a video signal is encoded by DMB (digital multimedia broadcasting) or H.264.

Meanwhile, the video signal decoded by the image processor 520 is inputted to the mixer 550.

The OSD generator 540 may generate OSD data according to a user input or by itself. For example, the OSD generator 540 may generate data to be displayed on the screen of the display 380 in the graphic or text form on the basis of a control signal of a user input interface. The generated OSD data may include various data such as a user interface screen of the digital device, various menu screens, widgets, icons, viewing rate information and the like. The OSD generator 540 can generate data to display a caption of a broadcast video or EPG based broadcast information.

The mixer 550 mixes the OSD data generated by the OSD generator 540 and the video signal processed by the video processor 520. The mixer 550 then provides the mixed signal to the formatter 560. By mixing the decoded video signal and the OSD data, OSD is displayed in a manner of overlaying a broadcast video or an external input video.

The frame rate converter (FRC) 555 may convert a frame rate of an inputted video. For example, the frame rate converter 555 can convert the frame rate of an inputted 60 Hz video into a frame rate of 120 Hz or 240 Hz according to an output frequency of the display unit. As described above, there may exist various methods of converting a frame rate. For instance, in case of converting a frame rate into 120 HZ from 60 Hz, the frame rate converter 555 can perform the conversion by inserting a first frame between the first frame and a second frame or inserting a third frame predicted from the first and second frames. For another instance, in case of converting a frame rate into 240 Hz from 60 Hz, the frame rate converter 555 can perform the conversion by further inserting three same or predicted frames between the existing frames. Meanwhile, in case of not performing a separate frame conversion, the frame rate converter 555 may be bypassed.

The formatter 560 may change the output of the frame rate converter 555, which is inputted thereto, to fit an output format of the display unit. For example, the formatter 560 can output an RGB data signal. In this case, this RGB data signal can be outputted as low voltage differential signal (LVDS) or mini-LVDS. If an inputted output of the frame rate converter 555 is a 3D video signal, the formatter 560 outputs the signal by configuring a 3D format to fit the output format of the display unit, whereby a 3D service can be supported through the display unit.

Meanwhile, an audio processor (not shown) in the controller can perform audio processing of a demultiplexed audio signal. Such an audio processor (not shown) can provide supports to process various audio formats. For instance, if an audio signal is encoded in format of MPEG-2, MPEG-4, AAC, HE-AAC, AC-3, BSAC, or the like, a corresponding decoder is further included to process the audio signal.

And, the audio processor (not shown) in the controller can process base, treble, volume adjustment and the like.

A data processor (not shown) in the controller can process a demultiplexed data signal. For example, when a demultiplexed data signal is encoded, the data processor can decode the encoded demultiplexed data signal. Here, the encoded data signal may be EPG information including broadcast information such as start and end times of a broadcast program broadcasted on each channel, and the like.

Meanwhile, the above-described digital device is one example according to the present invention. And, at least one of the components may be integrated, added or omitted depending on options of an actually embodied digital device. In particular, if necessary, at least two or more components can be integrated into a single component or a prescribed component can be divided into at least two or more components. Moreover, a function performed by each block is provided to describe one embodiment of the present invention. A detailed operation or device for the function may non-limit the scope of the appended claims and their equivalents of the present invention.

Meanwhile, a digital device may include an image signal processing device configured to process a signal of an image saved in the corresponding device or a signal of an inputted image. Examples of the image signal processing device may include a settop box (STB) failing to include the display unit 480 and the audio output unit 485 shown in FIG. 4, the aforementioned DVD player, a Blu-ray player, a game device, a computer and the like.

Figure 6:
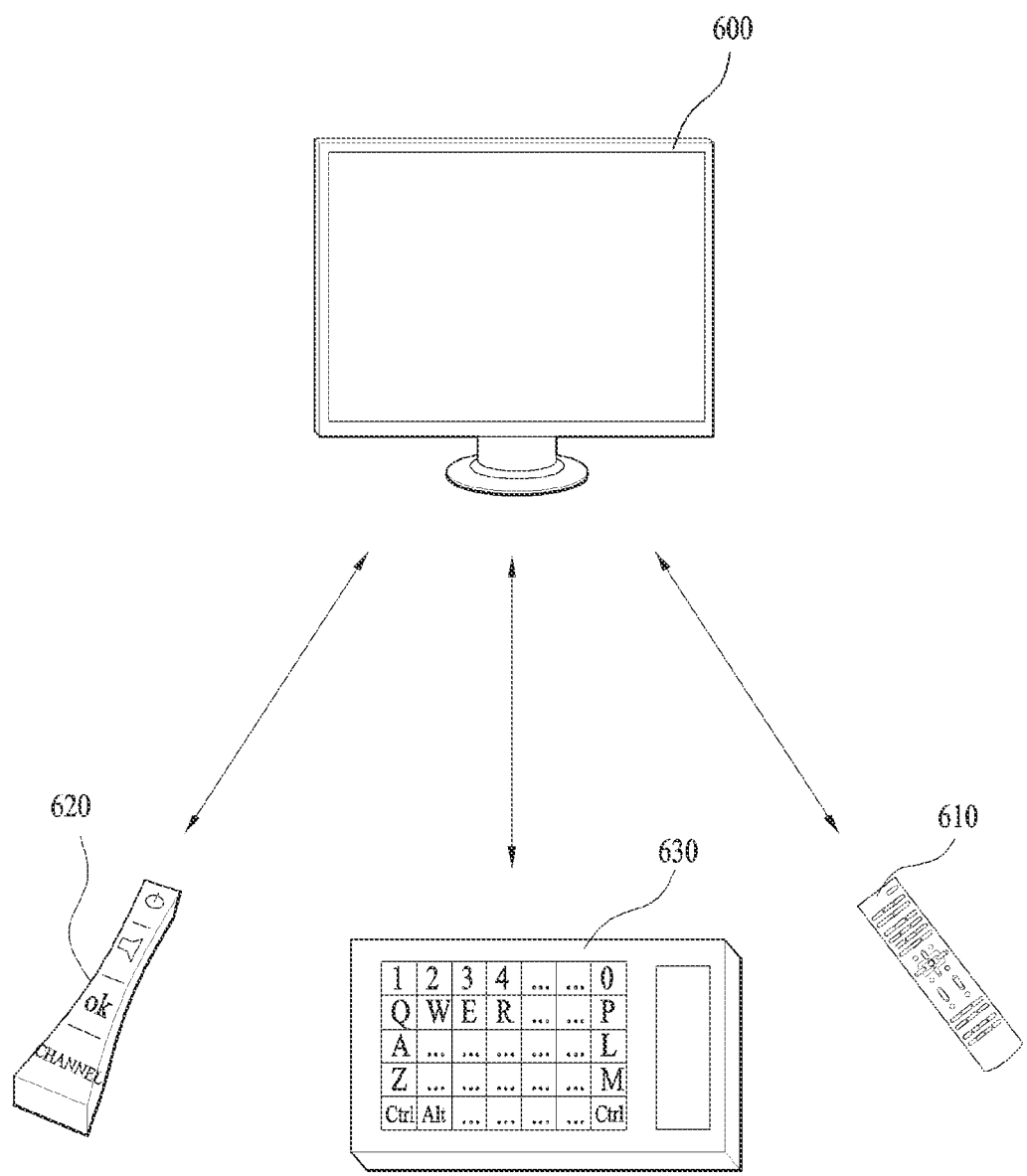
FIG. 6 is a diagram illustrating an input unit connected to each of the digital devices of FIGS. 2 to 4 according to an embodiment of the present invention.

FIG. 6 is a diagram of an input means connected to each of the digital devices shown in FIGS. 2 to 4 according to one embodiment of the present invention.

In order to control a digital device 600, a front panel (not shown in the drawing) or a control means (e.g., an input means) installed in the digital device 600 is used.

Meanwhile, as a user interface device (UID) capable of a wire/wireless communication, the control means includes a remote controller 610, a key board 630, a pointing device 620, a touchpad, or the like, mainly embodied for the purpose of controlling the digital device 600. And, a control means dedicated to an external input by being connected to the digital device 600 may be included as well. Besides, the control means may further include a mobile device (e.g., a smartphone, a tablet PC, etc.) capable of controlling the digital device 600 through a mode switching or the like despite not having the purpose of controlling the digital device 600. For clarity, a pointing device is taken as one example for the description in the present specification, by which the present invention is non-limited.

The input means can communicate with the digital device by employing at least one of communication protocols as necessary. In this case, the communication protocols may include Bluetooth, RFID (Radio Frequency Identification), IrDA (infrared Data Association), UWB (Ultra Wideband), ZigBee, DLNA (Digital Living Network Alliance), RS and the like.

The remote controller 610 is a general input means provided with various key buttons required for controlling the digital device 600.

The pointing device 620 provided with a gyro sensor and the like delivers a prescribed control command to the digital device 600 by embodying a corresponding pointer on a screen of the digital device 600 based on a user's motion, a pressure, a rotation and the like. The pointing device 620 may be called one of various names such as a magic remote controller, a magic controller and the like.

As the digital device 600 is an intelligence integrated digital device capable of providing various services such as a web browser, an application, an SNS (social network service) and the like as well as broadcasts, it is difficult to control the digital device 600 using a conventional remote controller 610. Hence, the keyboard 630 is embodied into a configuration similar to a PC keyboard to facilitate inputs of text and the like by complementing the control difficulty.

Meanwhile, the control means such as the remote controller 610, the pointing device 620, the keyboard 630, or the like is provided with a touchpad as necessary and is usable for the various control purposes of facilitating text inputs, pointer shifts, zoom-in/out of photo or video, and the like.

The digital device described in the present specification uses OS and/or Web OS as a platform. Hereinafter, such a processing as a WebOS based configuration or algorithm may be performed by the controller of the above-described digital device and the like. In this case, the controller is used in a broad sense including the controllers shown in FIGS. 2 to 5. Hence, in the following description, regarding a configuration for processing WebOS based or related services, applications, contents and the like in a digital device, hardware or component including software, firmware and the like is named a controller.

Such a Web OS based platform may improve development independency and functional extensibility by integrating services, applications and the like based on Luna-service Bus for example and is able to increase application development productivity based on a web application framework. In addition, system resources and the like are efficiently used through a WebOS process and resource management, whereby multitasking can be supported.

Meanwhile, a Web OS platform described in the present specification may be available not only for stationary devices such as personal computers (PCs), TVs and settop boxes (STBs) but also for mobile devices such as cellular phones, smartphones, tablet PCs, laptops, wearable devices, and the like.

A software structure for a digital device is a monolithic structure capable of solving conventional problems depending on markets and has difficulty in external application with a multi-threading based signal process and closed product. In pursuit of new platform based development, cost innovation through chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
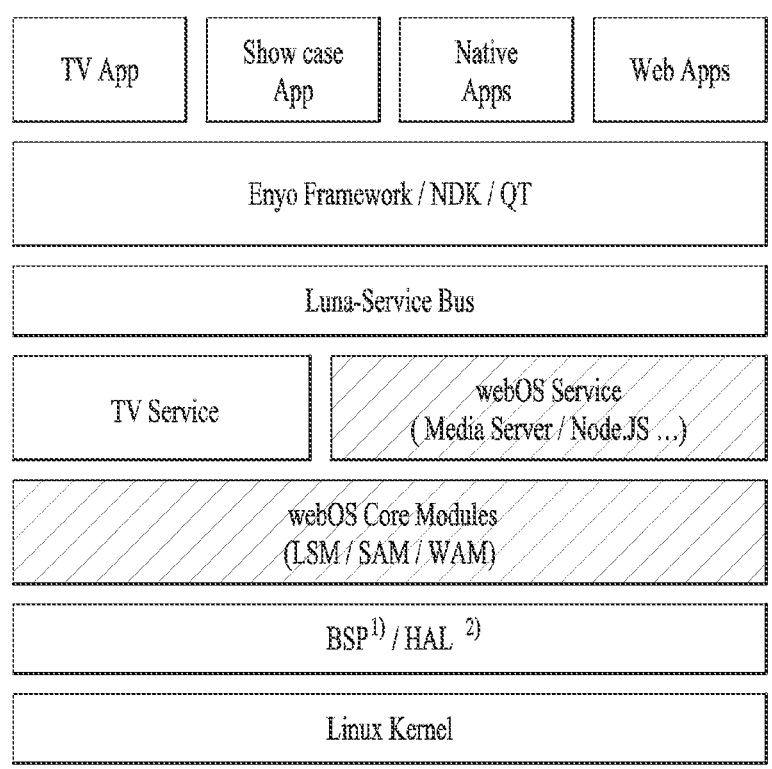
FIG. 7 is a diagram for explaining a webOS architecture according to an embodiment of the present invention.

FIG. 7 is a diagram showing Web OS architecture according to one embodiment of the present invention.

The architecture of Web OS platform is described with reference to FIG. 7 as follows.

The platform can be mainly classified into a system library based Web OS core platform, an application, a service and the like.

The architecture of the Web OS platform includes a layered structure. OS, system library(s), and applications exist in a lowest layer, a next layer and a most upper layer, respectively.

First of all, regarding the lowest layer, as a Linux kernel is included as an OS layer, Linux may be included as an OS of the digital device.

Above the OS layer, BSP/HAL (Board Support Package/Hardware Abstraction layer, Web OS core modules layer, service layer, Luna-Service Bus layer, Enyo framework/NDK(Native Developer's Kit)/QT layer, and an application layer (as a most upper layer) exist in order.

Meanwhile, some layers can be omitted from the aforementioned Web OS layer structure. A plurality of layers can be integrated into a single layer, and vice versa.

The Web OS core module layer may include LSM (Luna Surface Manager) for managing a surface window and the like, SAM (System & Application Manage) for managing launch, running state and the like of an application, WAM (Web Application Manager) for managing Web application and the like based on WebKit, etc.

The LSM manages an application window appearing on a screen. The LSM is in charge of a display hardware (HW), provides a buffer capable of rendering substance required for applications, and outputs a composition of rendering results of a plurality of application to a screen.

The SAM manages a performance policy per conditions of system and application.

Meanwhile, since Web OS may regard a web application (Web App) as a basic application, the WAM is based on Enyo Framework.

A service use of application is performed through Luna-service Bus. A new service may be registered as the Bus, and an application can find and use a service required for itself.

The service layer may include services of various service levels such as TV service, Web OS service and the like. Meanwhile, the Web OS service may include a media server, a Node.JS and the like. Particularly, Node.JS service supports javascript for example.

The Web OS service is Linux process of implementing a function logic and can communicate through Bus. This can be mainly divided into four parts and is constructed with a TV process, services migrating into Web OS from an existing TV or services corresponding to manufacturer-differentiated services, Web OS common service, and Node.js service developed with javascript and used through Node.js.

The application layer may include all applications supportable by the digital device, e.g., TV application, showcase application, native application Web application, etc.

Application on Web OS may be sorted into Web Application, PDK (Palm Development Kit) application, QML (Qt Meta Language or Qt Modeling Language) application and the like according to implementing methods.

The Web Application is based on WebKit engine and is run on WAM Runtime. Such a web application is based on Enyo Framework or may be run in a manner of being developed based on general HTML5, CSS (cascading style sheets), and javascript.

The PDK application includes a native application and the like developed with C/C++ based on PDK provided for a $3^{rd}$ party or an external developer. The PDK means a set of development libraries and tools provided to enable a third party (e.g., a game, etc.) to develop a native application (C/C++). The PDK application can be used to develop an application of which performance is significant.

The QML application is a Qt based native application and includes basic applications (e.g., card view, home dashboard, virtual keyboard, etc.) provided with Web OS platform. Herein, QML is a mark-up language of a script type instead of C++.

Meanwhile, in the above description, the native application means an application that is developed with C/C++, complied, and run in binary form. Such a native application has an advantage of a fast running speed.

Figure 8:
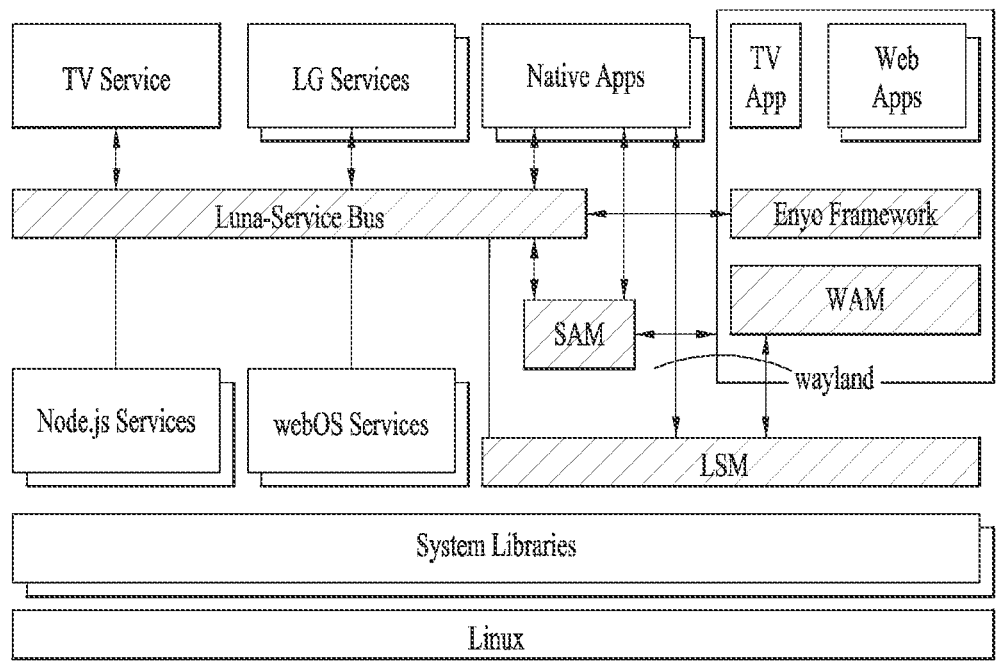
FIG. 8 is a diagram for explaining an architecture of a webOS device according to an embodiment of the present invention.

FIG. 8 is a diagram showing an architecture of Web OS device according to one embodiment of the present invention.

FIG. 8 is a block diagram based on a runtime of a Web OS device, which can be understood with reference to the layered structure shown in FIG. 7.

The following description is made with reference to FIG. 7 and FIG. 8.

Referring to FIG. 8, above a system OS (Linux) and system libraries, services, applications and Web OS core modules are included. And, communications among them can be performed through Luna-Service-Bus.

Node.js services (e-mail, contact, calendar, etc.) based on HTML5, CSS, and java script, Web OS services such as Logging, backup, file notify, database (DB), activity manager, system policy, AudioD (Audio Daemon), update, media server and the like, TV services such as EPG (Electronic Program Guide), PVR (Personal Video Recorder), data broadcasting and the like, CP services such as voice recognition, Now on, Notification, search, ACR (Auto Content Recognition), CBOX (Contents List Browser), wfdd, DMR, Remote Application, download, SDPIF (Sony Philips Digital Interface Format) and the like, native applications such as PDK applications, browser, QML application and the like, and Enyo Framework based UI related TV applications and Web applications are processed through the Web OS core module like the aforementioned SAM, WAM and LSM via Luna-Service-Bus. Meanwhile, in the above description, it is not mandatory for the TV applications and the Web applications to be Enyo-Framework-based or UI-related.

CBOX can manage a list and metadata for contents of such an external device connected to TV as USB, DLNA, Cloud and the like. Meanwhile, the CBOX can output a content listing of various content containers such as USB, DMS, DVR, Cloud and the like in form of an integrated view. And, the CBOX shows a content listing of various types such as picture, music, video and the like and is able to manage the corresponding metadata. Besides, the CBOX can output a content of an attached storage by real time. For instance, if a storage device such as USB is plugged in, the CBOX should be able to output a content list of the corresponding storage device. In doing so, a standardized method for the content list processing may be defined. And, the CBOX may accommodate various connecting protocols.

SAM is provided to enhance improvement and extensibility of module complexity. Namely, for instance, since an existing system manager handles various functions (e.g., system UI, window management, web application run time, constraint condition processing on UX, etc.) by a single process, implementation complexity is very high. Hence, by separating major functions and clarifying an inter-function interface, implementation complexity can be lowered.

LSM supports system UX implementation (e.g., card view, launcher, etc.) to be independently developed and integrated and also supports the system UX implementation to easily cope with a product requirement change and the like. In case of synthesizing a plurality of application screens like App On App, the LSM enables multitasking by utilizing hardware (HW) resource to the maximum, and is able to provide a window management mechanism for multi-window, 21:9 and the like.

LSM supports implementation of system UI based on QML and enhances development productivity thereof. QML UX can easily configure a screen layout and a UI component view and facilitates development of a code for processing a user input. Meanwhile, an interface between QML and Web OS component is achieved through QML extensive plug-in, and a graphic operation of application may be based on wayland protocol, luna-service call and the like.

LSM is an abbreviation of Luna Surface Manager, as described above, and performs a function of an application window compositor.

LSM synthesizes an independently developed application, a US component and the like and then outputs the synthesized one to a screen. With respect to this, if components such as Recents application, showcase application, launcher application and the like render contents of their own, respectively, LSM defines an output region, an inter-operating method and the like as a compositor. So to speak, the LSM (i.e., compositor) processes graphic synthesis, focus management, input event and the like. In doing so, LSM receives an event, a focus and the like from an input manager. Such an input manager may include a remote controller, an HID (e.g., mouse & keyboard), a joy stick, a game pad, an application remote, a pen touch and the like.

Thus, LSM supports a multiple window model and can be simultaneously run on all applications owing to system UI features. With respect to this, LSM can support launcher, recents, setting, notification, system keyboard, volume UI, search, finger gesture, Voice Recognition (STT (Sound to Text), TTS (Text to Sound), NLP (Natural Language Processing), etc.), pattern gesture (camera, MRCU (Mobile Radio Control Unit)), Live menu, ACR (Auto Content Recognition), and the like.

Figure 9:
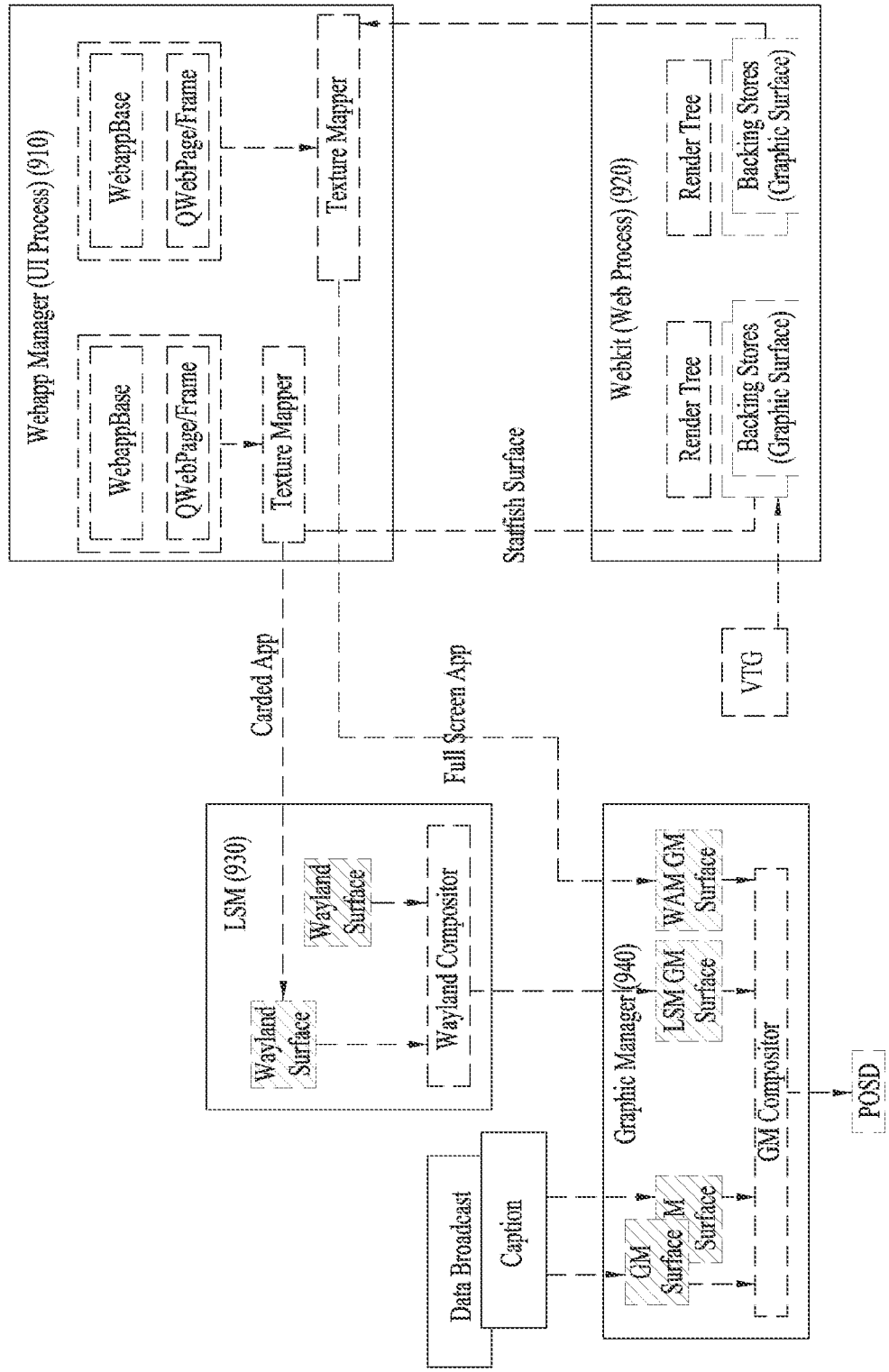
FIG. 9 is a diagram for explaining a graphic composition flow in a webOS device according to an embodiment of the present invention.

FIG. 9 is a diagram showing a graphic composition flow in a Web OS device according to one embodiment of the present invention.

Referring to FIG. 9, a graphic composition processing can be performed through a web application manager 910 in charge of a UI process, a webkit 920 in charge of a web process, an LSM 930, and a graphic manager (GM) 940.

If a web application based graphic data (or application) is generated as a UI process from the web application manager 910, the generated graphic data is forwarded to a full-screen application or the LSM 930. Meanwhile, the web application manager 910 receives an application generated from the webkit 920 for sharing the GPU (graphic processing unit) memory for the graphic managing between the UI process and the web process and then forwards it to the LSM 930 if the application is not the full-screen application. If the application is the full-screen application, it can bypass the LSM 930. In this case, it may be directly forwarded to the graphic manager 940.

The LSM 930 sends the received UI application to a wayland compositor via a wayland surface. The wayland compositor appropriately processes it and then forwards it to the graphic manager. Thus, the graphic data forwarded by the LSM 930 is forwarded to the graphic manager compositor via the LSM GM surface of the graphic manager 940 for example.

Meanwhile, as described above, the full-screen application is directly forwarded to the graphic manager 940 without passing through the LSM 930. Such an application is processed by the graphic manager compositor via the WAM GM surface.

The graphic manager processes all graphic data within the Web OS device. The graphic manager receives all the graphic data through the GM surface like data broadcasting application, caption application and the like as well as the data through the LSM GM and the data through the WAM GM surface and then processes them to be outputted to the screen appropriately. Herein, a function of the GM compositor is equal or similar to that of the aforementioned compositor.

Figure 10:
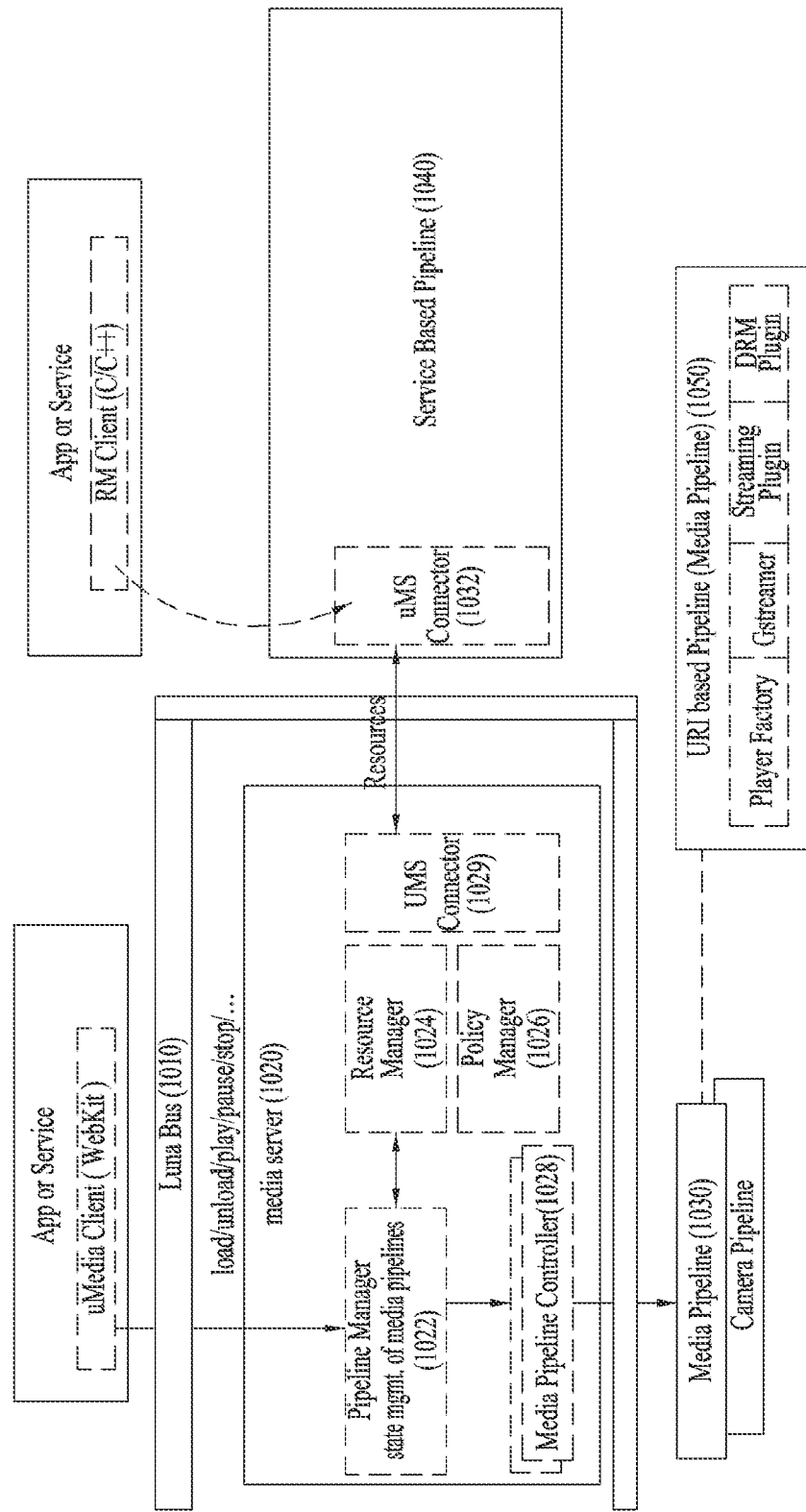
FIG. 10 is a diagram for explaining a media server according to an embodiment of the present invention.
Figure 11:
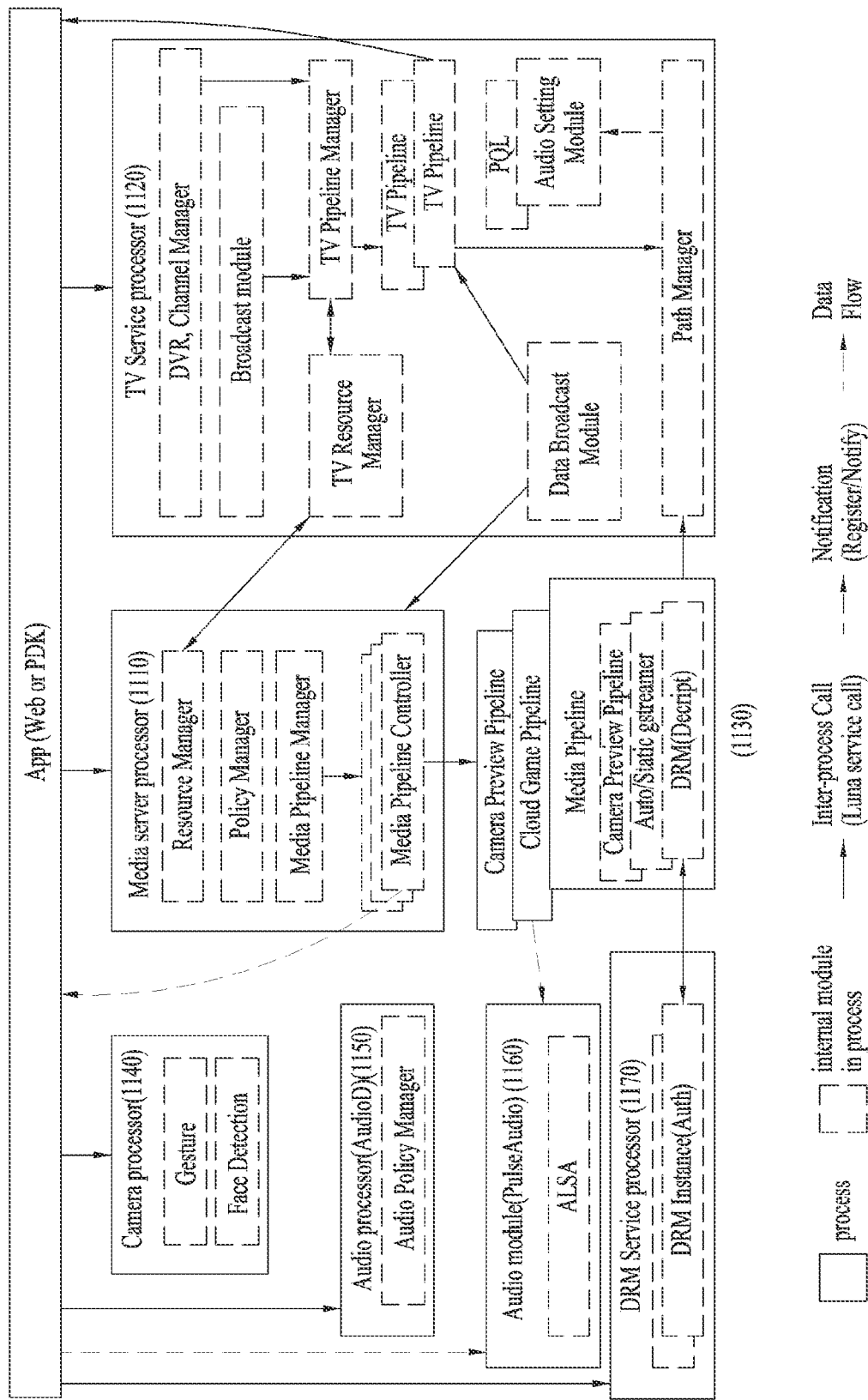
FIG. 11 is a block diagram for explaining the configuration of a media server according to an embodiment of the present invention.
Figure 12:
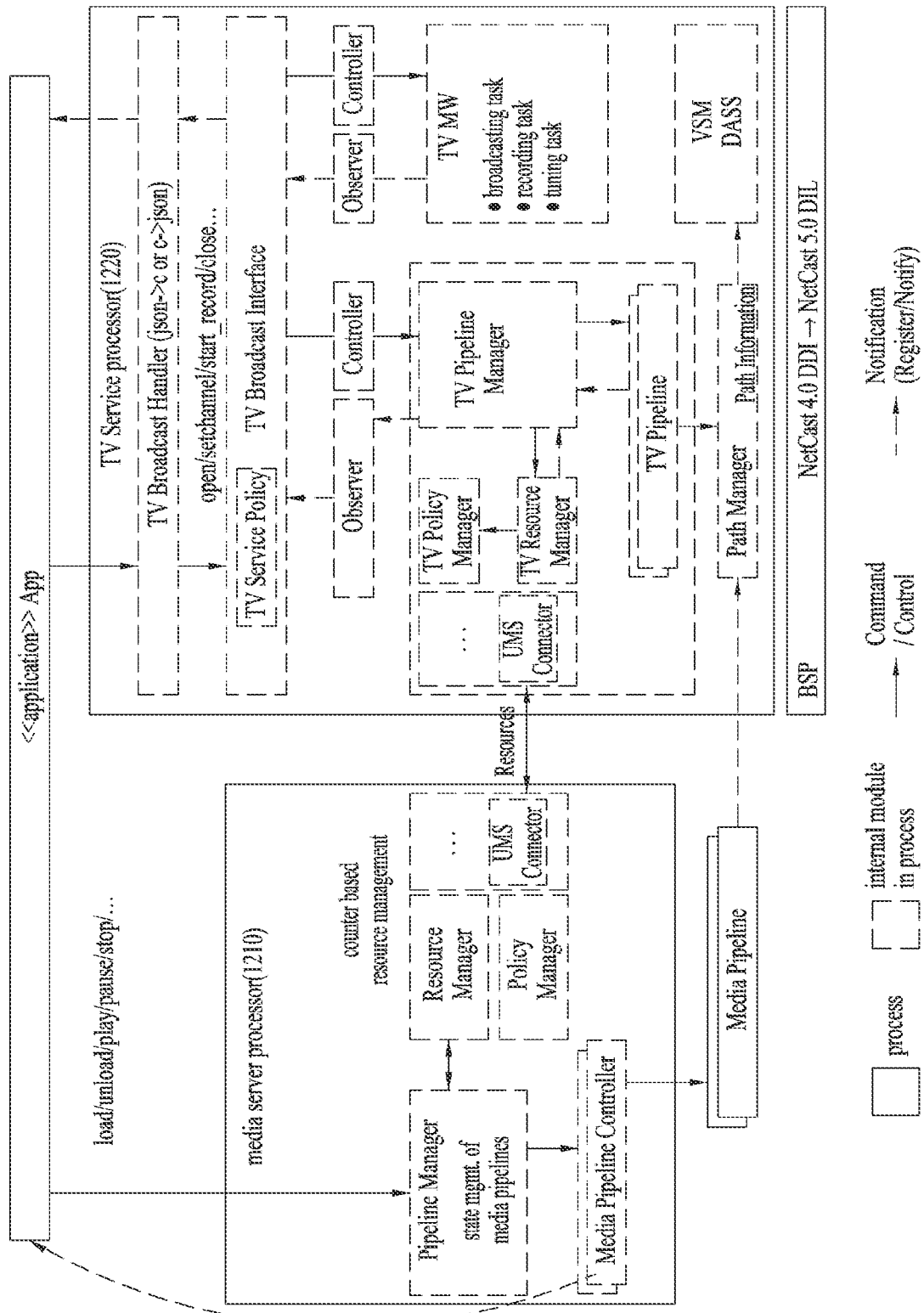
FIG. 12 is a diagram for explaining a relationship between a media server and a TV service according to an embodiment of the present invention.

FIG. 10 is a diagram showing a media server according to one embodiment of the present invention. FIG. 11 is a block diagram showing a configuration of a media server according to one embodiment of the present invention. FIG. 12 is a diagram showing the relation between a media server and according to one embodiment of the present invention and a TV service.

A media server supports executions of various multimedia in a digital device and manages necessary resources. The media server can efficiently use a hardware resource required for a media play. For instance, the media server needs audio/video hardware resource to execute multimedia, and is able to efficiently utilize the resource by managing a current resource use status. Generally, a stationary (or standing) device having a screen larger than that of a mobile device requires more hardware resources on multimedia execution and needs a faster encoding/decoding and graphic data transfer speed due to a massive data size. Meanwhile, the media server should be able to handle a broadcasting/recording/tuning task, a task of recording at the same time of viewing, a task of displaying both a sender screen and a receiver screen during a video call, and the like as well as a streaming and a file based play. Yet, since hardware resources such as an encoder, a decoder, a tuner, a display engine, and the like are limited by chipset units, it is difficult for the media server to execute several tasks at the same time. Hence, the media server handles the tasks in a manner of restricting a use scenario or receiving an input of user selection.

The media server can add robustness to system stability. For instance, by removing an erroneous play pipeline per pipeline in the course of a media play and then re-maneuvering the media play, another media play is not affected even if such an error occurs. Such a pipeline is a chain of connecting the respective unit functions (e.g., decoding, analysis, output, etc.) in case of a media play request, and necessary unit functions may be changed according to a media type and the like.

The media server may have extensibility. For instance, the media server can add a pipeline of a new type without affecting an existing implementation scheme. For instance, the media server can accommodate a camera pipeline, a video conference (Skype) pipeline, a third-party pipeline and the like.

The media server can handle a general media play and a TV task execution as separate services, respectively. The reason for this is that an interface of a TV service is different from a media play case. In the above description, the media server supports operations of 'setchannel', 'channelup', 'channeldown', 'channeltuning', 'recordstart' and the like in association with the TV service but supports operations of 'play', 'pause', 'stop' and the like in association with the general media play, thereby supporting different operations for the two services, respectively. Thus, the media server is able to handle the services separately.

The media server may control or manage resource management functions integratedly. Hardware resource allocation, recovery and the like in a device are integratedly performed in the media server. Particularly, a TV service process delivers a currently running task, a current resource allocation status and the like to the media server. Each time each media is executed, the media server secures a resource, activates a pipeline, and performs a grant of execution by a priority (e.g., policy), a resource recovery of other pipelines and the like in response to a media execution request based on a current resource status occupied by each pipeline. Herein, a predefined execution priority and a necessary resource information for a specific request are managed by a policy manager, and a resource manager can handle resource allocation, recovery and the like by communicating with the policy manager.

The media server can retain an ID (identifier) for every operation related to a play. For instance, based on an identifier, the media server can give a command by indicating a specific pipeline. For two or more media plays, the media server may give a command to pipelines by distinguishing the two from each other.

The media server may be in charge of a play of HTMS 5 standard media.

Besides, the media server may follow a TV reconfiguration range for a separate service processing of a TV pipeline. The media server can be designed irrespective of the TV reconfiguration range. If the TV is not separately service-processed, when a problem arises from a specific task, the TV may be re-executed entirely.

The media server is so-called uMS, i.e., a micro media server. Herein, a media player is a media client. This may mean a webkit for HTML 5 video tag, camera, TV, Skype, $2^{nd}$ screen and the like.

A core function of the media server is the management of a micro resource such as a resource manager, a policy manager or the like. With respect to this, the media server controls a playback control role on a web standard media content. Regarding this, the media server may manage a pipeline controller resource.

Such a media server supports extensibility, reliability, efficient resource usage and the like for example.

So to speak, the uMS, i.e., the media server manages and controls the use of resources for an appropriate processing in a Web OS device such as a resource (e.g., cloud game, MVPD (pay service, etc.), camera preview, 2nd screen, Skype, etc.), a TV resource and the like overall, thereby functioning in managing and controlling an efficient usage. Meanwhile, when resources are used, each resource uses a pipeline for example. And, the media server can manage and control generation, deletion, usage and the like of the pipeline for resource management overall.

Herein, a pipeline may be generated if a media related to a task starts to continue a job such as a parsing of request, decoding stream, video output, or the like. For instance, in association with a TV service or application, watching, recording, channel tuning or the like is individually processed in a manner that a resource usage or the like is controlled through a pipeline generated in response to a corresponding request.

A processing structure of a media server and the like are described in detail with reference to FIG. 10 as follows.

In FIG. 10, an application or service is connected to a media server 1020 through a luna-service bus 1010. The media server 1020 is connected to generated pipelines through the luna-service bus 1010 again and manages them.

The application or service is provided with various clients according to its property and is able to exchange data with the media server 1020 or the pipelines through them.

The clients may include a uMedia client (webkit) for the connection to the media server 1020, an RM (resource manager) client (C/C++) and the like for example.

The application including the uMedia client, as described above, is connected to the media server 1020. In particular, the uMedia client corresponds to a video object to be described later. Such a client uses the media server 1020 for an operation of a video in response to a request or the like.

Herein, the video operation relates to a video status. Loading, unloading, play (or, playback, reproduce), pause, stop and the like may include all status data related to video operations. Each operation or status of a video can be processed through individual pipeline generation. Hence, the uMedia client sends status data related to the video operation to the pipeline manager 1022 in the media server.

The pipeline manager 1022 obtains information on a current resource of a device through data communication with the resource manager 1024 and makes a request for allocation of a resource corresponding to the status data of the uMedia client. In doing so, the pipeline manager 1022 or the resource manager 1024 controls the resource allocation through the data communication with the policy manager 1026 if necessary in association with the resource allocation and the like. For instance, if a resource to be allocated by the resource manager in response to the request made by the pipeline manager 1022 does not exist or is insufficient, an appropriate resource allocation or the like according to the request can be performed according to priority comparison of the policy manager 1026 and the like.

Meanwhile, the pipeline manager 1022 makes a request for pipeline generation for an operation according to the uMedia client's request for the resource allocated according to the resource allocation of the resource manager 1024 to a media pipeline controller 1028.

The media pipeline controller 1028 generates a necessary pipeline under the control of the pipeline manager 1022. Regarding the generated pipelines, as shown in the drawing, pipelines related to play, pause, stop and the like can be generated as well as a media pipeline and a camera pipeline. Meanwhile, the pipelines may include pipelines for HTML5, Web CP, smartshare play, thumbnail extraction, NDK, cinema, MHEG (Multimedia and Hypermedia Information coding Experts Group) and the like.

Besides, pipelines may include a service based pipeline (self-pipeline) and a URI based pipeline (media pipeline) for example.

Referring to FIG. 10, the application or service including the RM client may not be directly connected to the media server 1020. The reason for this is that the application or service may directly process a media. So to speak, in case that the application or service directly processes media, the media server can be bypassed. Yet, in doing so, since resource management is necessary for the pipeline generation and usage, a uMS connector functions for it. Meanwhile, if a resource management request for the direct media processing of the application or service is received, the uMS connector communicates with the media server 1020 including the resource manager 1024. To this end, the media server 1020 should be provided with a uMS connector as well.

Hence, by receiving the resource management of the resource manager 1024 through the uMS connector, the application or service can cope with the request of the RM client. Such an RM client may process services such as native CP, TV service, $2^{nd}$ screen, flash player, U-tube MSE (media source extensions), cloud game, Skype and the like. In this case, as described above, the resource manager 1024 can manage resource through appropriate data communication with the policy manager 1026 if necessary for the resource management.

Meanwhile, the URI based pipeline is processed through the media server 1020 instead of the case of directly processing media like the RM client. The URI based pipelines may include player factory, Gstreamer, streaming plug-in, DRM (Digital Rights Management) plug-in pipeline and the like.

A method of interfacing between an application and media services is described as follows.

There is an interfacing method using a service on a web application. This may be a Luna Call method using PSB (palm service bridge) or a method using Cordova. This is to extend a display with a video tag. Besides, there may be a method of using HTMS5 standard for video tag or media element.

And, there is a method of interfacing using a service in PDK.

Alternatively, there is a method of using a service in an existing CP. This is usable by extending plug-in of an existing platform on the basis of luna for backward compatibility.

Finally, there is an interfacing method in case of non-Web OS. In this case, it is able to interface by directly calling a luna bus.

Seamless change is processed by a separate module (e.g., TVWIN), which is a process for showing a TV on a screen preferentially without Web OS and then processing seamlessly before or during Web OS booting. Since a booting time of Web OS is considerably long, it is used to provide basic functions of a TV service preferentially for a quick response to a user's power-on request. And, the module is a part of a TV service process and supports a seamless change capable of providing fast booting and basic TV functions, a factory mode and the like. And, the module may be in charge of a switching from non-Web OS mode to Web OS mode.

Referring to FIG. 11, a processing structure of a media server is illustrated.

In FIG. 11, a solid line box may indicate a process handling configuration and a dotted line box may indicate an internal processing module in a process. A solid line arrow may include an inter-process call, i.e., a luna service call and a dotted line arrow may indicate a notification of register/notify or a data flow.

A service, a web application or a PDK application (hereinafter 'application) is connected to various service processing configurations through a luna-service bus. Through it, the application operates or an operation of the application is controlled.

A corresponding data processing path is changed according to a type of an application. For instance, if the application is an image data related to a camera sensor, it is processed by being sent to a camera processor 1130. Herein, the camera processor 1130 includes a gesture module, a face detection module and the like and processes image data of the application received. Herein, in case of data requiring a usage of a pipeline and the like automatically or according to a user's selection, the camera processor 1130 may process the corresponding data by generating the pipeline through a media server processor 1110.

Alternatively, if an application includes audio data, the corresponding audio can be processed through an audio processor (AudioD) 1140 and an audio module (PulseAudio) 1150. For instance, the audio processor 1140 processes audio data received from the application and then sends it to an audio module 1150. In doing so, the audio processor 1140 may determine the processing of the audio data by including an audio policy manager. The processed audio data is processed and handled by the audio module 1150. Meanwhile, the application may notify data related to the audio data processing to the audio module 1160, which may be notified to the audio module 1160 by a related pipeline. The audio module 1150 includes ALSA(Advanced Linux Sound Architecture).

Or, in case that an application includes or processes (hereinafter 'includes') a DRM hooked content, a corresponding content data is sent to a DRM service processor 1160. The DRM service processor 1160 generates the DRM hooked content data by generating a DRM instance. Meanwhile, for the processing of the DRM hooked content data, the DRM service processor 1160 can be connected to a DRM pipeline in a media pipeline through the luna-service bus.

A processing for a case that an application includes media data or TV service data (e.g., broadcast data) is described as follows.

FIG. 12 is a diagram showing details of the media service processor and the TV service processor in FIG. 11.

The following description is made with reference to FIG. 11 and FIG. 12 both.

First of all, in case that an application includes TV service data, it is processed by the TV service processor 1120/1220.

Herein, the TV service processor 1120 may include at least one of a DVR/channel manager, a broadcast module, a TV pipeline manager, a TV resource manager, a data broadcast module, an audio setting module, a path manager and the like. Alternatively, the TV service processor 1220 in FIG. 12 may include a TV broadcast handler, a TV broadcast interface, a service processing unit, a TV middleware (MW), a path manager, and a BSP (NetCast). Herein, the service processing unit may mean a module including a TV pipeline manager, a TV resource manager, a TV policy manager, a USM connector and the like.

In the present specification, The TV service processor may be implemented into the configuration shown in FIG. 11 or FIG. 12 or a combination of both configurations. some of the illustrated components may be omitted or new components (not shown) may be further added as required.

Based on attribute or type of the TV service data received from the application, the TV service processor 1120/1220 sends DVR or channel associated data to the DVR/channel manager and also sends it to the TV pipeline manager to generate and process a TV pipeline. Meanwhile, if the attribute or type of the TV service data is a broadcast content data, the TV service processor 1120 generates and processes a TV pipeline through the TV pipeline manager to process the corresponding data through the broadcast module.

Or, a json (Javascript standard object notation) file or a file composed with c is processed by the TV broadcast handler, sent to the pipeline manager through the TV broadcast interface, and then processed by generating a TV pipeline. In this case, the TV broadcast interface sends the data or file through the TV broadcast handler to the TV pipeline manager on the basis of the TV service policy so that the data or file can be referred to for the pipeline generation.

Meanwhile, the TV pipeline manager may be controlled by the TV resource manager when generating one or more pipelines in response to a TV pipeline generation request from the Processing module or manager in the TV service. Meanwhile, in order to request a status and allocation of a resource allocated for the TV service in response to a TV pipeline generation request made by the TV pipeline manager, the TV resource manager may be controlled by the TV policy manager and performs data communication with the media server processor 1110/1210 through the uMS connector. The resource manager in the media server processor delivers a status and a presence/non-presence of allocation of a resource for a current TV service in response to a request made by the TV resource manager. For instance, as a result of confirmation of the resource manager within the media server processor 1110/1210, if all resources for the TV service are already allocated, it is able to notify the TV resource manager that all current resources are completely allocated. In doing so, the resource manager in the media server processor may request or assign TV pipeline generation for the requested TV service by removing a prescribed TV pipeline according to a priority or prescribed reference from TV pipelines previously assigned for the TV service, together with the notification. Alternatively, according to a status report of the resource manager in the media server processor 1110/1210, the TV resource manager may control TV pipelines to be appropriately removed, added, or established.

Meanwhile, BSP supports backward compatibility with an existing digital device for example.

The above-generated TV pipelines may operate appropriately in the corresponding processing process under the control of the path manager. The path manager may determine or control a processing path or process of pipelines by considering an operation of a pipeline generated by the media server processor 1110/1210 as well as the TV pipeline in the processing process.

If the application includes media data instead of TV service data, the data is processed by the media server processor 1110/1210. Herein, the media server processor 1110/1210 includes a resource manager, a policy manager, a media pipeline manager, a media pipeline controller and the like. Meanwhile, various pipelines generated under the control of the media pipeline manager and the media pipeline controller may include a camera preview pipeline, a cloud game pipeline, a media pipeline and the like. Streaming protocol, auto/static gstreamer, DRM and the like may be included in the media pipeline, of which processing flow may be determined under the control of the path manager. The former description with reference to FIG. 10 is recited for a detailed processing process in the media server processor 1110/1210, which is not described redundantly herein.

In the present specification, the resource manager in the media server processor 1110/1210 can perform a resource managing with a counter base for example.

Figure 13:
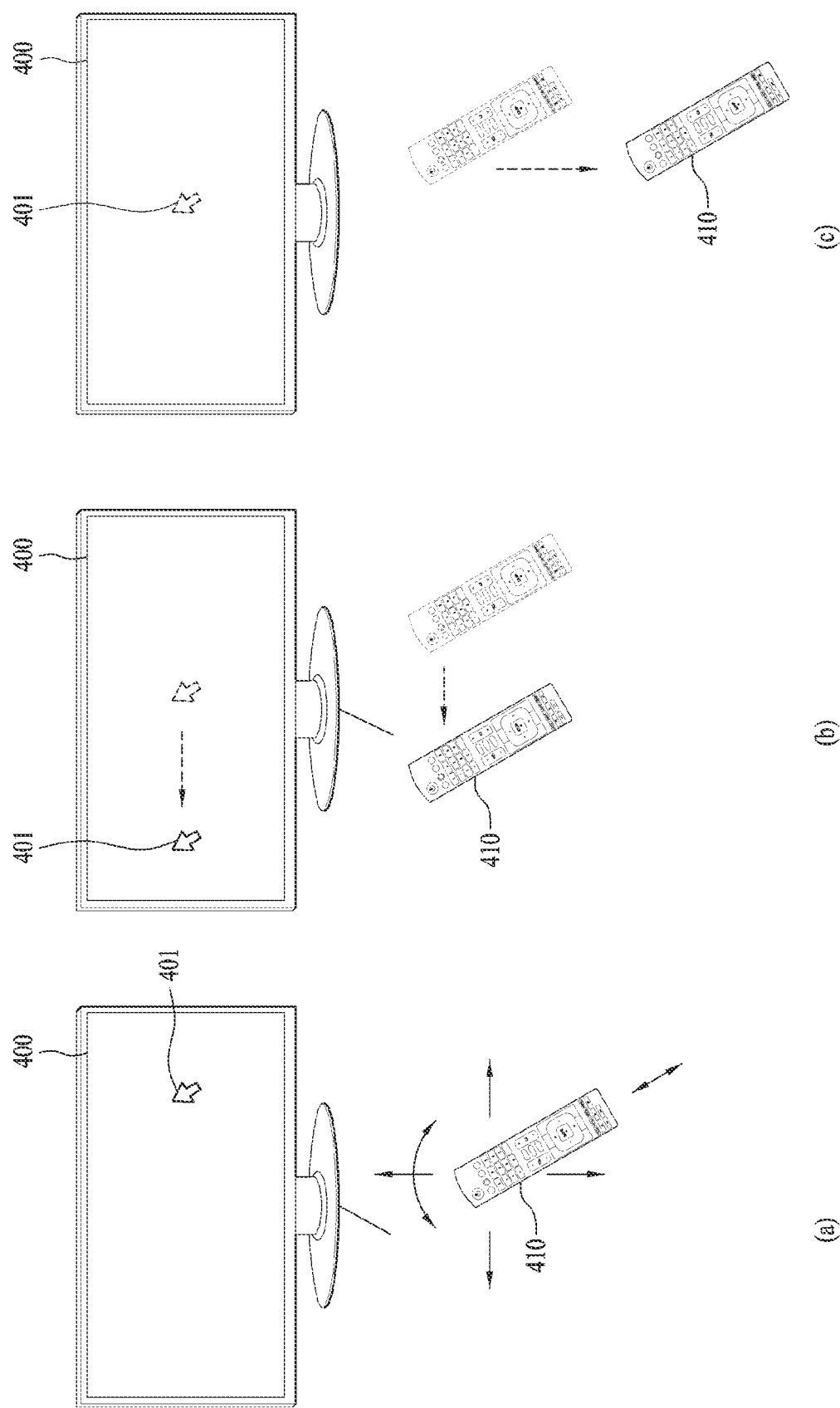
FIG. 13 is a diagram illustrating a control method for a remote control device for controlling an arbitrary one among image display devices according to embodiments of the present invention.

FIG. 13 is a diagram illustrating a control method for a remote control device for controlling an arbitrary one among image display devices according to embodiments of the present invention.

As shown in FIG. 13(*a*), a pointer 205 corresponding to the remote control device 200 is displayed on the display unit 180.

A user may move or rotate the remote control device 200 vertically (as shown in FIG. 13(*b*)) or horizontally (as shown in FIG. 13(*c*)). The pointer 205 displayed on the display unit 180 of the image display device corresponds to a movement of the remote control device 200. Since the corresponding pointer 205 is moved and displayed according to a movement on a 3D space as show in the drawing, the remote control device 200 may be referred to as a spatial remote controller.

FIG. 13(*b*) illustrate a case in which when a user moves the remote control device 200 to the left, the pointer 205 displayed on the display unit 180 of the image display device also moves to the left in response to the user's movement.

Information on a movement of the remote control device 200 detected through a sensor of the remote control device 200 is transmitted to the image display device. The image display device may calculate the coordinates of the pointer 205 from the information on the movement of the remote control device 200. The image display device may display the pointer 205 to match the calculated coordinates.

FIG. 13(c) illustrates a case in which while a specific button in the remote control device 200 is pressed, a user moves the remote control device 200 away from the display unit 180. By doing so, a selection area in the display unit 180 corresponding to the pointer 205 may be zoomed in and enlarged. On the other hand, when a user moves the remote control device 200 close to the display unit 180, a selection area in the display unit 180 corresponding to the pointer 205 may be zoomed out and reduced. On the contrary, when the remote control device 200 is away from the display unit 180, a selection area may be zoomed out, and when the remote control device 200 is close to the display unit 180, a selection area may be zoomed in.

Additionally, when a specific button in the remote control device 200 is pressed, the recognition of a vertical or horizontal movement may be excluded. That is, when the remote control device 200 is moved away from or close to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, the pointer 205 in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 may be displayed on one point of a horizontal axis and a vertical axis on the display unit 180 and also may be displayed on a plurality of points such as a line and a surface.

Figure 14:
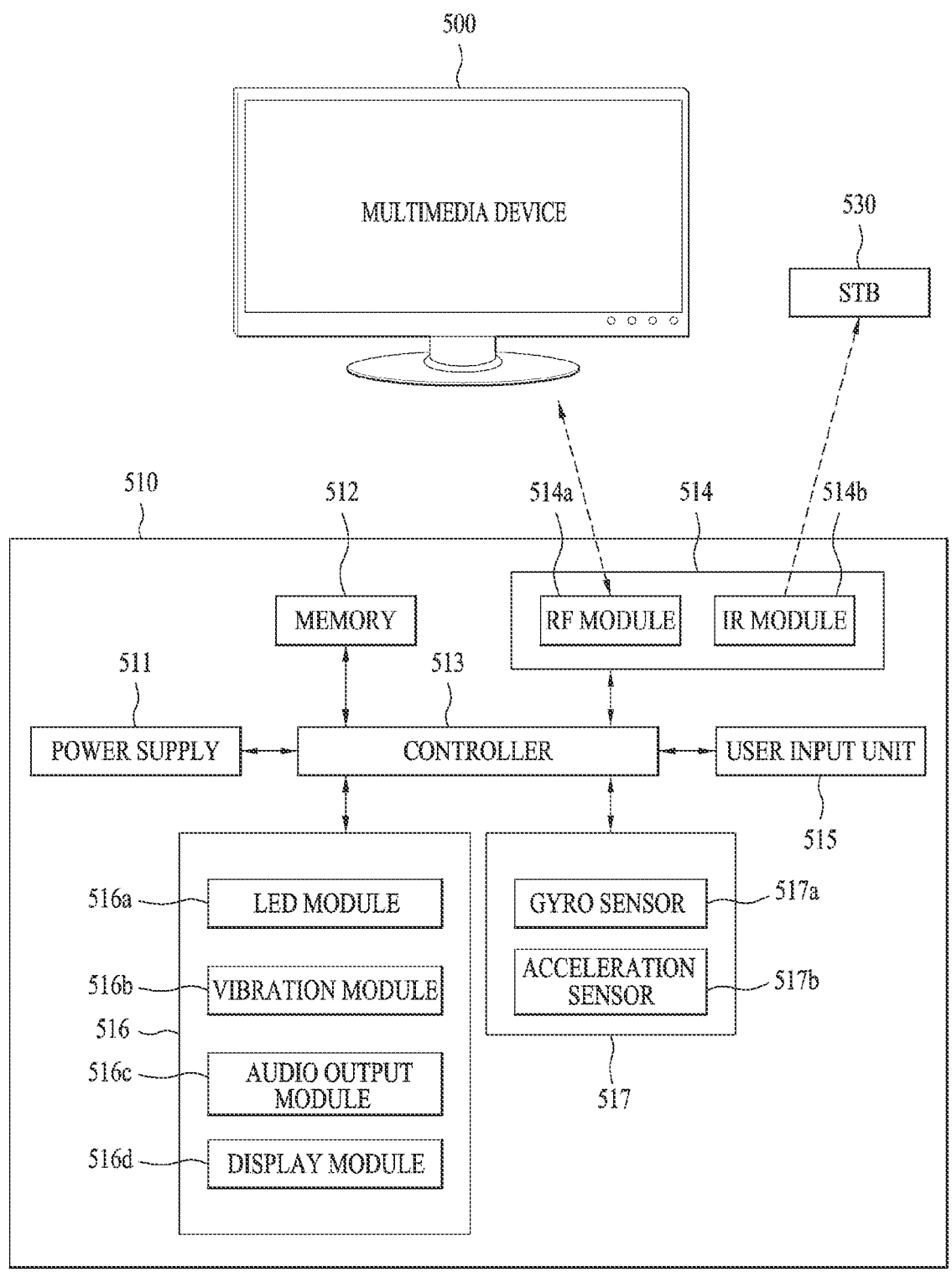
FIG. 14 is a block diagram illustrating the inside of a remote control device for controlling an arbitrary one among image display devices according to embodiments of the present invention.

FIG. 14 is a block diagram illustrating the inside of a remote control device for controlling an arbitrary one among image display devices according to embodiments of the present invention.

As shown in FIG. 14, the remote control device 200 may include a wireless communication unit 225, a user input unit 235, a sensor unit 240, an output unit 250, a power supply unit 260, a storage unit 270, and a control unit 280.

The wireless communication unit 225 transmits and receives signals to and from any arbitrary one of the image display devices according to the aforementioned embodiments of the present invention. Hereinafter, a description will be given by taking as an example an image display device 100 among the image display devices according to the embodiments of the present invention.

In the present embodiment, the remote control device 200 may include an RF module 221 configured to transmit and receive signals to and from the image display device 100 according to the RF communication standards and an IR module 223 configured to transmit and receive signals to and from the image display device 100 according to IR the communication standards.

In addition, the remote control device 200 may transmit a signal carrying information on the motions of the remote control device 200 to the image display device 100 through the RF module 221.

Moreover, the remote control device 200 may receive a signal transmitted from the image display device 100 through the RF module 221. Additionally, if necessary, the remote control device 200 may transmit commands for power on/off, channel change, volume change, and the like to the image display device 100 through the IR module 223.

The user input unit 235 may be configured with a keypad, a button, a touch pad, or a touch screen. A user may manipulate the user input unit 235 to input a command related to the image display device 100 through the remote control device 200. If the user input unit 235 includes a hard key button, the user may input a command related to the image display device 100 through the remote control device 200 using the push operation of the hard key button. If the user input unit 235 includes a touch screen, the user may input a command related to the image display device 100 by touching a soft key of the touch screen through the remote control device 200. Additionally, the user input unit 235 may also include diverse types of input means that can be manipulated by the user, such as a scroll key or a jog key. Further, such examples given in the description of the present invention will not limit the scope of the present invention.

The sensor unit 240 may include a gyro sensor 241 or an acceleration sensor 243.

The gyro sensor 241 may sense information on a movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor to sense a distance from the display unit 180.

The output unit 250 may output image or voice signals corresponding to manipulation of the user input unit 235 or signals transmitted from the image display device 100. The user may recognize whether the user input unit 235 is manipulated or the image display device 100 is controlled through the output unit 250.

For example, the output unit 250 may include an LED module 251 that flashes, a vibration module 253 that generates vibration, a sound output module 255 that outputs sound, or a display module 257 that outputs an image, if the user input unit 235 is manipulated or signals are transmitted/received to/from the image display device 100 through the wireless communication unit 225.

The power supply unit 260 may supply power to the remote control device 200 and if the remote control device 200 does not move during a predetermined time, stop the power supply, so that power consumption may be reduced. The power supply unit 260 may resume power supply if a predetermined key disposed on the remote control device 200 is manipulated.

The storage unit 270 may store various kinds of programs and application data necessary for control or operation of the remote control device 200. If the remote control device 200 transmits/receives signals wirelessly to/from the image display device 100 through the RF module 221, the remote control device 200 and the image display device 100 transmit and receive signals through a predetermined frequency band. The control unit 280 of the remote control device 200 may store, in the storage unit 270, information on a frequency band for transmitting/receiving signals to/from the image display device 100 paired with the remote control device 200 and refer to it.

The control unit 280 may control overall operations for the remote control device 200. The control unit 280 may transmit a signal corresponding to a predetermined key manipulation of the user input unit 235 or a signal corresponding to a movement of the remote control device 200 sensed by the sensor unit 240 to the image display device 100 through the wireless communication unit 225.

Figure 15:
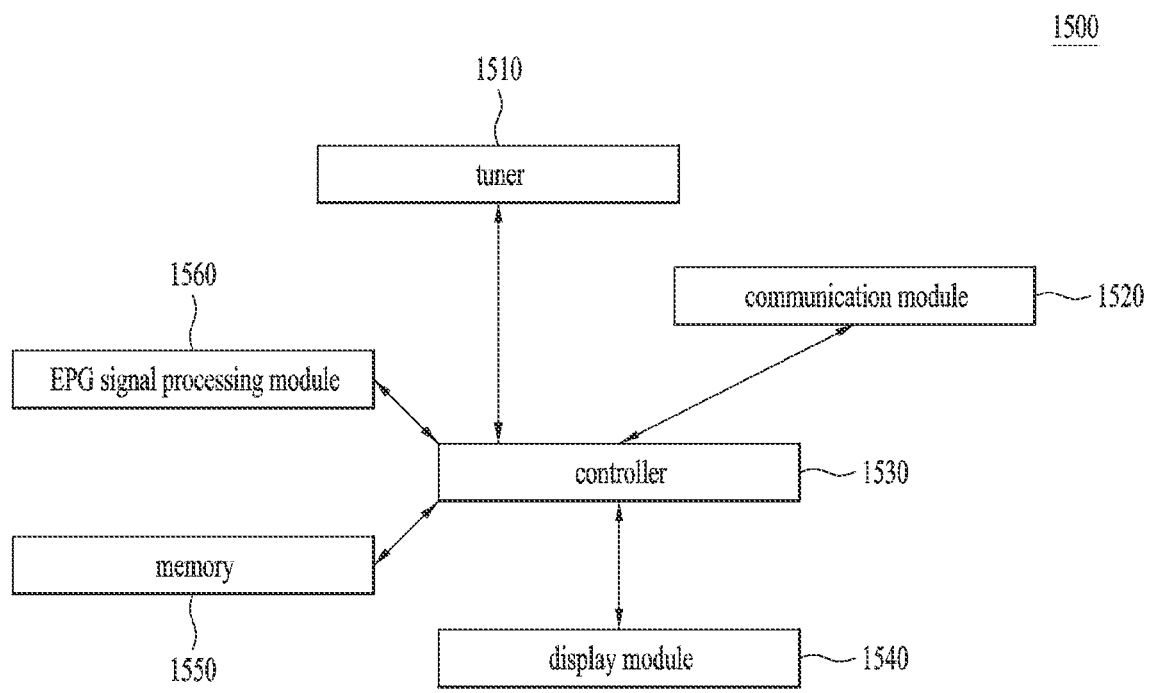
FIG. 15 is a block diagram illustrating the configuration of a multimedia device according to an embodiment of the present invention.

FIG. 15 is a block diagram illustrating the configuration of a multimedia device according to an embodiment of the present invention.

Referring to FIG. 15, a multimedia device 1500 according to an embodiment of the present invention includes a tuner 1510, a communication module 1520, a controller 1530, a display module 1540, a memory 1550, and an EPG signal processing module 1560. It will of course be apparent that, if necessary, some of the modules shown in FIG. 15 may be switched or deleted or other modules may be added, without departing from the scope of the appended claims and their equivalents. Moreover, for example, the multimedia device 1500 may be one of a television and a set top box (STB). Further, FIG. 15 could be supplementarily interpreted with reference to the features described in FIG. 2.

The tuner 1510 receives a broadcast signal, an audio decoder (not shown in the drawing) decodes audio data included in the received broadcast signal, and a video decoder (not shown in the drawing) performs decodes video data included in the received broadcast signal.

The display module 1540 displays the decoded video data on a first area, and an interface module (or the communication module 1520) receives at least one command from an external device.

The controller 1530 controls at least one of the tuner 1510, the display module 1540 and the interface module. In addition, the controller 1530 executes a specific area enlargement mode in accordance with the at least one command received from the external device. Moreover, the controller 1530 displays video data corresponding to the video data on a second area within the first area. In this case, the second area includes an indicator, and the video data displayed on the first area is changed depending on at least one of a location of the indicator and a size of the indicator.

According to another embodiment of the present invention, the above-mentioned process can be applied to video data stored in the memory 1550 rather than the broadcast signal. In addition, the controller 1530 automatically executes the specific area enlargement mode in accordance with category information of the received broadcast signal. The category information of the broadcast signal is designed to be processed by the EPG signal processing module 1560.

For instance, the above-mentioned indicator is implemented as a graphic image of a guide box guiding a specific area that will be or has been enlarged. Details will be described later with reference to FIG. 19.

Depending on the video data of the received broadcast signal, the controller 1530 changes coordinate information of a pointer that moves in accordance with a motion of the external device. For instance, if resolution information of the video data of the received broadcast signal corresponds to high definition (HD), the coordinate information of the pointer is designed to be scaled by 0.66 times. If the resolution information of the video data of the received broadcast signal corresponds to full high definition (FHD), the coordinate information of the pointer is designed to be scaled by 1 time. If the resolution information of the video data of the received broadcast signal corresponds to ultra-high definition (UHD), the coordinate information of the pointer is designed to be scaled by 2 times. It will be described in detail with reference to FIG. 27.

If an enlargement or reduction magnification of the video data displayed on the first area is changed in accordance with the at least one command received from the external device after the specific area enlargement mode has been executed, the controller 1530 automatically changes the size of the indicator in the second area. It will be described in detail with reference to FIG. 31.

If the specific area to be enlarged is recognized within the first area in accordance with the at least one command received from the external device after the specific area enlargement mode has been executed, the controller 1530 automatically changes the center point of the indicator in the second area. It will be described in detail with reference to FIG. 32.

The controller 1530 controls both of the video data and the indicator within the second area to be removed after the elapse of a predetermined time after executing the specific area enlargement mode or in accordance with the at least one command received from the external device. It will be described in detail with reference to FIG. 33.

Moreover, after both of the video data and the indicator within the second area have been removed, the controller 1530 displays a graphic image for guiding that the specific area enlargement mode is being executed. In this case, the graphic image includes information indicating the enlargement magnification. The controller 1530 is designed to display both of the video data and the indicator on the second area again in accordance with a command for selecting the graphic image. It will be described in detail with reference to FIG. 34.

For instance, the location or size of the indicator is changed based on information obtained from a touch sensor or motion sensor of the external device. For example, the external device can be designed as described with reference to FIGS. 6, 13 and 14. In more particular, for example, the external device corresponds to a remote controller or a mobile device, which includes at least one of a radio frequency (RF) module and an infrared (IR) module.

For example, the aforementioned first area corresponds to a full screen of the television, and the second area corresponds to a partial area included in the first area. Details will be further described with reference to FIG. 19.

Figure 16:
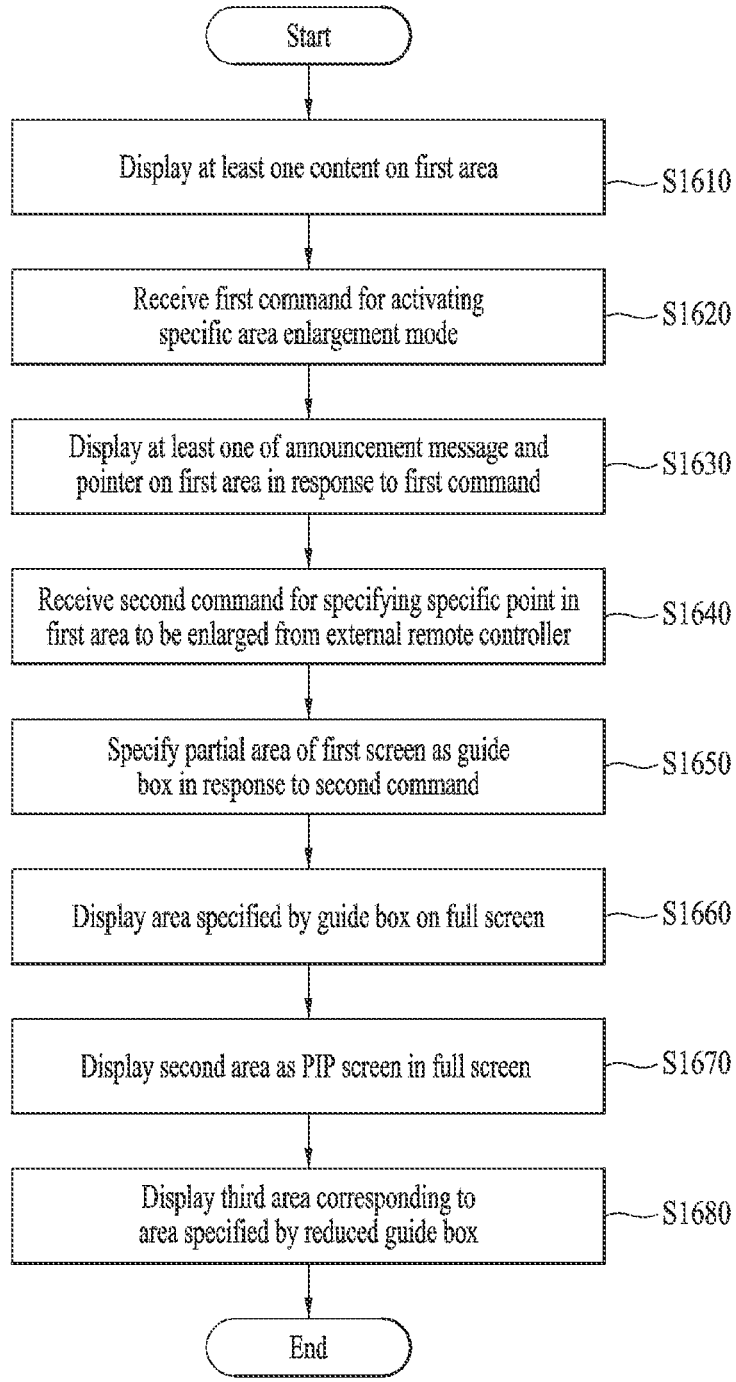
FIG. 16 is a flowchart for explaining a control method for a multimedia device according to an embodiment of the present invention.

FIG. 16 is a flowchart for explaining a control method for a multimedia device according to an embodiment of the present invention. It will of course be apparent that FIG. 16 could be supplementarily interpreted with reference to the features described in FIG. 15.

Referring to FIG. 16, a multimedia device according to an embodiment of the present invention performs decoding on video data that is received externally or stored in a memory [S1610], displays the decoded video data on a first area [S1620], and then receives at least one command from an external device [S1630]. For instance, the multimedia device corresponds to one of a television, an STB and the like.

Moreover, the multimedia device executes a specific area enlargement mode in accordance with the at least one commands received from the external device [S1640] and displays video data corresponding to the video data on a second area within the first area [S1650].

In addition, the second area includes an indicator, and the video data displayed on the first area is changed depending on at least one of a location of the indicator and a size of the indicator. More details will be further described with reference to FIG. 19.

Figure 17:
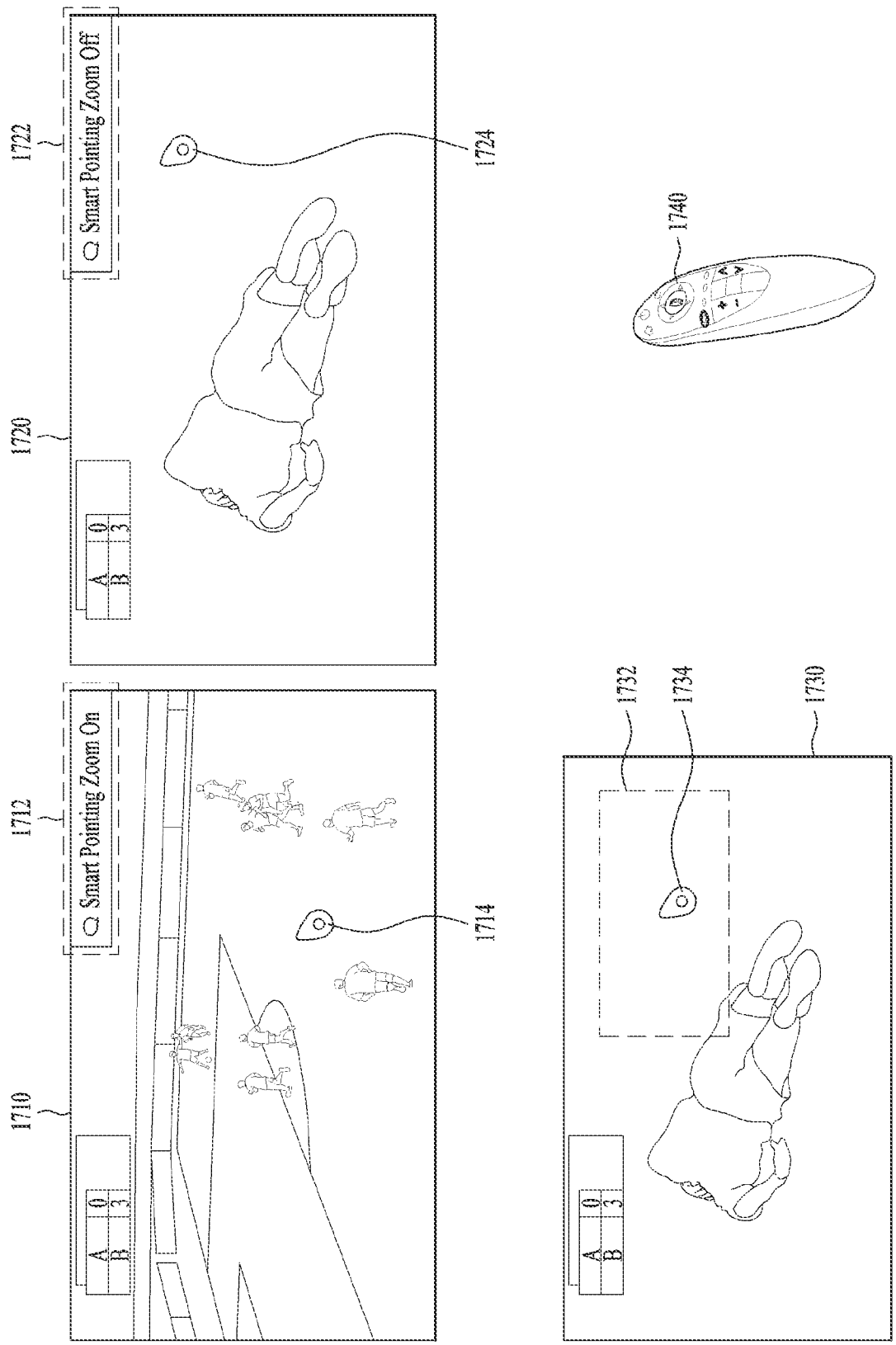
FIG. 17 is a diagram illustrating a case in which a mode for enlarging a specific area (hereinafter referred to as a specific area enlargement mode) is activated according to an embodiment of the present invention.

FIG. 17 is a diagram illustrating a case in which a specific area enlargement mode is activated according to an embodiment of the present invention.

As shown in the top left drawing 1710 of FIG. 17, in case the controller 1530 receives a command for activating a specific area enlargement mode from an external remote controller 1740 through the communication module 1520, the controller 1530 displays at least one of a notification message 1712 indicating that the specific area enlargement mode is activated and a pointer 1714 capable of selecting a specific point to be enlarged on a first area 1710.

If the controller 1530 receives a command for specifying the specific point to be enlarged within the first area from the external remote controller 1740 through the communication module 1520, the controller 1530 specifies an area including the specific point using the pointer in response to the command, enlarges the specified area including the specific point, and then displays the enlarged specified area including the specific point.

As shown in the top right drawing 1720 of FIG. 17, in case the controller 1530 receives a command for deactivating the specific area enlargement mode from the external remote controller 1740 through the communication module 1520, the controller 1530 displays a notification message 1722 indicating that the specific area enlargement mode is deactivated. A pointer 1724 capable of selecting a specific point is designed to be removed within a first area 1720.

As shown in the bottom left drawing 1730 of FIG. 17, the controller 1530 receives a command for selecting a specific part of the first area using a pointer 1734 from the external remote controller 1740 through the communication module 1520 and then displays a specific area 1732 to be enlarged in response to the received command in advance. Therefore, from the perspective of a user, it is advantageous in that the user can check an area to be enlarged in advance.

Figure 18:
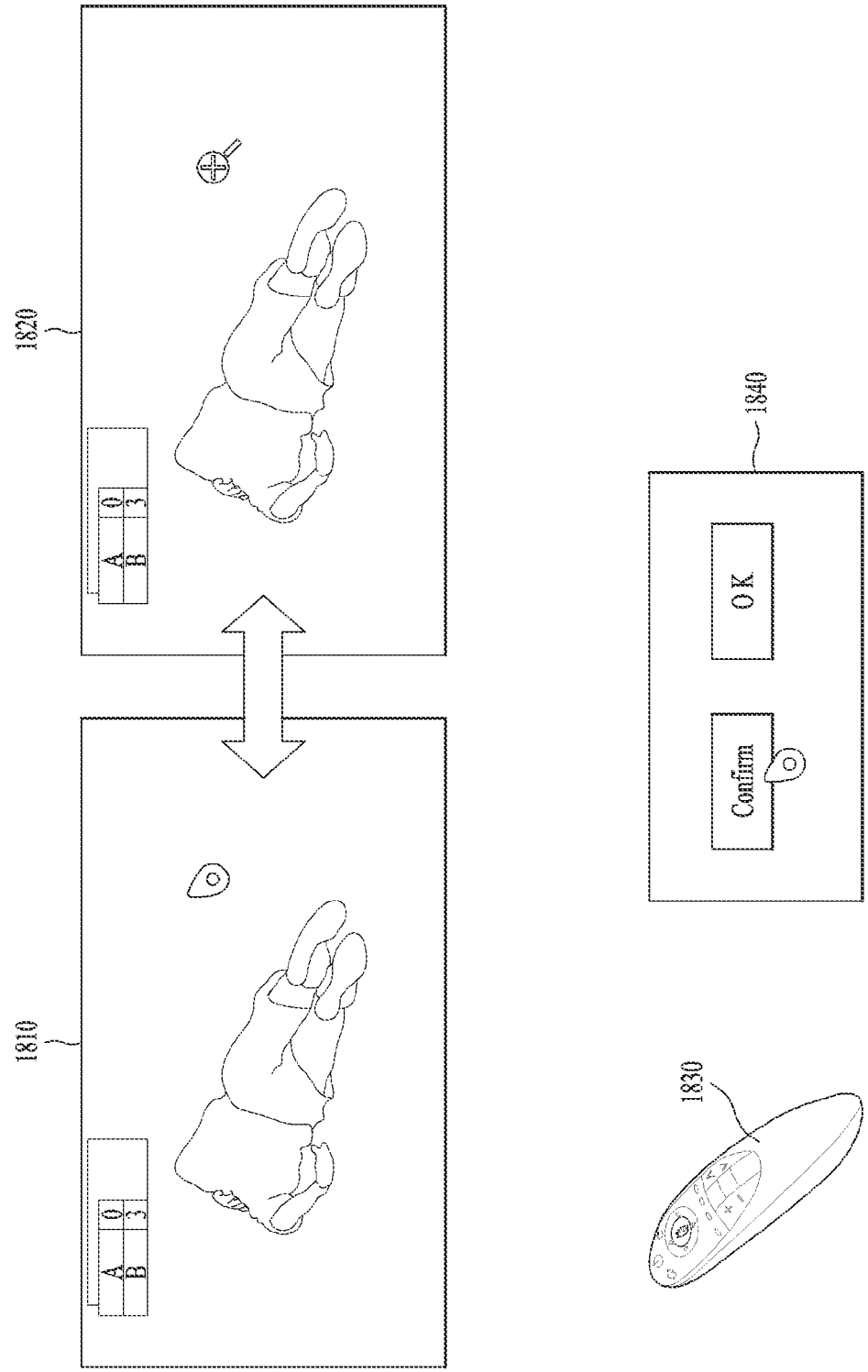
FIG. 18 is a diagram illustrating a case in which a pointer shape is changed when a specific area enlargement mode is activated according to an embodiment of the present invention.

FIG. 18 is a diagram illustrating a case in which a pointer shape is changed when a specific area enlargement mode is activated according to an embodiment of the present invention.

As shown in FIG. 18, if a specific area enlargement mode 1840 is activated by a command received from an external remote controller 1830, the controller 1530 changes a pointer shape from an original shape (first graphic image) to a different shape (second graphic image).

For instance, if a magnification ratio of the specific area enlargement mode increases, the controller 1530 changes a pointer shape from an original shape 1810 to the '+' shape 1820.

If the magnification ratio of the specific area enlargement mode decreases, the controller 1530 changes the pointer shape from the original mode to the '−' shape.

That is, according to an embodiment of the present invention, if the specific area enlargement mode is activated, the pointer shape is changed to a magnifying glass shape. In addition, the pointer shape varies depending on an increase and decrease in the magnification ratio. Therefore, the user can intuitively know whether the specific area enlargement mode is initiated and whether the magnification ratio increases, thereby improving user convenience.

Figure 19:
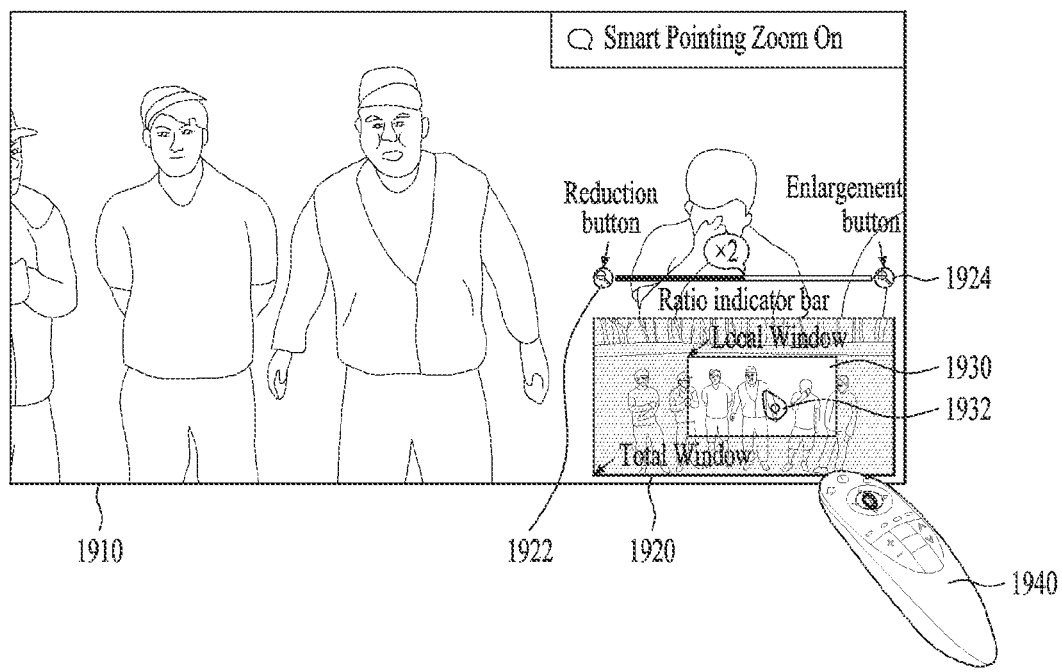
FIG. 19 is a diagram illustrating an example of controlling a screen when a specific area enlargement mode is activated according to an embodiment of the present invention.

FIG. 19 is a diagram illustrating an example of controlling a screen when a specific area enlargement mode is activated according to an embodiment of the present invention. Hereinafter, 'specific area enlargement mode' can be referred to as 'enlargement mode' for convenience of description.

First of all, a display device according to an embodiment of the present invention displays a content on a main screen 1910 and enters an enlargement mode in accordance with an enlargement input request received from a remote controller.

The display device displays a window 1920 including the content displayed on the main screen 1910 and an indicator 1930 for selecting a specific area of the displayed content within the displayed window 1920.

The display device enlarges the selected specific area of the displayed content. In addition, the display device is designed to display the enlarged selected specific area of the displayed content on the main screen 1910. The above-mentioned content corresponds to a video.

For convenience of description, the main screen 1910 can be referred to as a first region and the window 1920 can be referred to as a second region. There are no limitations on the form and size of the window 1920.

In particular, for example, if the display device receives an input signal (e.g., 'OK' button) from a remote controller 1940 during a predetermined time or more while displaying video data included in a broadcast signal on the main screen 1910, the display device displays the video data even on the window 1920. When the specific area enlargement mode is initially executed, the same video data is displayed on both of the main screen 1910 and the window 1920. In particular, the video data displayed on the main screen 1910 is identical to the that displayed on the window 1920, but the video data has a different size.

Moreover, an indicator 1930 is displayed on the window 1920, and the indicator 1930 is used by a user to select a specific area that the user desires to enlarge. For instance, the indicator 1930 can be implemented as a graphic image of a guide box guiding a specific area that will be or has been enlarged. Moreover, it is apparent that the adoption of other graphic images comes within the scope of the appended claims and their equivalents.

Furthermore, the window 1920 may be named a total window, and the indicator 1930 may be named a local window. A specified area is enlarged through the indicator 1930 and then displayed on the main screen 1910. In other words, when the display device newly enters the specific area enlargement mode, the display device outputs original video data through the main screen 1910. When the specific area to be enlarged is selected through the window 1920 and the indicator 1930, the display device replaces the original video data with the video data where only the specific area is enlarged. That is, the display device displays the video data instead of the original video data. Further, for example, the display device is designed to change a location of the indicator 1930 when a location of a pointer 1932 is changed. Additionally, if the specific area to be enlarged is decided after executing the specific area enlargement mode, the original video data is displayed on the window 1920 by being scaled by 1 time. This means that only the size of the original video data is reduced. Thereafter, the video data where the specific area is enlarged (by greater than 1 time, e.g., 1.2, 1.5 or 2.0 times) is displayed on the main screen 1910 instead of the original video data.

For instance, the controller 1530 is designed to allow the user to easily check the specific area that the user desires to enlarge by adjusting brightness of the inside of the indicator 1930 in the window 1920 to be high and brightness of the outside of the indicator 1930 to be low.

Moreover, a ratio indicator bar including both an enlargement button 1924 and a reduction button 1922 for changing a screen magnification ratio is present on the main screen 1910. If the controller 1530 receives a command for selecting one of the reduction button 1922 and the enlargement button 1924 using the pointer 1932, the controller 1530 adjusts a size of the indicator 1930 in response to the command according to a predetermined ratio. The controller 1530 changes a shape of the pointer 1932 according to the command for selecting either the reduction button 1922 and the enlargement button 1924. The ratio indicator/control bar including both of the reduction button 1922 and the enlargement button 1924 is named a second indicator, and it could be distinguished from indicator 1930 mentioned in the foregoing description.

In this case, a minimum value of magnification in accordance with the selection of the reduction button 1922 can be 1 time and a maximum value of magnification in accordance with the selection of the enlargement button 1924 can be 5 times. In this case, the maximum value of the enlargement magnification is not limited to 5 times but can be adjustable. In case the enlargement magnification is smaller than 1 time, an image displayed on the screen is reduced.

For instance, if the controller 1530 receives a command for selecting the reduction button 1922, the controller changes the pointer shape from an original shape of the pointer 1932 to the '−' shape. If the controller 1530 receives a command for selecting the enlargement button 1924, the controller 1530 changes the pointer shape from the original shape of the pointer 1932 to the '+' shape.

Moreover, the window 1920 can be implemented as a PIP screen, and a size of the PIP screen is designed to be adjustable. For instance, if the controller 1530 receives a command for clicking on an edge portion (i.e., corner portion) of the PIP screen and moving it from a first point to a second point different from the first point in a state in which clicking is maintained from an external device (e.g., remote controller), the controller 1530 is able to adjust the size of the PIP screen.

Furthermore, the controller 1530 can change a location of the PIP screen.

For instance, if the controller 1530 receives a command for clicking on the first point of the PIP screen by the pointer and moving it from the first point to the second point within a first area different from the first point in a state in which clicking is maintained from the external remote controller, the controller 1530 can change the location of the PIP screen. In this case, the above-mentioned PIP screen corresponds to the window 1920 shown in FIG. 19.

For example, if the window 1920 is continuously present, it may cause inconvenience to the user in watching the played vide data. Therefore, after elapse of a predetermined time (e.g., three seconds), the controller 1530 switch states of the widow 1920 and the indicator 1930 into a hidden state. Thereafter, if the controller 1530 receives a predetermined command from an external device 1940, the controller 1530 displays the window 1920 and the indicator 1930 on the PIP screen again.

If the pointer 1932 is located at one of a right boundary line, a left boundary line, an upper boundary line, and a lower boundary line of the second area 1920, the controller 1530 changes the states of the widow 1920 and the indicator 1930 into the hidden state. If a specific command is received from the external device 1940, the controller 1530 displays the window 1920 as the PIP screen in the main screen 1910 again.

The controller 1530 moves the indicator 1930 using the pointer 1932, and when the location of the indicator 1930 is changed, the video data displayed on the main screen 1910 is also changed. For example, the video data in the area specified by the indicator 1930 and the enlarged video data displayed on the main screen 1910 are identical to each other but has different sizes (when the main screen 1910 and the indicator 1930 shown in FIG. 19 are compared, it could be more apparent). In particular, for example, if the indicator 1930 in the window 1920 includes a specific object only, the main screen 1910 also displays video data including the specific object only. However, when it is compared with video data within the indicator 1930, the video data within the main screen 1910 is enlarged only.

Therefore, it is possible to obtain an advantage of checking the enlarged specific area of the original video data more rapidly by displaying the changed location and size of the indicator 1930 in real time.

In other words, if the specific area enlargement mode is executed, the original data is displayed on both of the main screen 1910 and the window 1920. However, the video data with the reduced size is displayed on the window 1920. In order to enlarge the specific area, the pointer 1932 can be located within the main screen 1910 or the window 1920. The specific area to be enlarged is confirmed by the pointer 1932 as the center point.

If the specific area to be enlarged is confirmed, the video data where the specific area is enlarged is displayed on the main screen 1910 instead of the original video data. Moreover, the display device can be designed such that the enlarged video data displayed on the main screen 1910 is replaced again with the original video data by adjusting the magnification ratio. When the original video data is displayed on the main screen 1910 again, the user can newly designate a specific area to be enlarged by selecting a random point in the main screen 1910. It is a matter of course that designation of the specific area to be enlarged using the indicator 1930 in the window 1920 comes within the scope of the appended claims and their equivalents.

Furthermore, if an enlargement/reduction magnification is adjusted using the external device 1940 while the video data where the specific area is enlarged is displayed on the main screen 1910, the display device automatically changes the size of the indicator 1930 in the window 1920. Therefore, the user has an advantage of easily checking which portion of the window 1920 corresponds to video data enlarged or reduced on the main screen 1910 in real time.

The second indicator 1922/1924 shown in FIG. 19 is used for setting a magnification level, and a content to be displayed on the main screen 1910 is received through a tuner or an external device. For instance, the external device corresponds to at least one of an STB, a PC and a cellular phone.

The size of the indicator 1930 is automatically changed depending on the magnification level selected through the second indicator 1922/1924.

Furthermore, although not shown in FIG. 16, another embodiment including the steps of receiving a first magnification level for enlarging the displayed content, displaying an magnification indicator having a first display size based on the received first magnification level, receiving a second magnification level for enlarging the displayed content, and displaying an magnification indicator having a second display size different from the first display size based on the received second magnification level can be implemented with reference to FIG. 19.

For instance, the window 1920 includes a picture in picture (PIP) window.

The movement of the window 1920 within the main screen 1910 also comes within the scope of the appended claims and their equivalents. In addition, the movement of the indicator 1930 within the window 1920, which is performed to select another specific area of a content displayed on the window 1920, comes within the scope of the appended claims and their equivalents as well.

The indicator 1930 moves in accordance with a pointer signal received from the remote controller 1940, and the size of the indicator 1930 is changed according to a wheel signal received from the remote controller 1940.

The size of the indicator 1930 is increased in accordance with a reduced magnification level 1922. On the contrary, the size of the indicator 1930 is reduced in accordance with an increased magnification level 1924.

For instance, the indicator 1930 is implemented as a graphic image of a guide box guiding a specific area that will be or has been enlarged.

In another aspect of the present invention, the step of changing coordinate information of the pointer that moves in accordance with a motion of the remote controller according to the video data of the content displayed on the main screen 1910 shown in FIG. 19 is further included. For instance, if resolution information of the video data of the content corresponds to HD, the step of scaling the coordinate information of the pointer by 0.66 times is further included. If the resolution information of the video data of the content corresponds to FHD, the step of scaling the coordinate information of the pointer by 1 time is further included. If the resolution information of the video data of the content corresponds to UHD, the step of scaling the coordinate information of the pointer by 2 times is further included. More details will be further described with reference to FIG. 27.

Both of the window 1920 and the indicator 1930 are controlled to be removed after the elapse of a predetermined time after execution of the enlargement mode or in accordance with at least one command received from the remote controller 1940. After both of the window 1920 and the indicator 1930 has been removed, a graphic image for guiding that the enlargement mode is being executed is displayed. In addition, the graphic image includes information indicating an enlargement magnification. Both of the window 1920 and the indicator 1930 are displayed again according to a command for selecting the graphic image. More details will be further described with reference to FIGS. 31 to 34.

Figure 20:
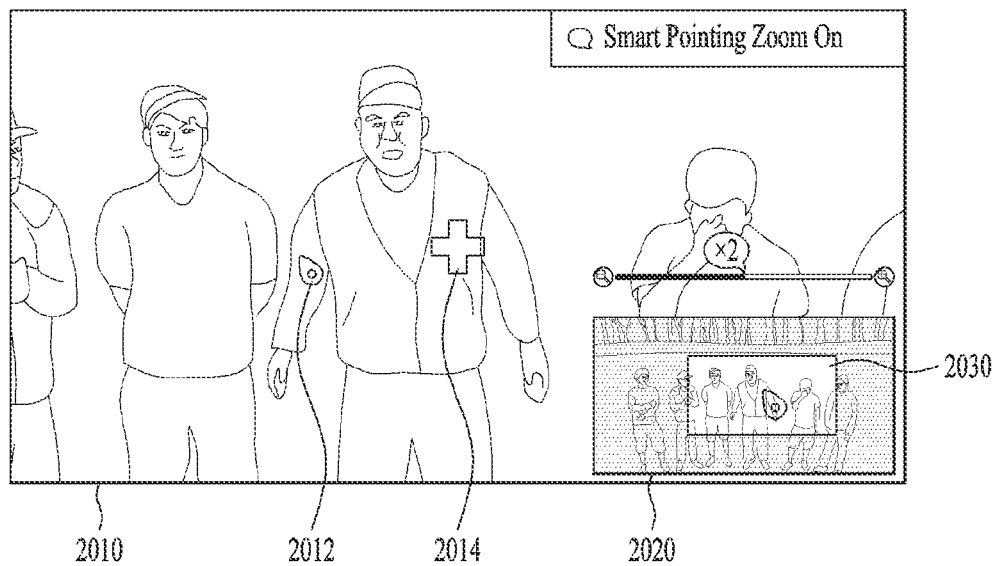
FIG. 20 is a diagram illustrating an example of moving a specific point on an enlarged screen using a pointer when a specific area enlargement mode is activated according to an embodiment of the present invention.

FIG. 20 is a diagram illustrating an example of moving a specific point on an enlarged screen using a pointer when a specific area enlargement mode is activated according to an embodiment of the present invention.

Referring to FIG. 20, if the controller 1530 receives a command for selecting a specific point 2012 of a full screen using a pointer from an external device while displaying an area specified by an indicator 2030 on a first area 2010 through the full screen, the controller 1530 moves a center point of the area specified by the indicator 2030 from an existing center point to the specific point 2012. Subsequently, the controller 1530 generates a new enlargement area with respect to the specific area 2012 and displays the generated new enlargement area through the full screen.

Further, according to another embodiment of the present invention, a center point of a specific area to be enlarged can be selected in a second area 2020, or the center point of the specific area to be enlarged can be selected in the first area 2010. When the center point of the specific area to be enlarged is selected using the first area 2010, it has an advantage of adjusting the enlargement area minutely. On the other hand, when the center point of the specific area to be enlarged is selected using the second area 2020, it has an advantage of changing the specific area while checking original video data.

FIG. 21 is a diagram illustrating an example of controlling a screen using a remote controller when a specific area enlargement mode is activated according to an embodiment of the present invention. As described above, a multimedia device (e.g., TV or STB) according to an embodiment of the present invention is controlled by an external device, and the external device corresponds to a remote controller or a mobile device. Although FIG. 21 shows a remote controller as an example of an external device, the scope of the appended claims and their equivalents is not limited to the remote controller.

According to an embodiment of the present invention, an external remote controller 2140 includes a wheel key 2142, a direction key 2144 and a volume key 2146.

If the controller 1530 receives a specific command corresponding to manipulation of the wheel key 2142 from the external remote controller 2140, the controller 1530 adjusts a screen magnification ratio in accordance with the manipulation of the wheel key 2142.

For example, if the controller 1530 receives a specific command corresponding to an input for rotating a wheel in the upper direction of the wheel key 2142 from the external remote controller 2140, the controller 1530 increases the screen magnification ratio. If the controller 1530 receives a specific command corresponding to an input for rotating the wheel in the lower direction of the wheel key 2142 from the external remote controller 2140, the controller 1530 decreases the screen magnification ratio.

The user can change the screen magnification ratio in the range of 1 time to 5 times through the wheel key of the remote controller. Whenever the wheel key is moved by 1 unit, the screen magnification ratio is changed by 0.2 times. The screen magnification ratio is not fixed but is designed to be capable of being modified through a user configuration.

If the controller 1530 receives a specific command corresponding to manipulation of the volume key 2146 from the external remote controller 2140, the controller 1530 adjusts the screen magnification ratio in accordance with the manipulation of the volume key 2146.

For example, if the controller 1530 receives a specific command corresponding to the '+' part of the volume key 2146 from the external remote controller 2140, the controller 1530 increases the screen magnification ratio. On the other hand, if the controller 1530 receives a specific command corresponding to the '−' part of the volume key 2146 from the external remote controller 2140, the controller 1530 decreases the screen magnification ratio.

If the controller 1530 receives a specific command corresponding to manipulation of the direction key 2144 from the external remote controller 2140, the controller 1530 moves a center point of an area specified by an indicator 2130 from an existing center point to a specific point in accordance with the manipulation of the direction key 2144, generates enlarged video data with respect to the specific point, and then displays the generated enlarged video data on a first area 2110.

If the magnification ratio and location of the specific area are changed using keys of the external remote controller, the location and size of the indicator 2130 within a second area 2120 corresponding to the PIP screen are also changed. According to another embodiment of the present invention, an external remote controller 2150 includes a volume key 2156, a channel key 2152 and a touch pad 2154. It is a matter of course that the external remote controller 2150 is controlled by a motion sensor or a voice recognition sensor.

If the controller 1530 receives a specific command corresponding to manipulation of the volume key 2156 from the external remote controller 2150, the controller 1530 adjusts the screen magnification ratio in accordance with the manipulation of the volume key 2156.

For example, if the controller 1530 receives a specific command corresponding to a part at the top of the volume key 2156 from the external remote controller 2150, the controller 1530 increases the screen magnification ratio. If the controller 1530 receives a specific command corresponding to a part at the bottom of the volume key 2156 from the external remote controller 2150, the controller 1530 decreases the screen magnification ratio.

If the controller 1530 receives a specific command corresponding to manipulation of the channel key 2152, the controller 1530 adjusts the screen magnification ratio in accordance with the manipulation of the channel key 2152.

For example, if the controller 1530 receives a specific command corresponding to a part at the top of the channel key 2152 from the external remote controller 2150, the controller 1530 increases the screen magnification ratio. If the controller 1530 receives a specific command corresponding to a part at the bottom of the channel key 2152 from the external remote controller 2150, the controller 1530 decreases the screen magnification ratio.

If the controller 1530 receives a specific command corresponding to manipulation of the touch pad 2154 from the external remote controller 2140, the controller 1530 moves a center point of an area specified by the indicator 2130 from an existing center point to a specific point in accordance with the operation of the touch pad 2154, generates enlarged video data centering on the specific point, and then displays the generated enlarged video data on the first area 2110.

Figure 22:
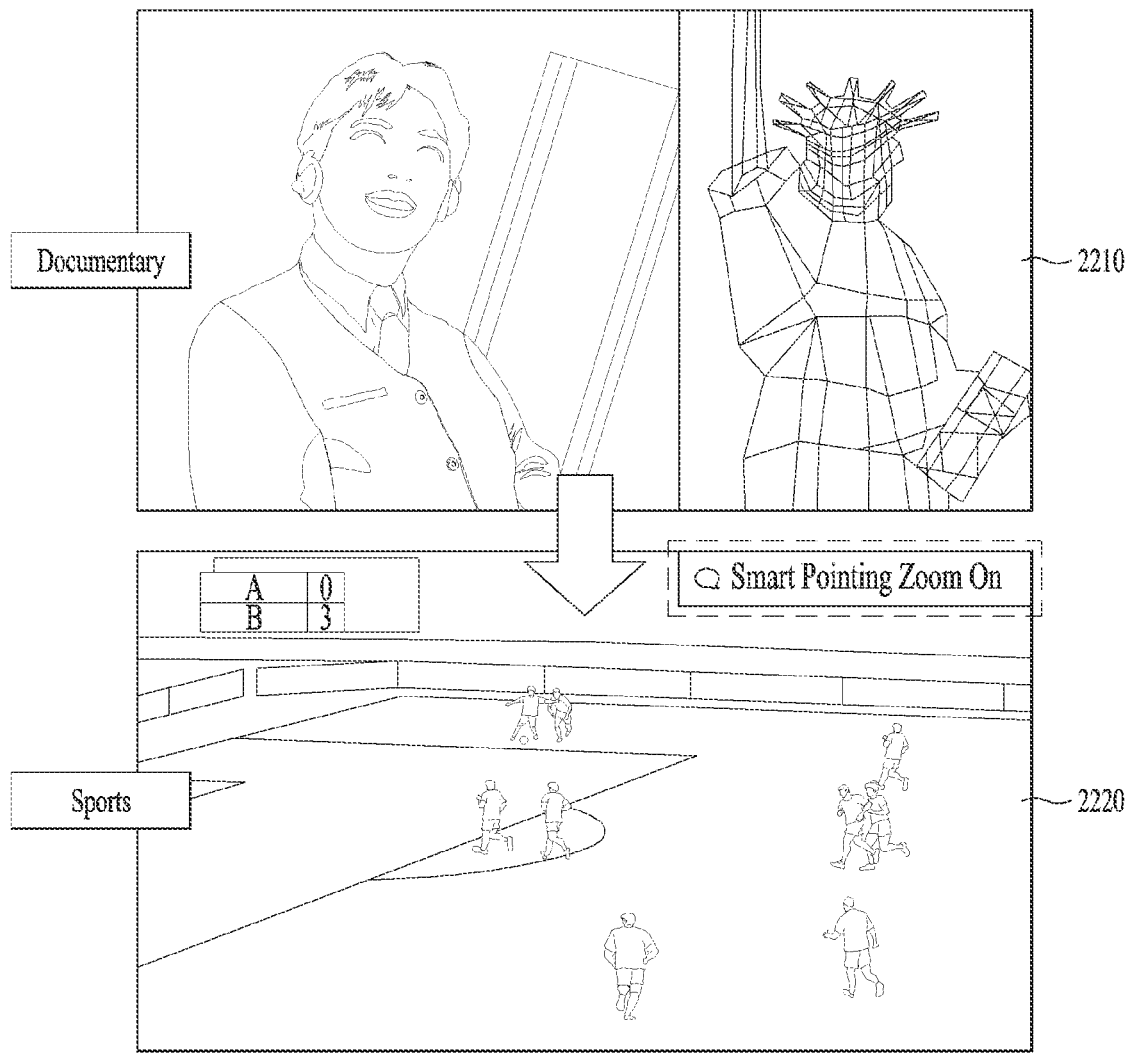
FIG. 22 is a diagram illustrating an example of automatically executing a specific area enlargement mode through association with EPG information according to an embodiment of the present invention.

FIG. 22 is a diagram illustrating an example of automatically executing a specific area enlargement mode through association with EPG information according to an embodiment of the present invention.

Referring to FIG. 22, the EPG signal processing module 1560 extracts category information (e.g., genre information, etc.) from a broadcast signal containing an EPG signal and then analyzes the extracted category. In this case, for example, categories include sports, news, documentary, movie, drama, entertainment, art, talk show and the like.

If the information included in the broadcast signal corresponds to a specific category, the controller 1530 executes the specific area enlargement mode automatically.

For example, if the currently displayed broadcast program (i.e., video data) corresponds to such a category as sports, news or the like, the controller 1530 activates the specific area enlargement mode automatically.

Moreover, if the currently displayed broadcast program (i.e., video data) corresponds to one of adult video, violent video, adult action and X-rated content, the controller 1530 switches a state of the specific area enlargement mode to an off state.

Figure 23:
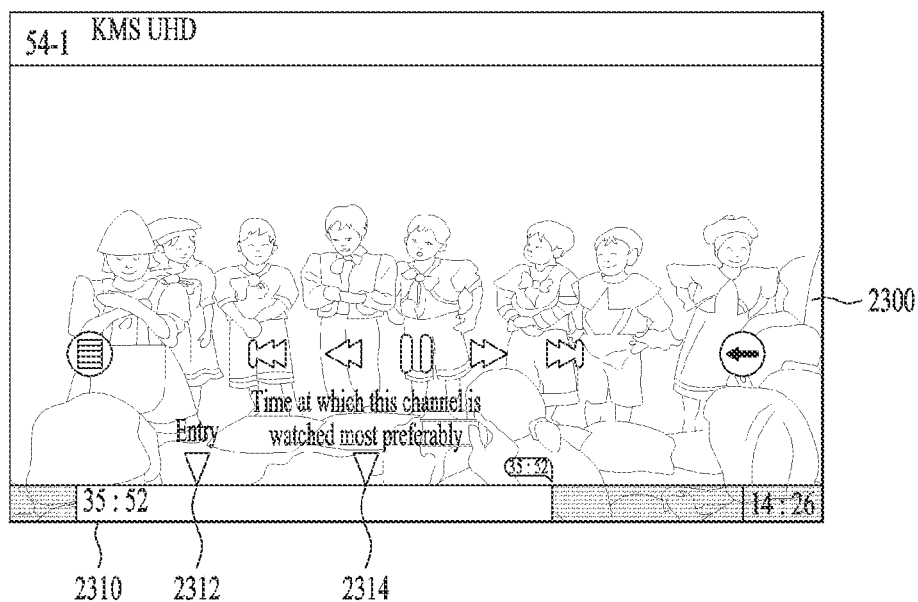
FIG. 23 is a diagram illustrating an example of executing a specific area enlargement mode through association with a time shift function according to an embodiment of the present invention.

Therefore, according to an embodiment of the present invention, it has an advantage of minimizing a time required for entering the specific area enlargement mode or reducing the misuse of the present invention by designing that the specific area enlargement mode is automatically turned on or off in accordance with the category information (e.g., genre information) of video data. FIG. 23 is a diagram illustrating an example of executing a specific area enlargement mode through association with a time shift function according to an embodiment of the present invention.

In this case, a time shift function means the function of enabling a user to watch a missing program in the course of watching TV in real time. For example, the memory 1550 is designed to automatically store a currently displayed broadcast program for a prescribed time even though the memory 1550 does not receive an explicit save command from the user. In this case, for example, the memory 1550 includes a removable hard disk, an external USB memory, a memory built in a multimedia device, and the like.

The controller 1530 displays a bar 2310 indicating a playback time on the bottom of a first area 2300, on which video data is displayed. For example, in case genre information of the video data corresponds to sports, the controller 1530 marks a time 2312 at which a goal is scored and a time 2314 at which the corresponding video data is watched most preferably. The specific times 2312 and 2314 can be collected through EPG information or a web search. The specific area enlargement mode is designed to be automatically executed when the specific times are selected.

According to another embodiment of the present invention, the controller 1530 retrieves at least one piece of video data stored in the memory 1550 and plays a part of the retrieved video data where the specific area enlargement function is performed.

For example, in the case of video data for a specific singer group consisting of 9 members including first and second singers, the user may be interested in only a part where the first and second singers sing. Unlike the conventional time shift function, the controller 1530 stores information on the part where the specific area enlargement function is performed together with the video data in the memory 1550.

The controller 1530 retrieves the part where the specific area enlargement function is performed from the memory 1550 and plays the retrieved part only.

Therefore, according to the present invention, since the part where the specific area enlargement function is automatically performed is retrieved, and the retrieved section is played only, it has an advantageous in that the user does not need to play all part of the video data.

According to a further embodiment of the present invention, the controller 1530 partitions the full screen based on the number of specific area enlargement functions executed for video data temporarily stored in the memory. In addition, the controller 1530 is designed such that the video data where the specific area enlargement function is performed (i.e., the video data where only the specific area is enlarged) is displayed through each of the partitioned screens. For example, regarding one piece of video data (e.g., broadcast program), if a total number of times of execution of the specific area enlargement function is 9, the controller 1530 displays 9 partitioned screens. Thereafter, the controller 1530 displays each part where the specific area enlargement function is performed through each of the 9 partitioned screens.

Hence, it has an advantage of checking a part where the specific area enlargement function is performed more rapidly.

Figure 24:
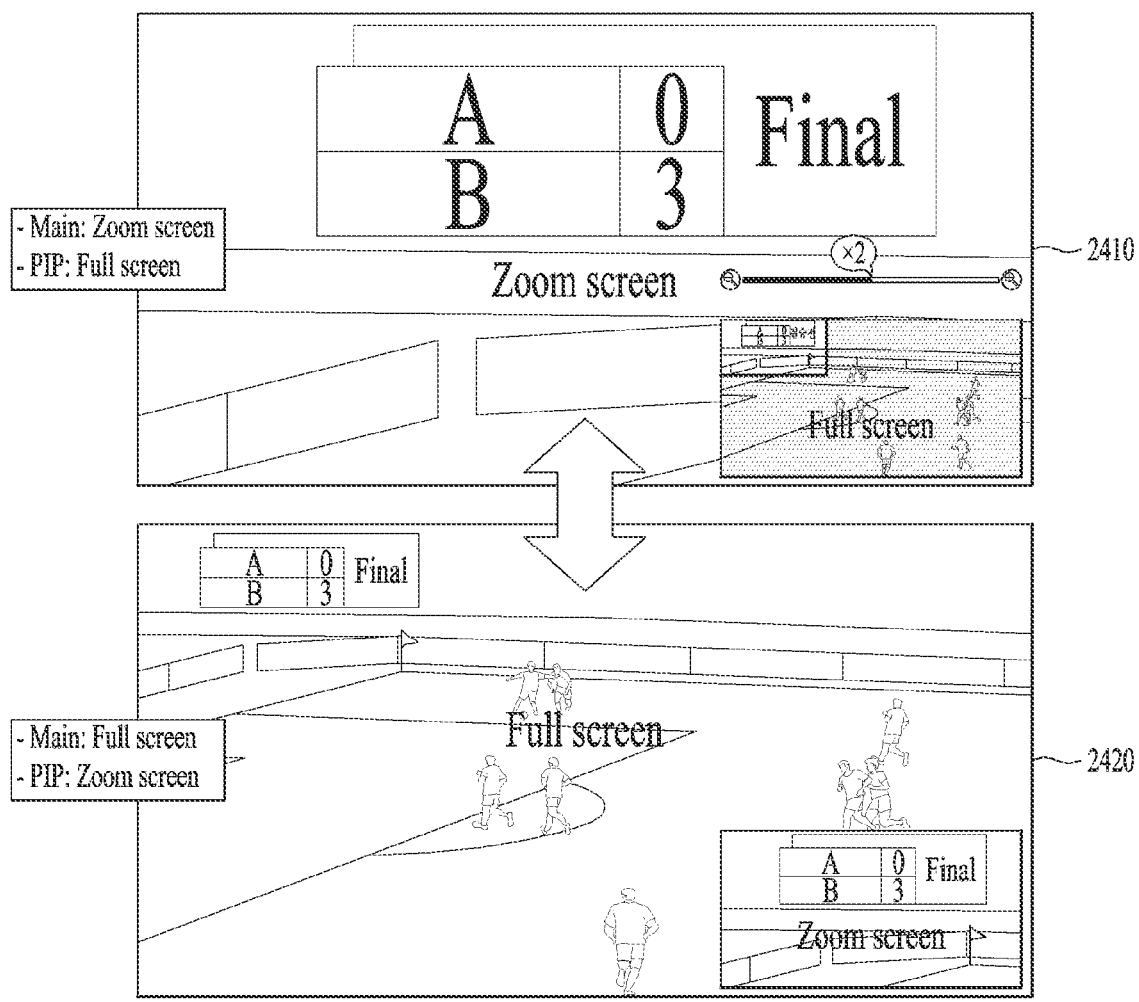
FIG. 24 is a diagram illustrating an example of switching between a full screen and a zoom screen according to an embodiment of the present invention.

FIG. 24 is a diagram illustrating an example of switching between a full screen and a zoom screen according to an embodiment of the present invention.

As shown in FIG. 24, if the controller 1530 receives a specific command from an external remote controller, the controller 1530 switches a video signal to be transmitted to a first area and a video signal to be transmitted to a second area from each other and displays each of the first area and the second area.

In particular, the video signal to be transmitted to the first area corresponds to video data where a specific area is enlarged, and the video signal to be transmitted to the second area corresponds to a reduced size of the original video data.

Thus, as shown in the top drawing 2410 of FIG. 24, the video data having the enlarged specific area is displayed on the main screen and the reduced size of the original video data is displayed on the PIP screen. Specifically, a full screen that is reduced by a prescribed ratio and a location of the enlarged area of the full screen are displayed on the PIP screen.

As shown in the bottom drawing 2420 of FIG. 24, the full screen is displayed on the main screen and a screen with the enlarged specific area is displayed on the PIP screen.

Therefore, according to an embodiment of the present invention, it has an advantage in that if necessary, the original video data or the video data with the enlarged specific area is selectively displayed on the full screen or the PIP screen by rapidly switching therebetween.

Figure 25:
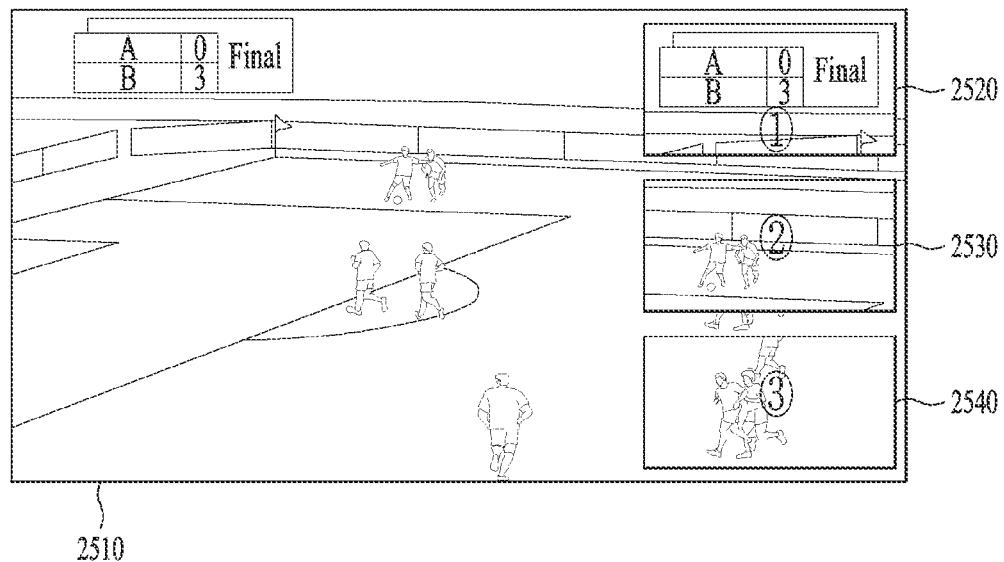
FIG. 25 is a diagram illustrating an example of selecting a plurality of points on a screen and enlarging the selected points according to an embodiment of the present invention.

FIG. 25 is a diagram illustrating an example of selecting a plurality of points on a screen and enlarging the selected points according to an embodiment of the present invention.

Referring to FIG. 25, if the controller 1530 receives a command for specifying a plurality of points in a first area 2510 from an external remote controller through a communication module within a predetermined time in a state in which a specific area enlargement mode is activated, the controller 1530 automatically generates and displays PIP screens amounting to the number of the points.

For instance, if the controller 1530 receives a command for selecting three specific points in the first area 2510 from the external remote controller through the communication module within three seconds after entering the specific area enlargement mode, the controller 1530 displays a first PIP screen 2520, a second PIP screen 2530, and a third PIP screen 2540. Each of the PIP screens includes video data enlarged with respect to each of the three specific points.

According to an embodiment of the present invention, if a user desires to watch a screen by enlarging a plurality of points within the screen, the user can specify the plurality of points. Thereafter, each of the specified points can be displayed on a specific part of the screen as a PIP screen.

In this case, if multiple people are located at different positions of the screen, the user can simultaneously specify the multiple people and identify the specified multiple people. By doing so, the user can know detailed information on clothing, watches and accessories of the identified people more precisely, thereby improving user convenience.

Figure 26:
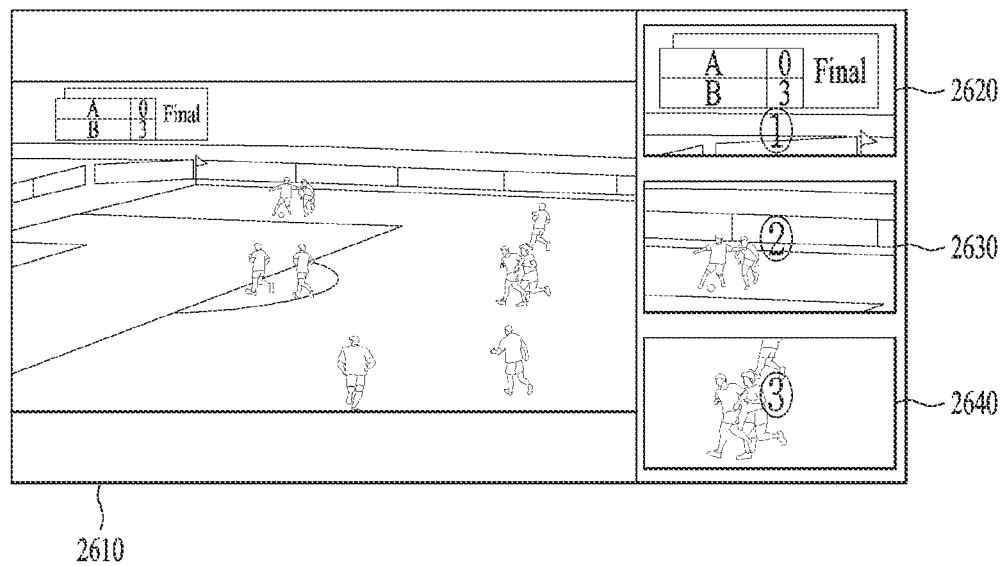
FIG. 26 is a diagram illustrating an example of selecting a plurality of points on a screen and enlarging the selected points according to an embodiment of the present invention.

FIG. 26 is a diagram illustrating an example of selecting a plurality of points on a screen and enlarging the selected points according to an embodiment of the present invention. Since the embodiment of FIG. 26 is similar with that of FIG. 25, a description will be given a difference between the two embodiments only. However, FIG. 26 could be supplementarily interpreted with reference to the features described in FIG. 25.

For example, if the controller 1530 receives a command for selecting three specific points from an external remote controller through a communication module within three seconds after entering the specific area enlargement mode, the controller 1530 reduces a size of a first area 2610 where original video data is displayed by 80% and then displays a first subscreen 2620, a second subscreen 2630 and a third subscreen 2640 on an area except the first area 2610. Each of the PIP screens includes video data enlarged with respect to each of the three specific points.

Compared with FIG. 25, a solution for solving the problem that the original vide data is covered with the PIP screens is provided in FIG. 26. In particular, the size change of the first area where the original vide data is displayed in accordance with the number of subscreens (e.g., subscreens 2620, 2630 and 2640) could be interpreted as one feature of the present invention.

FIG. 27 is a diagram illustrating a solution for a case in which coordinates from a remote controller do not match those of an input video according to an embodiment of the present invention. In a process for implementing another embodiment of the present invention, technical problems that will be mentioned with reference to FIG. 27 and in the following description should be solved.

Referring to FIG. 27, coordinates of a remote controller are 1920×1080 in a two-dimensional plane 2710, whereas coordinates of a video signal may become 3840×2160 in a two-dimensional plane 2720. In this case, the coordinates are not fixed but can be modified in accordance with a resolution of an input video signal or a device. Each of values of the coordinates is not an absolute value but can be changed as a relative value. The resolution means how many pixels are included in a screen and is represented by multiplying the number of width pixels and the number of height pixels. That is, if a resolution is 1920×1080, the number of width pixels is 1920, and the number of height pixels is 1080. In addition, it is represented as two-dimensional plane coordinates.

For example, since the coordinates of the remote controller are not equal to those of the video signal, even if a user selects a point P of x=1440 and y=270, the controller 1530 recognizes that a point P' of x=720 and y=135 is selected.

Therefore, there may be a difference between the coordinates intended by the user and the coordinates recognized by the controller 1530.

In this case, when the external remote controller intends to transfer data to the display device, the external remote controller transfers the data by including coordinate information of the corresponding remote controller in the data. The external remote controller and the display device are connected with each other through wireless communication, and the wireless communication includes RF communication and IR communication. Moreover, the external remote controller may correspond to a mobile device such as a smartphone, a tablet PC, etc.

The controller 1530 performs scaling on the coordinate information of the external remote controller according to video signal information of a content.

Specifically, when the video signal information of the content is changed, the controller 1530 senses the changed video signal information and then performs scaling on received plane coordinates of the external remote controller based on the sensed video signal information.

For example, when the coordinates of the remote controller are 1920×1080 and the video signal resolution information of the content is 720P HD corresponding to 1280×720, the controller 1530 changes the received coordinates of the remote controller to 1280×720 by scaling the received coordinates of the remote controller with reference to the video signal information. When the resolution corresponds to HD, a scaling factor becomes 0.66.

When the video signal resolution information of the content is FHD corresponding to 1920×1080, the controller 1530 performs scaling with reference to the video signal information. When the resolution is FHD, the coordinates of the remote controller and the coordinates of the video signal information are the same, and thus, the scaling factor becomes 1.

If the video signal resolution information of the content is UHD corresponding to 3840×2160, the controller 1530 changes the received coordinates of the remote controller to 3840×2160 by scaling the received coordinates of the remote controller with reference to the video signal information. When the resolution corresponds to UHD, the scaling factor becomes 2.

FIG. 28 is a diagram illustrating a solution for a case in which a specific area to be enlarged is out of a video output range according to an embodiment of the present invention.

Referring to the top drawing 2810 of FIG. 28, when a specific area is enlarged with respect to a point at which a pointer is located, i.e., by considering the point as the center point, there may be an area which is not included in original vide data.

Thus, as shown in the bottom drawing 2820 of FIG. 28, the specific area is enlarged by moving the center point to another point 2824 instead of the point 2822 at which the pointer is located. Compared with the top drawing 2810 of FIG. 28, it is advantageous in that only an area included in the original video data is enlarged.

FIG. 29 is a diagram illustrating an example of dividing a screen into a prescribed number of partial screens, enlarging a selected screen if a user selects the screen from the divided screens, and displaying the enlarged screen when video data is outputted according to an embodiment of the present invention.

Referring to the top drawing 2910 of FIG. 29, if the controller 1530 receives a specific command from an external remote controller, the controller 1530 partitions a screen into nine screens to display video data. If a user selects a specific screen 2912 from the partitioned screens and the controller 1530 receives a command for selecting the specific screen 2912 from the external remote controller, the controller 1530 enlarges video data corresponding to the selected specific screen 2912 and then displays the enlarged video data.

Moreover, as shown in the bottom drawing of FIG. 29, the controller 1530 reduces original video data at a prescribed ratio and then displays the reduced original video data on a second area 2924. In addition, the controller 1530 enlarges the video data of the selected specific area as shown in the upper drawing 2910 of FIG. 29 and then displays the enlarged video data on a first area 2920. Moreover, as mentioned in the foregoing description, an indicator 2922 for guiding the enlarged specific area is displayed together on the second area 2924.

Figure 30:
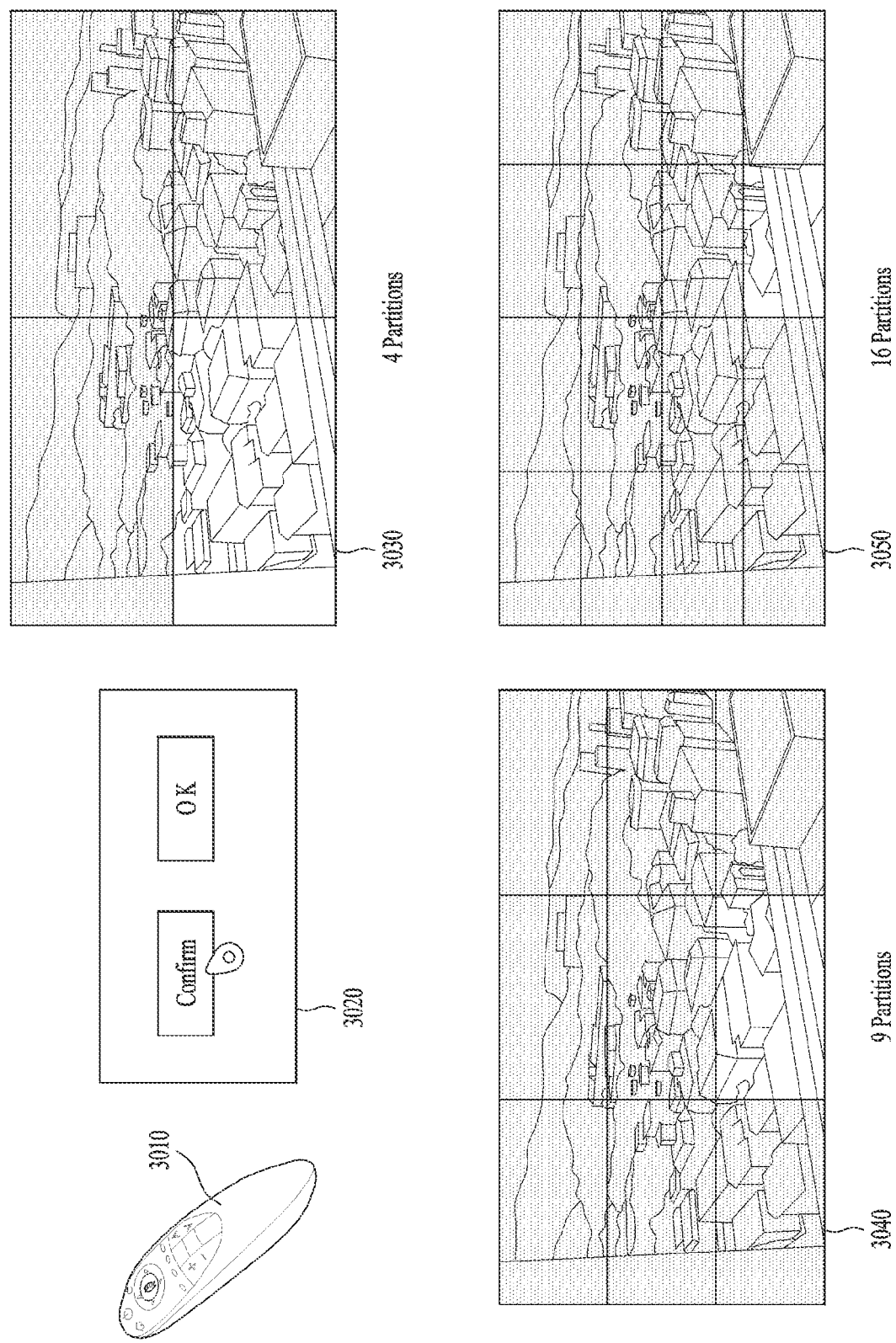
FIG. 30 is a diagram illustrating an example in which a controller divides a screen into four, nine, or sixteen partial screens according to selection from a user and controls the divided screens when video data is outputted according to an embodiment of the present invention.

FIG. 30 is a diagram illustrating an example in which a controller divides a screen into four, nine, or sixteen partial screens according to selection from a user and controls the divided screens when video data is outputted according to an embodiment of the present invention.

As shown in FIG. 30, if the controller 1530 receives a specific command 3020 from an external remote controller 3010, the controller partitions a screen into four screens 3030 and then displays the four screens to output video data. Alternatively, the controller 1530 partitions the screen into nine screens 3040 and then displays the nine screens. Further, the controller 1530 partitions the screen into sixteen screens 3050 and then displays the sixteen screens. The number of partitioned screens can be determined by a predetermined value or designed to be user-selectable. With reference to the partitioned screens, a user can select a specific area of the video data that the user desires to enlarge.

If an enlargement or reduction magnification of the video data displayed on a first area is changed in accordance with at least one command received from an external device after a specific area enlargement mode is executed, the controller 1530 automatically changes a size of an indicator in a second area. It will be described in detail with reference to FIG. 31.

If the specific area to be enlarged is recognized within the first area in accordance with the at least one command received from the external device after the specific area enlargement mode is executed, the controller 1530 automatically changes a center point of the indicator in the second area. It will be described in detail with reference to FIG. 32.

The controller 1530 controls both of the video data and the indicator within the second area to be removed after the elapse of a predetermined time after execution of the specific area enlargement mode or in accordance with the at least one command received from the external device. It will be described in detail with reference to FIG. 33.

Moreover, after both of the video data and the indicator within the second area is removed, the controller 1530 displays a graphic image for guiding that the specific area enlargement mode is running. In this case, the graphic image includes information on enlargement magnification. The controller 1530 is designed to display both of the video data and the indicator within the second area again in accordance with a command for selecting the graphic image. It will be described in detail with reference to FIG. 34.

FIG. 31 is a diagram illustrating a process for adjusting a magnification ratio while a specific area enlargement mode is executed according to an embodiment of the present invention. It is apparent that an embodiment partially different from the embodiment shown in FIG. 31, which is implemented by those skilled in the art with reference to the above drawings, comes within the scope of the appended claims and their equivalents.

As shown FIG. 31, when a specific area enlargement mode is executed and a specific area to be enlarged is also specified, video data of an area specified by an indicator 3130 within a second area 3120 is displayed on a first area 3110 as well. As mentioned in the foregoing description, the video data in the indicator 3130 matches, i.e., is identical to the video data in the first area 3110, but the two pieces of vide data has a different size.

Moreover, for the video data displayed on the first area 3110, an enlargement or reduction command can be additionally transmitted to a multimedia device (e.g., TV or STB) using an external device 3100. For example, a command for enlarging the video data in the first area 3110 is generated through a specific button of the external device 3100 as shown in FIG. 31, and then, the corresponding command is transmitted to the multimedia device.

Thus, as shown in FIG. 31, compared to the previous video data in the first area 3110, enlarged video data is displayed on the first area 3111. Moreover, according to a feature of the present invention, at least one of a size and location of the indicator 3131 within the second area 3121 is automatically changed depending on the video data within the first area 3111.

Figure 32:
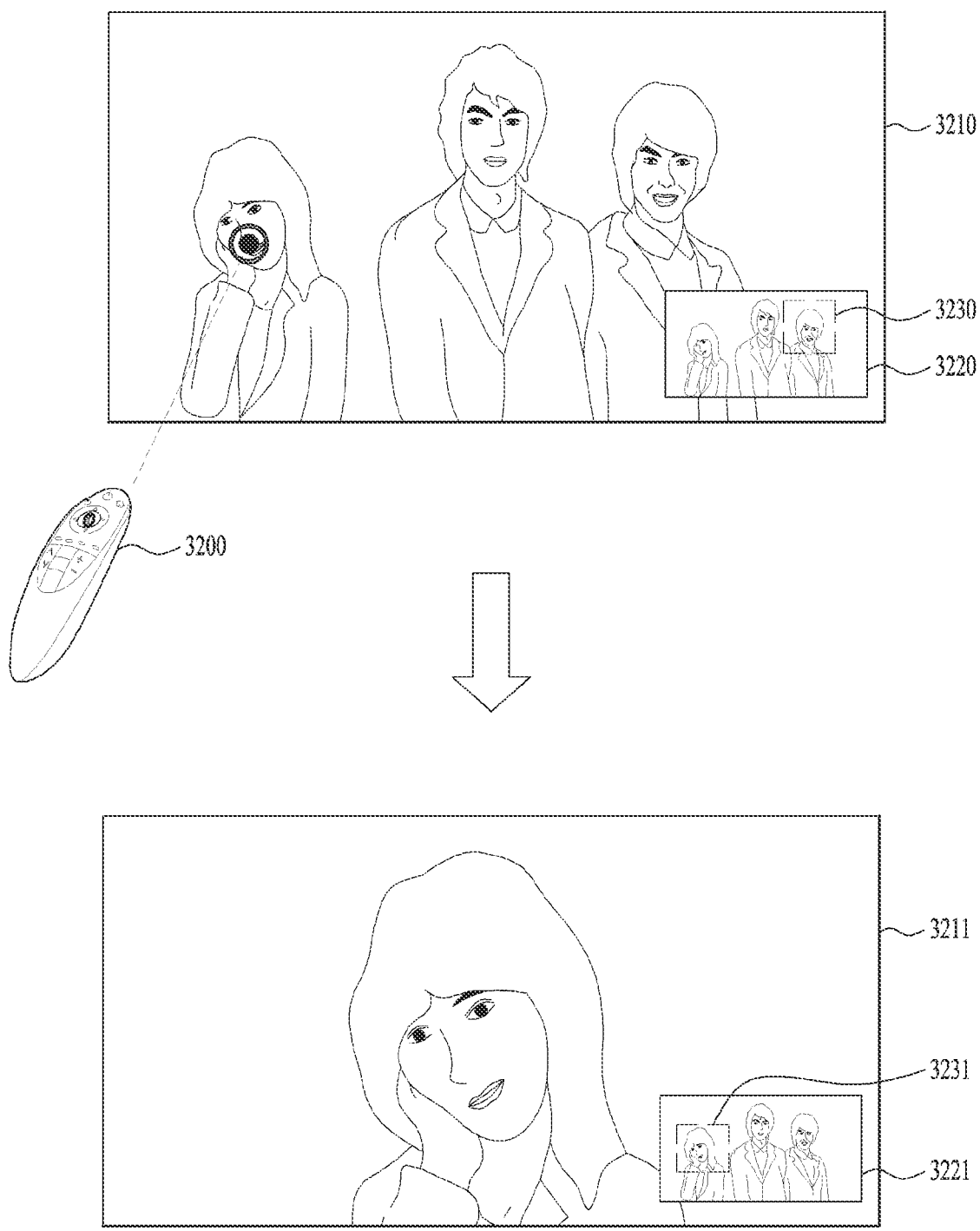
FIG. 32 is a diagram illustrating a process for selecting an area to be enlarged while a specific area enlargement mode is executed according to an embodiment of the present invention.

FIG. 32 is a diagram illustrating a process for selecting an area to be enlarged while a specific area enlargement mode is executed according to an embodiment of the present invention. It is apparent that an embodiment partially different from the embodiment shown in FIG. 32, which is implemented by those skilled in the art with reference to the above drawings, comes within the scope of the appended claims and their equivalents.

As described above or shown in FIG. 32, video data in a first area 3210 and video data in a second area 3220 are identical to each other but the two pieces of video data has a different when a specific area enlargement mode is initially executed. In addition, a location of an indicator 3230 in the second area 3220 is designed to correspond to a specific area last selected in previously executed specific area enlargement mode or a random area.

Meanwhile, it is assumed that a specific area to be enlarged is selected using an external device 3200 in the above-described situation.

Therefore, as shown in FIG. 32, video data where the specific area is enlarged is displayed on a first area 3211 and original video data is consistently displayed on a second area 3221 like a previous second area 3220. However, at least one of a location and size of an indicator 3231 with the second area 3221 is automatically changed. In addition, as shown in FIG. 32, the location or size of the indicator 3231 is automatically changed according to the video data displayed on the first area 3211. The above-described design has an advantage of rapidly and easily checking which specific area of the original video data is enlarged and watched.

FIG. 33 is a diagram illustrating a process for eliminating a related indicator while a specific area enlargement mode is executed according to an embodiment of the present invention. It is apparent that an embodiment partially different from the embodiment shown in FIG. 33, which is implemented by those skilled in the art with reference to the above drawings, comes within the scope of the appended claims and their equivalents.

As described above or shown in FIG. 33, after a specific area enlargement mode is executed, original video data is displayed on a second area 3330, and video data where only a specific area is enlarged is displayed on a first area 3310. Moreover, a size and location of an indicator 3320 are changed according to the first area 3310.

However, there may be a problem that a part of the enlarged video data overlaps with the video data and the indicator 3320 within the second area 3330. To solve this problem, the multimedia device can be designed such that when a predetermined time (e.g., 3 to 5 seconds) elapses or when the multimedia device receives a specific command from an external device 3300, the video data where the specific area is enlarged is still displayed on the first area 3311, and the indicator and the original video data are not displayed on a second area 3321 unlike to the previous second area 3320. Therefore, it is expected that the effect of enabling a user to watch the video data where the specific area is enlarged through only the first area 3311 can be achieved.

FIG. 34 is a diagram illustrating a process for displaying an eliminated related indicator again while a specific area enlargement mode is executed according to an embodiment of the present invention. It is apparent that an embodiment partially different from the embodiment shown in FIG. 34, which is implemented by those skilled in the art with reference to the above drawings, comes within the scope of the appended claims and their equivalents. In particular, in FIG. 34, the case described in FIG. 33 is assumed.

Compared to the bottom drawing of FIG. 33, FIG. 34 is equal to FIG. 33 in that video data where a specific area is enlarged is displayed on a first area 3410. However, FIG. 34 is different from FIG. 33 in that there is a second indicator 3440 for guiding that a specific area enlargement mode is running. In particular, the second indicator 3440 includes information indicating how many times the video data displayed on the first area 3410 is enlarged in comparison with original video data.

In this case, if the second indicator 3440 is selected using an external device 3400, the original video data is displayed on a second area 3430 again, and an indicator 3420 corresponding to a first area 3411 is also displayed again.

Figure 35:
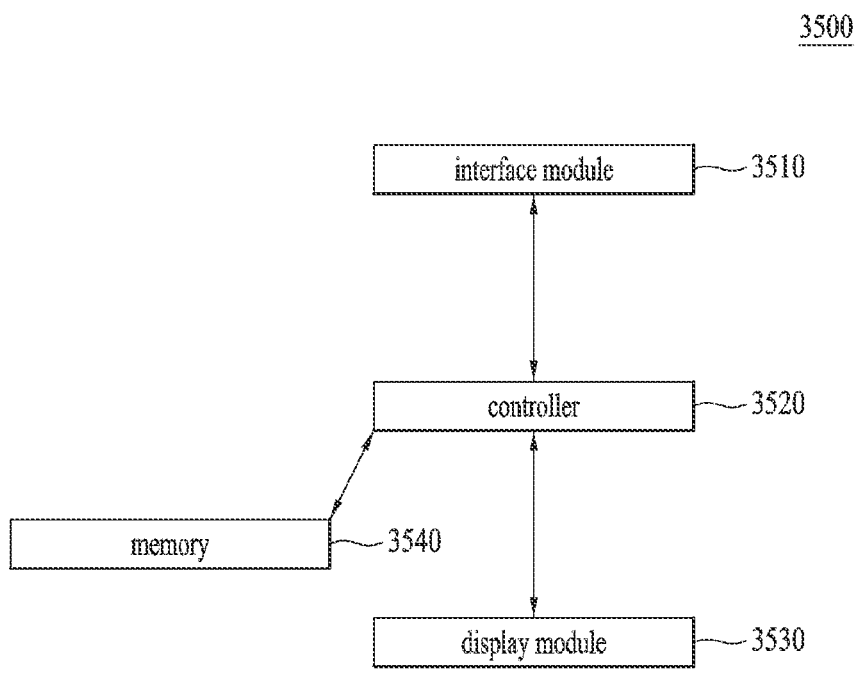
FIG. 35 is a block diagram illustrating the configuration of a display device according to an embodiment of the present invention.

FIG. 35 is a block diagram illustrating the configuration of a display device according to an embodiment of the present invention.

As shown in FIG. 35, a display device 3500 includes an interface module 3510, a controller 3520, a display module 3530, and a memory 3540.

The interface module 3510 receives an input for requesting enlargement and an input for selecting a specific object from among at least one object displayed on the main screen from the remote controller.

The display module 3530 displays a content including at least one object on the main screen of the display device.

The memory 3540 stores a content that has been broadcasted or a content that is currently broadcasted. In addition, the memory 3540 stores features of the specific object according to a control command from the controller 3520.

The controller 3520 controls the display module 3530 and the interface module 3510.

In addition, the controller 3520 enters an enlargement mode according to the input for requesting the enlargement received from the remote controller, specifies the specific object in response to the received selection input, and enlarges a specific area including the specific object.

Moreover, the controller 3520 detects the specific object in response to the received selection input, specifies the detected specific object, and enlarges the specific area including the specific object.

In this case, the specific area may be changed according to a location of the specific object.

Further, the controller 3520 displays a window including the content displayed on the main screen, displays the enlarged specific area on the main screen, and displays an indicator indicating the enlarged specific area within the displayed window. In this case, the content may be a video.

It will be described in detail with reference to FIG. 37.

When a pointer is located within a predetermined distance from the object, the controller 3520 displays a guide line indicating a boundary of the object. Thereafter, after receiving an input for selecting the object from the remote controller, the controller 3520 specifies the object within the guide line.

It will be described in detail with reference to FIGS. 38 and 39.

The controller 3520 adjusts the location of the specified specific object such that the specified specific object is located at the center of the main screen and enlarges the specific area including the adjusted specific object.

It will be described in detail with reference to FIG. 40.

When the specific object disappears on the main screen, the controller 3520 zooms out on the content currently displayed on the main screen and displays the content on the full screen.

It will be described in detail with reference to FIG. 41.

The controller 3520 determines similarity between the displayed new object and the object stored in the memory by comparing the objects. If the determined similarity is equal to or greater than a predetermined threshold, the controller 3520 zooms in on the content currently displayed on the main screen with respect to the object and displays the content.

It will be described in detail with reference to FIG. 42.

The controller 3520 receives, from the remote controller, an input for selecting at least one object different from the object displayed on the main screen using the pointer through the interface module 3510. Thereafter, in response to the received input, the controller 3520 releases specifying the specific object and then specifies the different object(s).

It will be described in detail with reference to FIG. 43.

The controller 3520 adjusts a magnification ratio based on the size of the specified object, enlarges a specific area including the object based on the adjusted magnification ratio, and displays the enlarged specific area on the main screen.

It will be described in detail with reference to FIG. 45.

According to an embodiment of the present invention, a specific object can be detected from a broadcast signal received from a broadcasting station, and an enlarged screen for tracing the specific object can be displayed.

The interface module 3510 receives the broadcast signal from an external server such as the broadcasting station.

The controller 3520 detects the specific object from the received broadcast signal and stores a specific area including the specific object in a buffer (not shown in the drawing). The controller 3520 enlarges the specific area stored in the buffer and displays the enlarged specific area. In this case, the specific area is changed according to a location of the specific object.

According to an embodiment of the present invention, only an area enlarged through a magnifying glass screen can be traced.

When receiving a specific signal from the remote controller, the controller 3520 displays a guide line having a shape of a magnifying glass (not shown in the drawing) on the main screen. In this case, the guide line may have a shape of a tetragon, triangle, circle, or oval, and it can be changed according to a user configuration.

If a specific object within the guide line is specified by the pointer, the controller 3520 specified the specific object within the guide line and stores features of the specific object in the memory.

When receiving a specific signal for activating a magnifying glass function from the remote controller, the controller 3520 adjusts a specific area including the specific object within the guide line at a specific ratio and displays the adjusted specific area on the main screen. In this case, the specific area is displayed within the guide line. In addition, the specific area may be changed according to a location of the specific object.

The controller 3520 can enlarge or reduce the specific area.

The controller 3520 can adjust an adjustment ratio of the specific area based on the features of the object stored in the memory.

Figure 36:
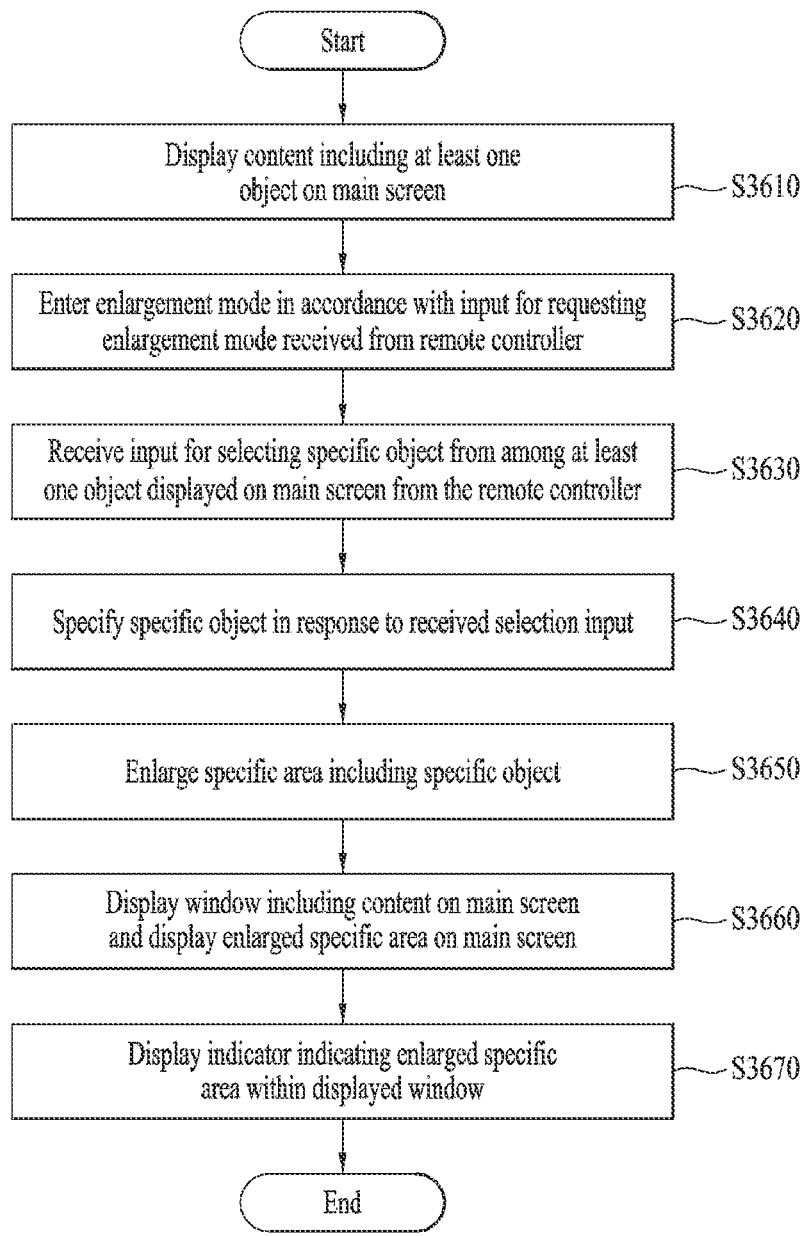
FIG. 36 is a flowchart for explaining a control method for a display device according to an embodiment of the present invention.

FIG. 36 is a flowchart of a control method for a display device according to an embodiment of the present invention. The method is performed by the controller 3520.

As shown in FIG. 36, the controller 3520 displays a content including at least one object on a main screen [S3610].

The controller 3520 enters an enlargement mode in accordance with an input for requesting the enlargement mode received from a remote controller [S3620].

The controller 3520 receives, from the remote controller, an input for selecting a specific object from among the at least one object displayed on the main screen [S3630].

The controller 3520 specifies the specific object in response to the received selection input [S3640].

Particularly, when a pointer is located within a predetermined distance from the object, the controller 3520 displays a guide line indicating a boundary of the object. Thereafter, after receiving the input for selecting the object from the remote controller, the controller 3520 specifies the object within the guide line.

The controller 3520 enlarges a specific area including the specific object [S3650]. In this case, the specific area may be changed according to a location of the specific object.

Particularly, the controller 3520 adjusts the location of the specified specific object such that the specified specific object is located at the center of the main screen and enlarges the specific area including the adjusted specific object.

The controller 3520 displays a window including the content displayed on the main screen and displays the enlarged specific area on the main screen [S3660].

Subsequently, the controller 3520 displays an indicator indicating the enlarged specific area within the displayed window [S3670]. In this case, the content may be a video.

FIG. 37 is a diagram illustrating an example of specifying a specific object and tracing the specified object according to an embodiment of the present invention.

Referring to a drawing 3710, the controller 3520 enters an enlargement mode 3712 in accordance with an input for requesting the enlargement mode received from the remote controller, specifies an object such as a ball 3714 using a pointer in response to a received selection input, and enlarges a specific area including the specific object such as the ball. In this case, the specific area may be changed according to allocation of the specific object. Thus, when the ball 3714 moves, the specific area is changed according to the ball movement.

That is, when the controller 3520 receives an input for selecting the ball from a user while displaying a soccer game, the controller 3520 specifies the ball object, activates the enlargement mode with respect to the location of the ball, and detects the ball object.

As shown in a drawing 3720, the main screen 3720 includes a window 3722, and the window 3722 includes an indicator 3724. As a PIP screen, the window 3722 shows the original content before enlargement, and the indicator 3724 shows which portion the enlarged content corresponds to of the original content.

The controller 3520 displays the window 3722 including the content displayed on the main screen, displays the enlarged specific area 3720 on the main screen, and displays the indicator 3724 indicating the enlarged specific area. In this case, the content corresponds to a video. In addition, the indicator 3724 may have a shape of a box, circle, oval, triangle, or diamond. Moreover, the indicator 3724 may also have an arbitrary shape according to a user configuration When the object moves, the controller 3520 detects a movement of the object. Thereafter, the controller 3520 changes a reference point from the original point to the moving point, enlarges a specific area including the object by considering the moving point as the reference point and displays the enlarged specific area.

FIG. 38 is a diagram illustrating an example of representing a boundary of an object adjacent to a pointer as a dotted line when the pointer moves toward the object according to an embodiment of the present invention.

Referring to a drawing 3810, when a pointer 3812 is within a predetermined threshold distance from an object such as a ball, the controller 3520 displays a guide line 3814 that indicates a boundary of the object. Thereafter, the controller 3520 specifies the ball object within the guide line 3814 in accordance with an input for selecting the object received from the remote controller.

That is, if the pointer is located within the predetermined threshold distance (e.g., 5 mm) from any one of a plurality of objects displayed on a main screen, the controller 3520 displays the guide line and specifies the object. In this case, the guide line can be expressed as a specific color of a dotted line or a flickering line.

As shown in a drawing 3820, the controller 3520 displays a guide line 3822 that indicates the boundary of the specific object such as the ball, enlarges a specific area including the specific object, and displays the enlarged specific area on the screen. The controller 3520 displays a window and displays an indicator indicating which portion the enlarged screen corresponds to of the full screen within the window.

FIG. 39 is a diagram illustrating an example of representing a boundary of an object adjacent to a pointer as a dotted line when the pointer moves toward the object according to an embodiment of the present invention.

As shown in a drawing 3910, if a pointer 3914 is located within a predetermined threshold distance from an object such as person, the controller 3520 displays a guide line 3912 that indicates a boundary of the object. After receiving an input for selecting the object from the remote controller, the controller 3520 specifies the person corresponding to the object within the guide line 3912.

As shown in a drawing 3920, the controller 3520 displays a guide line 3922 that indicates the boundary of the specific object such as the person, enlarges a specific area including the specific object, and displays the enlarged specific area.

According to the present invention, it is possible to increase a range for a user to select an object. In addition, When the user selects a preferred object, the user can intuitively know which object is selected, thereby improving user convenience.

Figure 40:
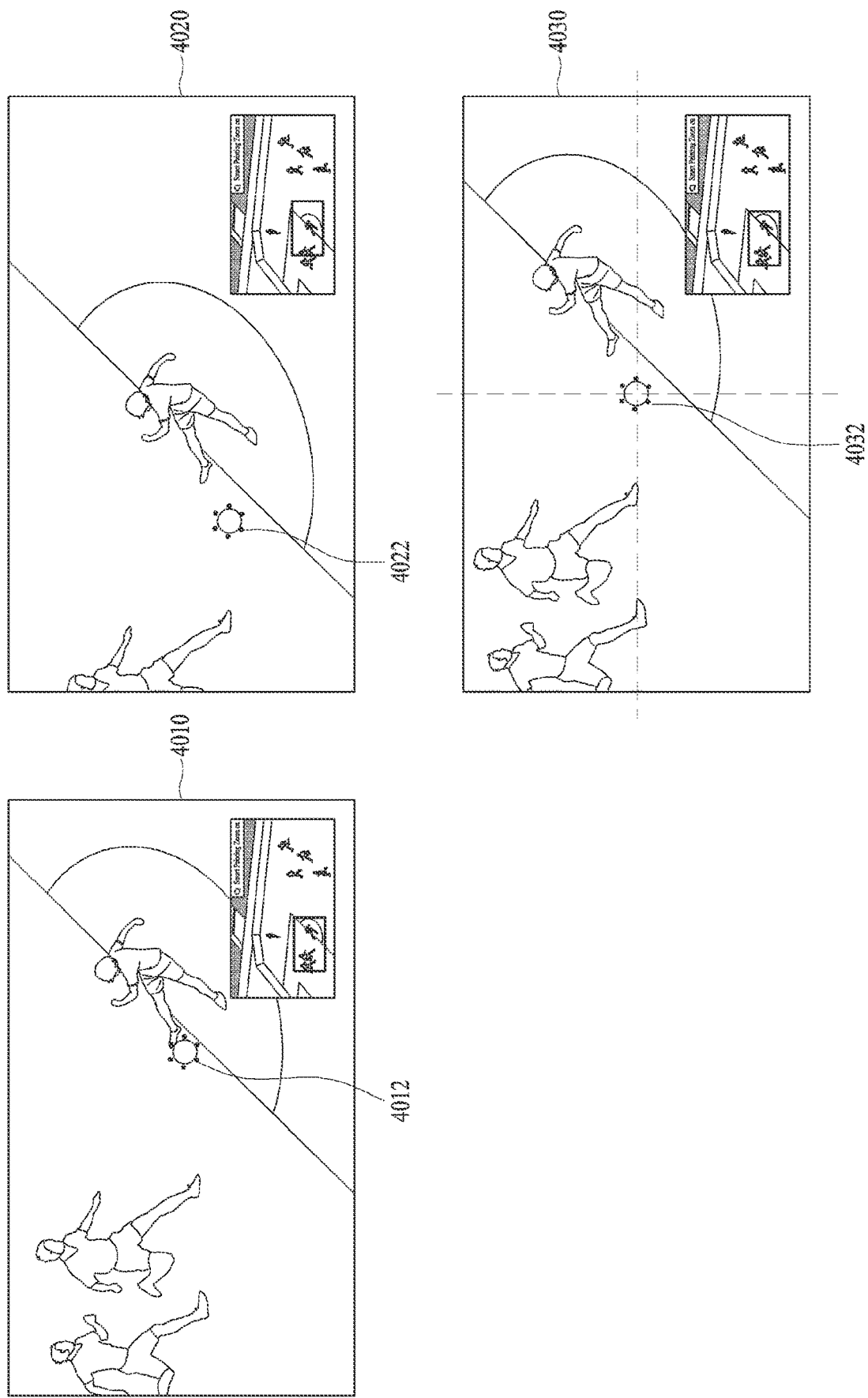
FIG. 40 is a diagram illustrating a case in which the center of an object is located at the center of a main screen according to an embodiment of the present invention.

FIG. 40 is a diagram illustrating a case in which the center of an object is located at the center of a main screen according to an embodiment of the present invention.

As shown in drawings 4010 and 4020, a specific object 4012 such as a ball moves toward the left side of a main screen.

In this case, the controller 3520 adjusts a location of the specific object such as the ball to be located at the center 4032 of the main screen, enlarges a specific area 4030 including the adjusted specific object, and displays the enlarged specific area on the main screen.

According to the present invention, when the location of the specific object is changed, the location of the object can be automatically adjusted to be located at the center of the main screen even though a user does not manipulate the remote controller, thereby improving user convenience.

Figure 41:
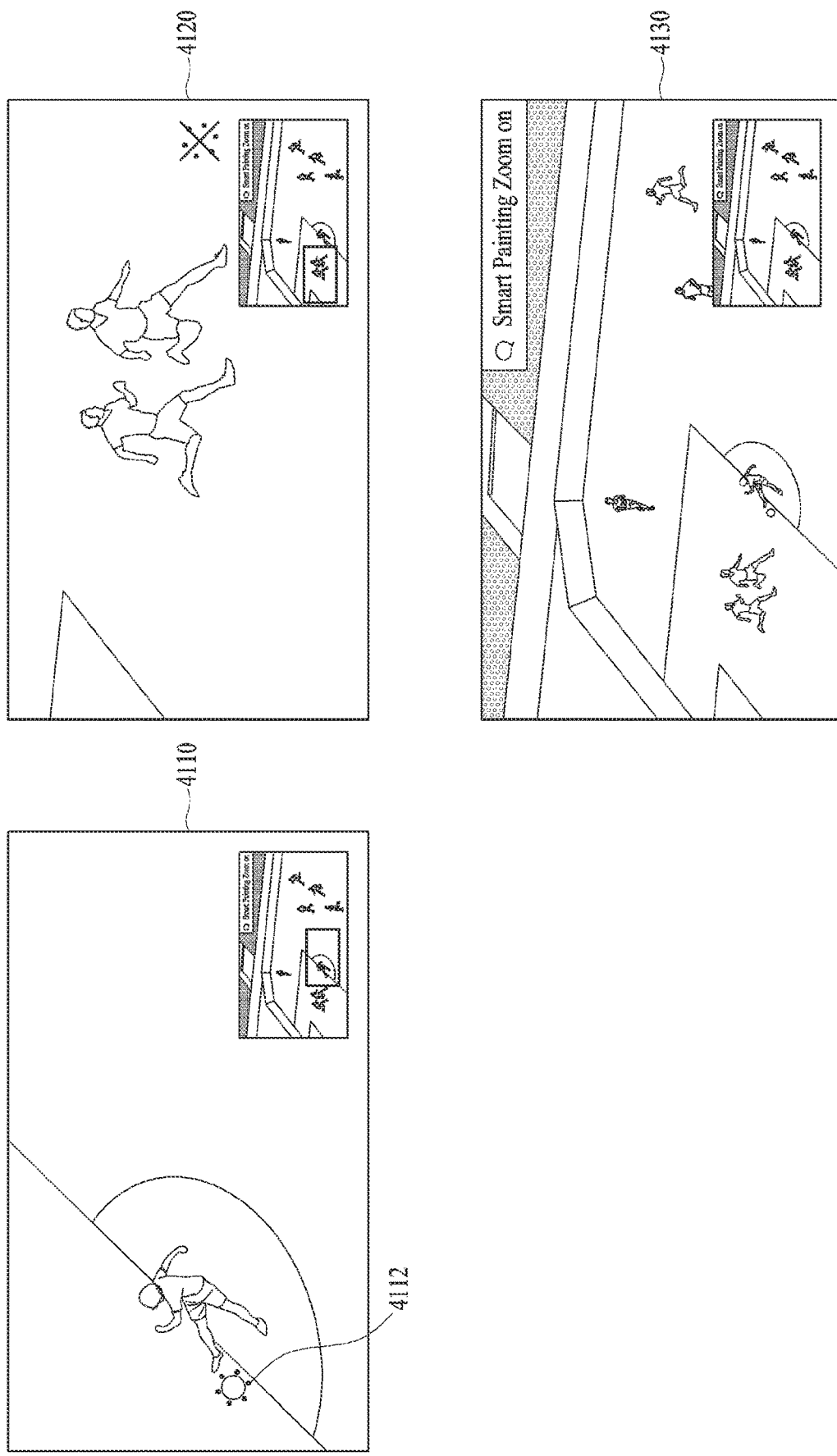
FIG. 41 is a diagram illustrating a case in which an object moves out of a screen according to an embodiment of the present invention.

FIG. 41 is a diagram illustrating a case in which an object moves out of a screen according to an embodiment of the present invention.

When a specific object 4112 such as a ball moves as shown in a drawing 4110, the specific object may disappear on a screen as shown in a drawing 4120.

When the specific object disappears on the main screen, the controller 3520 zooms out on a content currently displayed on the main screen and then displays the content on the full screen. In this case, the controller 3520 performs the zoom-out operation during a prescribed time.

According to the present invention, when the object disappears on the screen, the enlarged screen is smoothly switched to the full screen during the prescribed time. Thus, a user is provided with an effect that the screen is naturally switched.

FIG. 42 is a diagram illustrating a case in which an object that moves out of a screen appears again according to an embodiment of the present invention.

As shown in a drawing 4210, after an object moves out of a screen, the object appears on the screen again.

The controller 3520 stores features of a specific object in the memory 3540.

The features of the object include at least one of a shape, a color, and a motion vector. For example, when the current channel is a sports channel, the object features include at least one of a player's uniform number, a uniform shape, a uniform color, and a face shape.

The controller 3520 determines similarity between the displayed new object and the object stored in the memory by comparing the objects.

Particularly, the controller 3520 determines the similarity with reference to at least one of the shapes, colors, and motion vectors of the objects. The controller 3520 determines the similarity by determining whether the objects have the same shape or color.

The motion vector means a movement direction of the object. That is, it is assumed that there is a wall in the middle of the screen. If the specific object moves toward the right and passes through the rear side of the wall, the specific object disappears on the screen. If the specific object continuously moves toward the right, the specific object appears again on the screen.

Thus, the controller 3520 can determine the similarity in consideration such as directivity.

If the determined similarity is equal to or greater than a predetermined threshold, the controller 3520 zooms in on the content currently displayed on the main screen with respect to a specific object 4222 and displays the content as shown in a drawing 4220.

For example, when a ball appears again on the screen, the controller 3520 determines similarity with reference to at least one of shapes, colors, and motion vectors of balls. If the determined similarity is equal to or greater than 80%, the controller 3520 determines that a ball displayed on the previous screen and the ball displayed on the current screen are the same. Thereafter, the controller 3520 zooms in on the current content displayed on the main screen with respect to the ball and then displays the content as shown in the drawing 4220.

When the specific object appears again on the main screen, the controller 3520 zooms in on the content currently displayed on the main screen, i.e., from the full screen to the enlarged screen and then displays the content as shown in the drawing 4220. In this case, the controller 3520 performs the zoom-in operation during a prescribed time.

According to the present invention, when the object appears again on the screen, the full screen is smoothly switched to the enlarged screen during the prescribed time. Thus, a user is provided with the effect that the screen is naturally switched.

Figure 43:
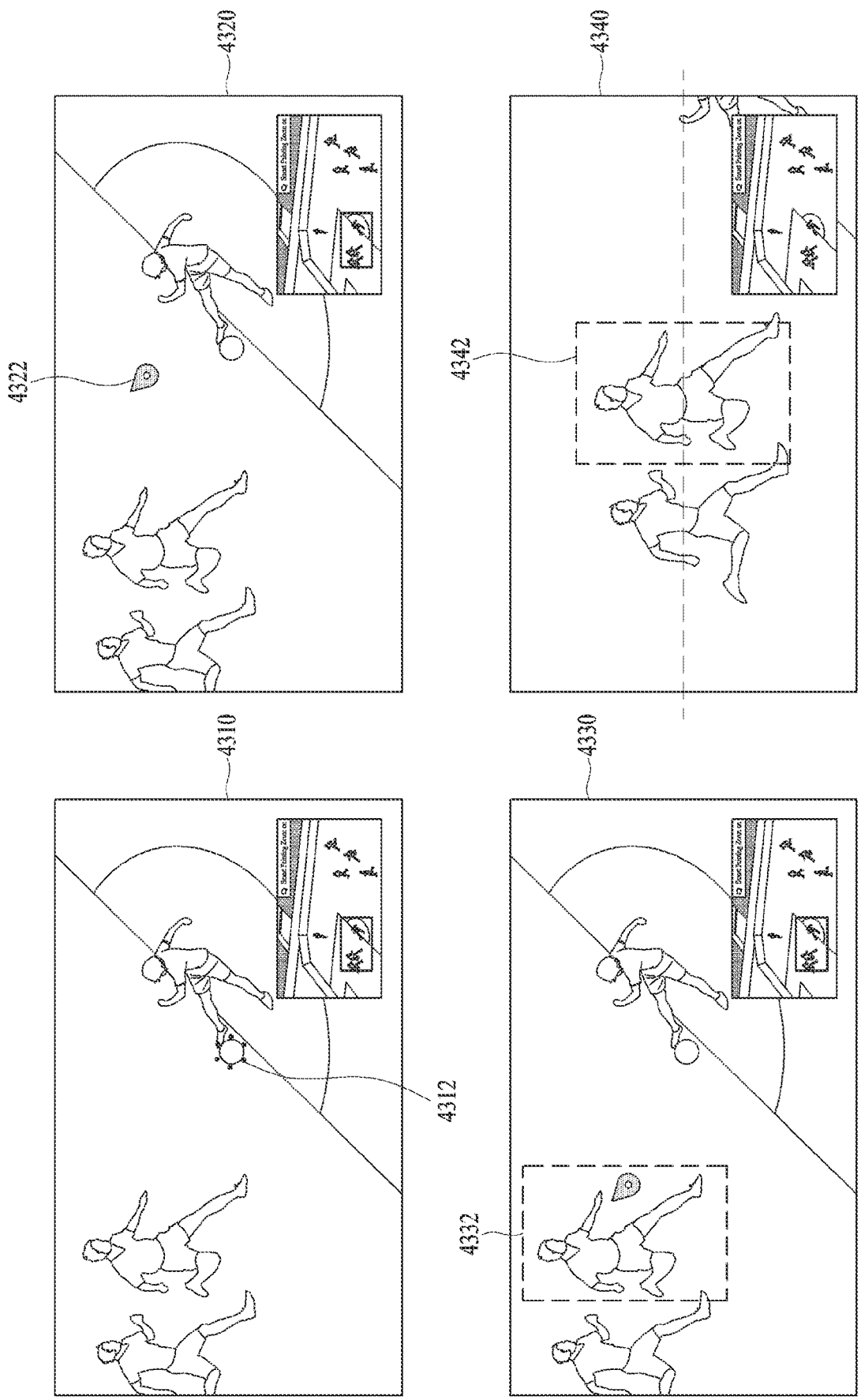
FIG. 43 is a diagram illustrating an example of specifying a different object and tracing the specified different object while displaying a content according to an embodiment of the present invention.

FIG. 43 is a diagram illustrating an example of specifying a different object and tracing the specified different object while displaying a content according to an embodiment of the present invention.

When the controller 3520 receives, from the remote controller, an input for selecting at least one object different from a specific object displayed on the main screen, the controller 3520 releases specifying the specific object and then specifies the different object(s) in response to the received input.

For example, the controller 3520 receives, from the remote controller, an input for selecting an object 4332 such as a person different from a specific object 4312 such as a ball displayed on the main screen shown in a drawing 4310 using a pointer 4322.

In response to the received input, the controller 3520 releases specifying the ball object 4312 and then specifies the person object 4332.

As shown in a drawing 4340, the controller 3520 adjusts the screen such that the person object is located at the center 4342 of the main screen and then displays the adjusted screen.

Figure 44:
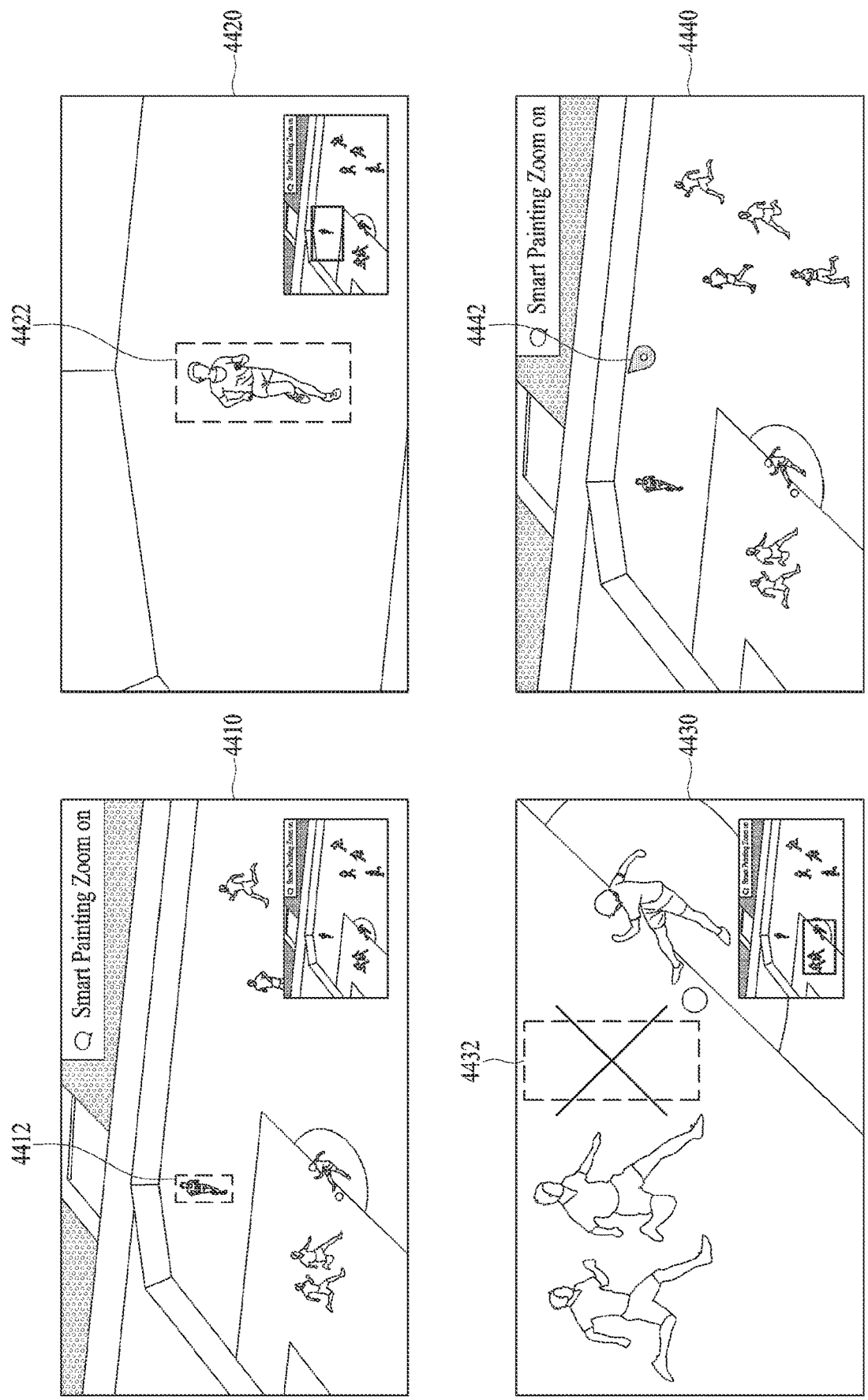
FIG. 44 is a diagram illustrating a case in which an object has a small size or an object cannot be recognized according to an embodiment of the present invention.

FIG. 44 is a diagram illustrating a case in which an object has a small size or an object cannot be recognized according to an embodiment of the present invention.

As shown in a drawing 4410, the controller 3520 checks a recognition rate that represents a level capable of recognizing an object 4412. If the checked recognition rate is lower than a threshold value, the controller 3520 initializes specifying the object.

For example, if the checked recognition rate is lower than 70%, the controller 3520 initializes specifying the object.

In addition, if a size of the object is smaller than a predetermined threshold, the controller 3520 initializes specifying the object.

For example, if the size of the object is smaller than 1 cm, the controller 3520 initializes specifying the object.

The controller 3520 determines a range of specifiable object sizes. When an object appearing on the screen does not move out of a zoom-in screen, the controller 3520 detects the object irrespective of a size of the object, specifies the detected object, and traces the specified object.

If the object moves out of the zoom-in screen, the controller 3520 performs the zoom-out operation during the prescribed time to display the full screen and initializes specifying the object.

As shown in the drawing 4410, the controller 3520 specifies the object 4412. When the object appearing on the screen does not move out of the zoom screen as shown in a drawing 4420, the controller 3520 continuously detects the object and then specifies the detected object.

When the object moves out of the screen as shown in a drawing 4430 (4432), the controller 3520 performs the zoom-out operation during the prescribed time to display the full screen.

As shown in a drawing 4440, if the recognition rate of the object is lower than the predetermined threshold after the zoom-out operation is performed, the controller 3520 initializes specifying the object and receives an input for specifying a new object.

FIG. 45 is a diagram illustrating an example of adjusting a zoom ratio and a position for each object according to an embodiment of the present invention.

The controller 3520 adjusts a magnification ratio based on a size of a specified specific object, enlarges a specific area including the object based on the adjusted magnification ratio, and displays the enlarged specific area on the main screen.

As shown in a drawing 4510, the controller 3520 adjusts the screen magnification ratio according to a size 4512 of the detected object, enlarges a specific area 4512 including the object based on the magnification ratio scaled by, for example, two times, and then displays the specific area on the main screen.

In addition, as shown in a drawing 4520, when the size of the object 4522 is changed due to a change in the screen, the controller 3520 adjusts the screen magnification ratio according to the changed size of the object, enlarges a specific area 4522 including the object based on the magnification ratio scaled by, for example, three times, and then displays the specific area on the main screen.

When increasing or decreasing the screen magnification ratio, the controller 3520 adjusts times required for the zoom-in and zoom-out operations.

According to the present invention, when the zoom-in and zoom-out operations are performed, a user can be provided with the effect that the screen is naturally switched, thereby improving user convenience.

In addition, even when the specific object moves out of the main screen, the controller 3520 adjusts the screen magnification ratio in consideration of the object size.

According to an embodiment of the present invention, the controller 3520 can recognize an object and adjust a size and shape of an enlarged screen based on features of the recognized object.

The object may include a person, a building, a vehicle, etc. The controller 3520 can adjust the size and shape of the enlarged screen to be optimized for the object based on the features of the object.

For example, when the object is a person, the controller 3520 adjusts the enlarged screen based on features of the person object such that a body and face of the person are displayed well.

When the object is a building, the controller 3520 adjusts the enlarged screen based on features of the building object such that a building entrance and a shape of the entire building are displayed well.

The shape of the enlarged screen includes not only a tetragon but also various shapes such as an oval, circle, triangle, and polygon. Additionally, it can be randomly configured by the user.

FIG. 46 is a diagram illustrating an example of specifying multiple objects and tracing the specified multiple objects according to an embodiment of the present invention.

When the controller 3520 receives an input for selecting objects different from a specified specific object using a pointer from the remote controller, the controller 3520 displays an additional selection message. In addition, when receiving an additional selection input from the remote controller, the controller 3520 performs grouping of the objects different from the specified object and then displays the grouped objects.

For example, as shown in a drawing 4610, when the controller 3520 receives an input for selecting an object 4612 such as a specific player and an object 4618 such as a ball using a pointer 4614 from the remote controller, the controller 3520 displays an additional selection message box 4616. In this case, the additional selection message box may be a pop-up window.

If the pointer is placed over an object that will be additionally selected after the controller 3520 specifies the specific object, the controller 3520 displays the additional selection message box through the pop-up window.

As shown in a drawing 4620, when receiving an additional selection input from the remote controller, the controller 3520 performs grouping 4622 of the specific player object and the ball object and then displays the grouped objects on the main screen.

The controller 3520 groups the ball object and the player object as a single group, enlarges the grouped objects, and displays the enlarged objects on the main screen.

If either the ball object or the player object disappears on the screen, the controller 3520 releases the group. Thereafter, the controller 3520 enlarges a specific area with respect to the object that remains on the screen and then displays the enlarged specific area on the main screen.

If both of the ball object and the player object disappear, the controller 3520 releases the group. Thereafter, the controller 3520 initializes a mode for specifying an object.

FIG. 47 is a diagram illustrating an example of specifying multiple objects and tracing the specified multiple objects according to an embodiment of the present invention.

As shown in a drawing 4710, the controller 3520 specifies a first object, a second object, and a third object and then enlarges a specific area including the specified first, second and third objects.

As shown in a drawing 4720, the controller displays the enlarged specific area on the main screen. If the first to third objects move, the controller 3520 traces the specific area including the first to third objects and displays the traced specific area.

FIG. 48 is a diagram illustrating an example of specifying any one among multiple objects and performing tracing with respect to the specified object according to an embodiment of the present invention.

If a pointer 4812 is placed over an object as shown in a drawing 4810, the controller 3520 generates indicators over objects as shown in a drawing 4820

If the controller 3520 receives an input for selecting a fourth object using the pointer 4812 from the remote controller as shown in the drawing 4820, the controller adjusts the screen such that the fourth object is located at the center of the screen, enlarges a specific area including not only the fourth object but also other objects with respect to the fourth object, and then displays the enlarged specific area on the main screen.

When the fourth object moves to a different location, the controller 3520 adjusts the screen again such that the fourth object is located at the center of the screen.

In this case, the controller 3520 may maintain a screen ratio to be the same as that before specifying the object. Alternatively, the controller 3520 may adjust the screen ratio based on a size of the specified object.

FIG. 49 is a diagram illustrating an example in which when an object is a person, the object is divided according to parts of the body and a different magnification ratio is applied depending on the selected part according to an embodiment of the present invention.

When an object is a person as shown in a drawing 4910, the controller 3520 can divide the object according to parts of the body and then enlarge an area including the object to be optimized for a size of the object.

For example, the controller 3520 divides the person object into the face and whole body. In addition, if an area corresponding to the person object is specified using a pointer 4912, the controller may divide the object into specific parts. Particularly, the controller 3520 may divide the person object into at least one of the face, whole body, leg, arm, torso, chest, abdomen, ankle, wrist, etc.

As shown in a drawing 4920, when the controller 3520 receives an input for specifying the face using the pointer 4912 from the remote controller, the controller 3520 enlarges a specific area including the face and then displays the enlarged specific area on the main screen.

As shown in a drawing 4930, when the controller 3520 receives an input for specifying the whole body using the pointer 4912 from the remote controller, the controller 3520 enlarges a specific area including the whole body and then displays the enlarged specific area on the main screen.

Figure 50:
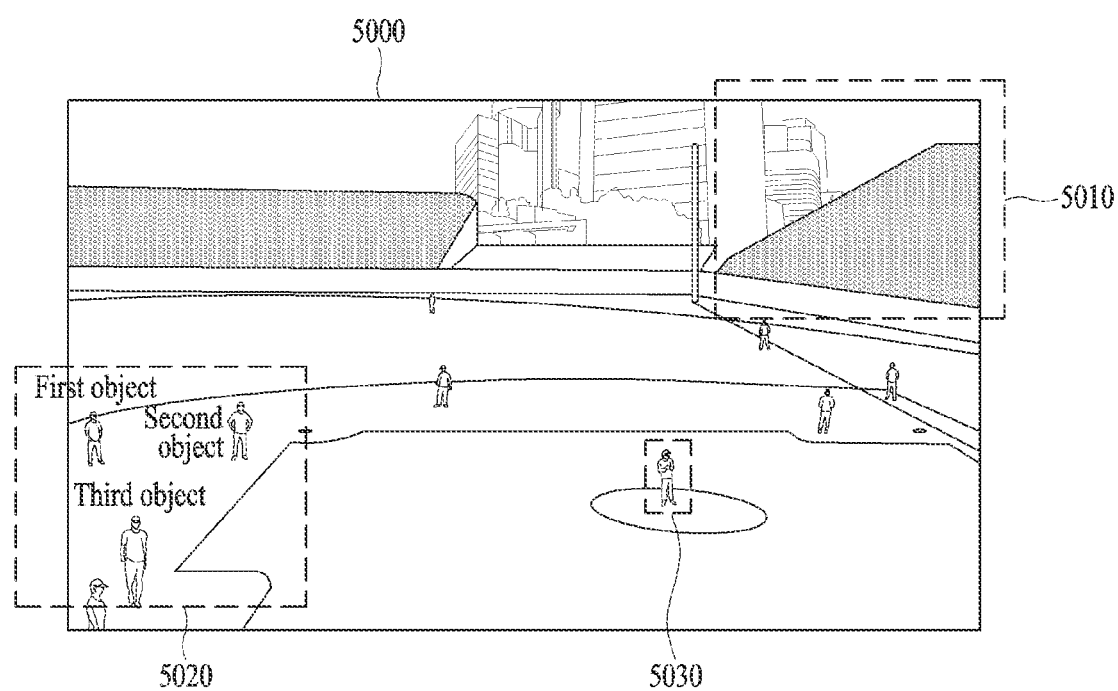
FIG. 50 is a diagram illustrating an example of specifying an object in a different manner depending on movement of the object according to an embodiment of the present invention.

FIG. 50 is a diagram illustrating an example of specifying an object in a different manner depending on movement of the object according to an embodiment of the present invention.

As shown in a drawing 5000, in the case of a baseball game, players move a lot, but spectators rarely move.

The controller 3520 detects a movement of an object. If the detected change in the object movement is lower than a predetermined threshold, the controller 3520 recognizes the object as a spectator as shown in a drawing 5010. On the contrary, if the detected change in the object movement is equal to or higher than the predetermined threshold, the controller 3520 recognizes the object as a baseball player.

That is, the controller 3520 can recognize the object as either the spectator or the baseball player based on the detected change in the object movement and specify the moving object based on features of the object.

As shown in a drawing 5030, if an area located within a predetermined distance from a baseball object is specified, the controller 3520 recognizes that the baseball is specified. Thereafter, the controller 3520 enlarges a specific area including the specified ball and then displays the enlarged specific area.

Specifically, in the case of an object that moves at a high speed such as a ball, it is difficult to specify the object using the point. According to the present invention, if an area including the ball object is specified, the controller 3520 may recognize that the ball object is specified. In other words, a user does not need to specify the ball with the high speed, thereby improving user convenience.

In addition, according to the present invention, even if an object is not specified using the pointer, the object can be automatically specified based on a detected change in the object movement, thereby improving user convenience.

Figure 51:
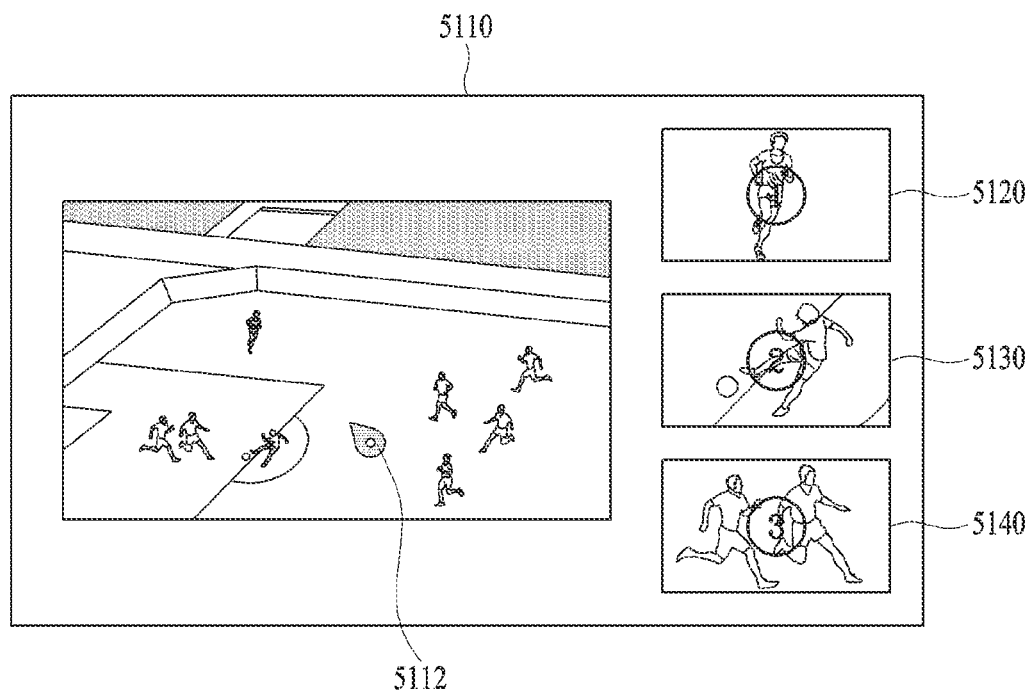
FIG. 51 is a diagram illustrating an example in which when multiple objects are specified, the specified multiple objects are displayed on PBP screens according to an embodiment of the present invention.

FIG. 51 is a diagram illustrating an example in which when multiple objects are specified, the specified multiple objects are displayed on PBP screens according to an embodiment of the present invention.

As shown in a drawing 5110, if the controller 3520 receives inputs for specifying a plurality of objects, i.e., first, second, third objects from the remote controller, the controller 3520 enlarges the first, second, and third objects as shown in drawings 5120, 5130, and 5140, respectively and displays specific areas including the enlarged objects on picture-by-picture (PBP) screens, which are located at the right side.

In this case, locations of the PBP screen can be adjusted, and each of the enlarged specific areas can displayed on the main screen as a PIP screen.

Figure 52:
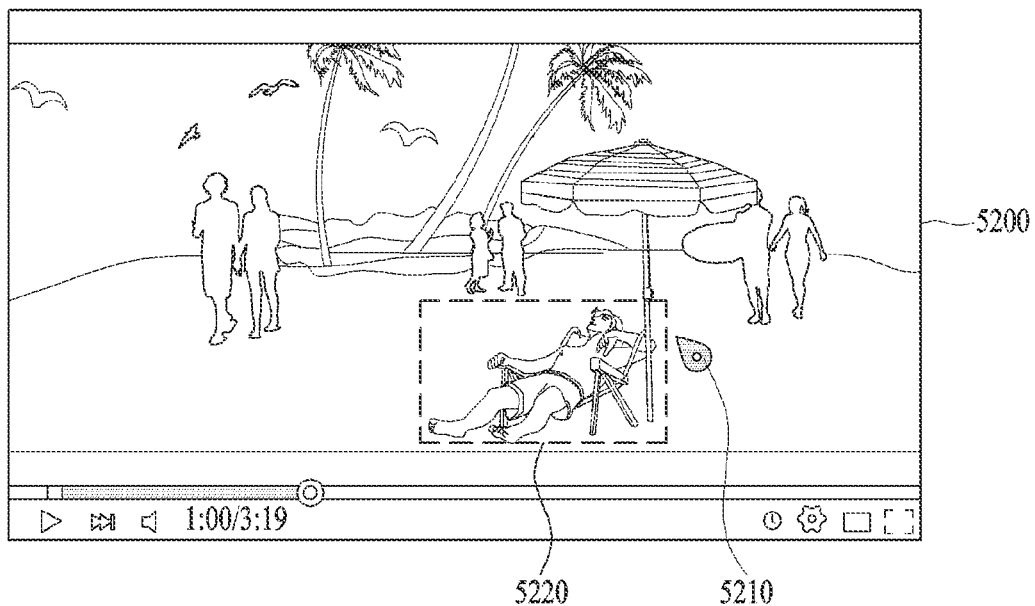
FIG. 52 is a diagram illustrating an example in which a user searches for a specific object on a content through association with time shift and search functions according to an embodiment of the present invention.

FIG. 52 is a diagram illustrating an example in which a user searches for a specific object on a content through association with time shift and search functions according to an embodiment of the present invention.

As shown in a drawing 5200, in the case of a movie content where a specific actor appears, the controller 3520 can receive an input for specifying an object as the specific actor 5220 using a pointer 5210. In this case, the controller 3520 retrieves contents stored in the memory through association with a time shift function, detects a specific section including a specific object such as the specific actor based on features of the specific actor object, enlarges the detected specific section, and then displays the enlarged specific section.

According to the conventional VOD service, when a function of searching for a specific actor is performed, only names of a movie, an advertisement, and a drama show where the specific actor appears are provided. However, according to the present invention, it is possible to provide a function of retrieving a specific section of the content such as a movie where the specific actor appears, enlarging the retrieved section, and displaying the enlarged section.

In other words, unlike the related art where only the names are provided, the present invention can provide particular information necessary for a user, that is, by displaying only the section where the specific actor appears, thereby improving user convenience.

According to an embodiment of the present invention, it is possible to specify a specific object such as a ball on the screen, enlarge a specific area including the specified object, display the enlarged specific area by continuously tracing the specified object, thereby improving user convenience.

According to another embodiment of the present invention, when a pointer approaches an object, a boundary of the object is displayed as a guide line, and thus, a user can easily specify the object. Therefore, user convenience is improved.

According to a further embodiment of the present invention, when a user input no command through the remote controller after checking a location of a specific object, the specific object can be displayed on the center of the screen, and thus, the user can watch the object on the center of the screen, thereby improving user convenience.

According to a still further object of the present invention, when a currently displayed object moves out of the screen, a zoom-out operation is performed, that is, a full screen is displayed. Thereafter, when the object appears again on the screen, a zoom-in operation is performed, thereby proving a user with the effect that the screen is naturally switched. Therefore, user convenience can be improved.

The image display device and operating method therefor disclosed in the present specification are not limited to the configurations and methods described above with reference to the embodiments. Moreover, some or all of the embodiments are selectively combined for various modifications.

Meanwhile, the operating method for the image display device according to the present invention may be implemented as code that can be written on a processor-readable recording medium and thus read by a processor provided in a network device. The processor-readable recording medium may include all kinds of recording media where data that can be read by the processor are stored. The processor-readable recording medium may include, for example, a ROM, a RAM, a CD-ROM, a magnetic tape, a floppy disk, and an optical data memory and it may be implemented in the form of a carrier wave transmitted over the Internet. In addition, the processor-readable recording medium may be distributed over a plurality of computer systems connected to a network such that processor-readable code is written thereto and executed therefrom in a decentralized manner.

Although the present invention has been described with reference to the preferred embodiments thereof, the invention is not limited to the aforementioned specific embodiments. In addition, it will be understood by those skilled in the art that various changes in form and detail may be made without departing from the spirit and scope of the invention. It is also apparent that such variations of this specification are not to be understood individually or separately from the technical scope or spirit of this specification.

MODE FOR CARRYING OUT INVENTION

Hereinabove, various embodiments have been described for the best mode for implementing the present invention.

INDUSTRIAL APPLICABILITY

The present invention can be applied to various display devices.

It is apparent to those skilled in the art that various modifications and changes may be made without departing from the spirit and scope of the present invention. Accordingly, the present invention is intended to include the modifications and changes of the present invention within the attached claims and the equivalent scope.

What is claimed is:

1. A television controlled by a remote controller, the television comprising:
an user input interface configured to receive at least one control signal from the remote controller;
a tuner configured to receive a broadcast signal of a channel selected by a first control signal among the at least one control signal;
a decoder configured to decode video data included in the broadcast signal;
a display module configured to display the video data in a full screen;
a controller configured to automatically activate a specific area enlargement mode based on information included in the broadcast signal;
wherein the controller is further configured to display an enlarged video data in a first area and the video data in a second area,
wherein an indicator displayed within the second area is used for selecting a specific area that is to be enlarged within the first area, and the indicator displayed within the second area has a shape of a box, circle, oval, triangle, or diamond, and
wherein the controller is further configured to receive a second control signal for an enlargement or a reduction command from the remote controller, and change at least one of a size or a location of the indicator within the second area depending on the enlarged video data.

2. The television of claim 1, wherein the information includes category information.

3. The television of claim 2, wherein the category information includes genre information.

4. The television of claim 1, wherein the controller is further configured to switch a state of the specific area enlargement mode to an off state when the video data relates to one of adult video, violent video, adult action or X-rated content.

5. A method for processing data in a television controlled by a remote controller, the method comprising:
receiving at least one control signal from the remote controller;
receiving a broadcast signal of a channel selected by a first control signal among the at least one control signal;
decoding video data included in the broadcast signal;
displaying the video data in a full screen;
automatically activating a specific area enlargement mode based on information included in the broadcast signal;
displaying an enlarged video data in a first area and the video data in a second area,
wherein an indicator displayed within the second area is used for selecting a specific area that is to be enlarged within the first area, and the indicator displayed within the second area has a shape of a box, circle, oval, triangle, or diamond;
receiving a second control signal for an enlargement or a reduction command from the remote controller; and
changing at least one of a size or a location of the indicator within the second area depending on the enlarged video data.

6. The method of claim 5, wherein the information includes category information.

7. The method of claim 6, wherein the category information includes genre information.

8. The method of claim 5, further comprising:
   switching a state of the specific area enlargement mode to an off state when the video data relates to one of adult video, violent video, adult action or X-rated content.

\* \* \* \* \*